US011738461B2

United States Patent
Keravala et al.

(10) Patent No.: US 11,738,461 B2
(45) Date of Patent: Aug. 29, 2023

(54) SYSTEMS AND METHODS FOR INDUSTRIAL ROBOTICS

(71) Applicant: Off-World, Inc., Pasadena, CA (US)

(72) Inventors: James Keravala, Pasadena, CA (US); Alicia Teresa Kavelaars, Berkeley, CA (US); James Jason Murray, Liege (BE); Mark Eugene Nall, Huntsville, AL (US); Joshua Jeremy Izenberg, Washington, DC (US); Amaresh Kollipara, San Francisco, CA (US)

(73) Assignee: Off-World, Inc., Altadena, CA (US)

( * ) Notice: Subject to any disclaimer, the term of this patent is extended or adjusted under 35 U.S.C. 154(b) by 300 days.

(21) Appl. No.: 17/070,748

(22) Filed: Oct. 14, 2020

(65) Prior Publication Data

US 2021/0114219 A1 Apr. 22, 2021

Related U.S. Application Data

(60) Provisional application No. 62/923,357, filed on Oct. 18, 2019, provisional application No. 62/923,376, filed on Oct. 18, 2019.

(51) Int. Cl.
*B25J 9/16* (2006.01)
*B25J 5/00* (2006.01)
(Continued)

(52) U.S. Cl.
CPC .............. *B25J 9/1682* (2013.01); *B25J 5/00* (2013.01); *B25J 9/0084* (2013.01); *B25J 9/161* (2013.01);
(Continued)

(58) Field of Classification Search
CPC .......... G05B 2219/39153; G05B 2219/40434; G05B 2219/39146; G05B 2219/40298;
(Continued)

(56) References Cited

U.S. PATENT DOCUMENTS

| 9,827,677 | B1 | 11/2017 | Gilbertson et al. |
| 11,135,717 | B2 | 10/2021 | Skaaksrud et al. |

(Continued)

FOREIGN PATENT DOCUMENTS

| CN | 102704932 | 10/2012 |
| CN | 102704932 A | 10/2012 |

(Continued)

OTHER PUBLICATIONS

International Preliminary Report on Patentability in PCT/US2020/055516 dated Jan. 14, 2022.
(Continued)

*Primary Examiner* — Khoi H Tran
*Assistant Examiner* — Tanner L Cullen
(74) *Attorney, Agent, or Firm* — Knobbe, Martens, Olson & Bear, LLP

(57) ABSTRACT

Systems and methods for industrial robotic platforms. Squads of industrial robots autonomously communicate and work together. A control center may monitor the autonomous operations. Software at the control center, squad, and robot levels forms a distributed control system that analyzes various data related to the platform for monitoring of the various systems. Artificial intelligence, such as machine learning, is implemented at the control center, squad, and/or robot levels for swarm behavior driven by intelligent decision making. Each robot includes a universal platform attached to a task-specific tooling system. The robots may be mining robots, with a mining-specific tooling system attached to the universal framework, and configured for mining tasks. The platform is modular and may be used for other industrial applications and/or robot types, such as construction, satellite swarms, fuel production, disaster recovery, communications, remote power, and others.

20 Claims, 25 Drawing Sheets

(51) Int. Cl.
*B25J 9/00* (2006.01)
*B25J 13/06* (2006.01)
*G05B 19/4155* (2006.01)
*G05B 19/042* (2006.01)

(52) U.S. Cl.
CPC .............. *B25J 9/163* (2013.01); *B25J 13/06* (2013.01); *G05B 19/042* (2013.01); *G05B 19/4155* (2013.01); *G05B 2219/39146* (2013.01); *G05B 2219/40298* (2013.01); *G05B 2219/45004* (2013.01); *G05B 2219/50391* (2013.01)

(58) Field of Classification Search
CPC ..... G05B 2219/45004; G05B 19/41895; B25J 15/04; B25J 9/08; B25J 9/0084; B25J 5/007; B25J 9/162; B25J 5/00; B25J 9/1682; B25J 13/06; B25J 9/161; B25J 9/163; G05D 1/0044; G05D 1/0297; G05D 2201/0216; E21C 35/24; E21C 51/00

See application file for complete search history.

(56) References Cited

U.S. PATENT DOCUMENTS

| | | | |
|---|---|---|---|
| 11,548,159 | B1 | 1/2023 | Ebrahimi Afrouzi et al. |
| 2004/0162638 | A1 | 8/2004 | Solomon |
| 2007/0129869 | A1* | 6/2007 | Gudat .................. G05D 1/0297 701/50 |
| 2010/0057254 | A1 | 3/2010 | Salamanca |
| 2010/0191376 | A1 | 7/2010 | Close et al. |
| 2011/0135189 | A1 | 6/2011 | Lee |
| 2012/0046982 | A1* | 2/2012 | Wellman .......... G06Q 10/06398 701/32.7 |
| 2012/0158176 | A1 | 6/2012 | Park et al. |
| 2016/0348504 | A1* | 12/2016 | Hanski .................... E02F 9/205 |
| 2017/0057081 | A1 | 3/2017 | Krohne et al. |
| 2017/0151667 | A1 | 6/2017 | Bergstra et al. |
| 2018/0021946 | A1 | 1/2018 | Goldenberg et al. |
| 2018/0266247 | A1* | 9/2018 | Lundh .............. G06Q 10/06311 |
| 2018/0361586 | A1 | 12/2018 | Tan et al. |
| 2019/0049931 | A1* | 2/2019 | Tschirschnitz ..... G05B 19/4186 |
| 2019/0248007 | A1 | 8/2019 | Duffy et al. |
| 2019/0301131 | A1 | 10/2019 | Hendron et al. |
| 2020/0042018 | A1* | 2/2020 | Chiba .................. G05D 1/0274 |
| 2020/0073363 | A1* | 3/2020 | Albrecht ............ G05B 19/4063 |
| 2020/0311616 | A1* | 10/2020 | Rajkumar .............. G06N 5/043 |
| 2021/0116889 | A1 | 4/2021 | Keravala et al. |

FOREIGN PATENT DOCUMENTS

| | | |
|---|---|---|
| TW | 202128379 | 8/2021 |
| TW | 202129447 | 8/2021 |
| WO | WO 2021/076577 A1 | 4/2021 |
| WO | WO 2021/076579 A1 | 4/2021 |

OTHER PUBLICATIONS

U.S. Appl. No. 17/070,775, Industrial Robotic Platforms, filed Oct. 14, 2020.
International Preliminary Report on Patentability in PCT/US20/55514 dated Nov. 2, 2021.
International Search Report and Written Opinion in PCT/US20/55514 dated Feb. 2, 2021.
International Search Report and Written Opinion in PCT/US2020/055516 dated Jan. 22, 2021.

\* cited by examiner

SYSTEMS AND METHODS FOR INDUSTRIAL ROBOTICS

CROSS REFERENCE

Any and all applications for which a foreign or domestic priority claim is identified in the Application Data Sheet as filed with the present application are hereby incorporated by reference under 37 CFR 1.57. For example, this application claims the benefit of U.S. Patent Application No. 62/923,376 titled "SYSTEMS AND METHODS FOR INDUSTRIAL ROBOTICS" and filed Oct. 18, 2019, and the benefit of U.S. Patent Application No. 62/923,357 titled "INDUSTRIAL ROBOTIC PLATFORMS" and filed Oct. 18, 2019, the entirety of each of which is hereby incorporated by reference for all purposes and forms a part of this specification.

BACKGROUND

Field

Features for industrial robotics are described, in particular architectures, approaches and methods for operating swarms of autonomous, task specific robots, such as mining robots.

Description of the Related Art

Robots are used to perform various tasks. The use of robots may improve profitability and efficiency while reducing the risk to humans. However, existing solutions for performing industrial tasks require frequent repair, are cumbersome, and require high-degrees of close human involvement, and as a result are inefficient and expensive. Improvements in this field are therefore desirable.

SUMMARY

The embodiments disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to industrial robotics.

Systems and methods for industrial robotic system platforms are described. A colony of robots may operate autonomously as individual units and in varying degrees of collaboration with surrounding robots. The robots may be organized in squads or groups of robots, which in turn may be organized and grouped in platoons, forming the overall colony hierarchical structure. A control center communicates with the colony of robots to enable human monitoring and operational exception management, however the control center may not nominally or actively tele-operate the colony. Software at the control center, platoon, squad, and robot levels may analyze various data related to the platform and the external environment for monitoring, communication, and control of the various systems. Artificial intelligence, such as machine learning, may be implemented at the control center, platoon, squad, and robot levels for individual robot and swarm behavior driven by intelligent decision making. The robots may communicate with each other and with the control center to work autonomously to complete an industrial task. A remote control center geographically non-collocated may communicate with multiple colony control centers.

Further, each robot may consist of a universal platform integrated with a task-specific tooling system. The robots may be mining robots, with a mining-specific tooling system attached to the universal platform, also referred to herein as a framework etc., and configured for mining tasks. The platform is modular and may be used for other industrial applications and/or robot types, such as construction, manufacturing, demolition, satellite swarms, fuel production, disaster recovery, communications, remote power, and others, deployed terrestrially on-land and underwater, in free space, on the Moon, Mars and other celestial bodies. When a new species is identified to be added to the suite of species in the swarm robotic architecture catalog of species, payload modules dedicated to fulfill the new species may be developed to be integrated with the robotic universal platform both at the hardware and software level. The fact that the robotic architecture is modularized at the hardware and software subsystem level may accelerate the ability to easily build and integrate new robotic species into existing and new colonies to fulfill new functions and industrial tasks. In the hardware layer, key subsystems may be modularized in the universal platform; e.g., power, thermal management, mobility, data processing, structural support. In the software layer, the system may include a distributed layered architecture where firmware and software modules dedicated to universal and payload functions interface with the data processing layer through an API capable of handling different layers of operating protocols, such as CAN, RS232, ROS, UDP, TCP/IP, etc.

All operations and telemetry transacted in the system may be handled uniformly. Modules to manage processes, oversee data processing, perform housekeeping and logging of data may be part of the SW architecture in different layers of complexity, and completely modularized for scalability, flexibility and ease of integration of new payload modules. The colony is architected so that the robots may operate in complete autonomy as an individual unit, a squad, a platoon or the colony itself. Each robot may include a hardware and software stack configured to execute autonomously an industrial task, with no required human intervention. Algorithms and controls (e.g., hard coded, computer vision, linear, non-linear, machine learning, etc.) and an entire data processing infrastructure may handle the autonomous operation of the system, broadcasting throughout the communications network status and sensor data. In order to fulfill a certain industrial task, robots may be grouped in squads, so that each squad will comprise an optimized number of bots of a certain species in order to fulfill the task. Squad robots may be tagged to share bot data between each other in order to collaborate autonomously as a group and achieve the successful execution of the industrial task. Squads performing the same or different industrial tasks in a certain region of the deployment site, or to fulfill a specific function across the entire deployment site, may be organized in platoons. Bots belonging to the same platoon will be tagged so that data may be shared among them to perform collaborative tasks autonomously as a group.

Data packets with all relevant information and bot, squad, platoon and colony identifiers may be shared among the colony in a distributed data architecture. The algorithms and controls at each robot unit will filter and analyze the relevant data packets shared by the bots in the same squad, platoon and colony. Bots collaborating in the same squad may autonomously transmit and receive data packets dedicated to the squad, and may be shared at a higher frequency and volume based on proximity of operations than the data packets dedicated to the platoon or colony, to sustain operations at the squad level. Bots collaborating in the same platoon may autonomously transmit and receive data packets dedicated to the platoon. Bots collaborating in the same colony may autonomously transmit and receive data packets dedicated to the colony. The control center is primarily for monitoring of the autonomous operations. The control center may monitor all data packets in the network at low or high frequency rates depending on the priority level of the information contained in the data packet. The control center will have the ability to take over control of any bot unit in the colony at any given time to perform manual intervention, exception management, testing or training operations.

In one aspect, a system for operating industrial bots is described. The system comprises one or more colonies. Each colony comprises one or more squads. The squads may be grouped or not grouped in platoons. Each squad comprises a plurality of bots. Each bot is configured to operate autonomously and includes a universal platform coupled with a payload stack, the payload stack being one of a plurality of payload stacks with which the universal platform may be coupled, and where the bot is configured to perform a payload-specific industrial task using the payload stack. The system may further include a colony control center configured to remotely communicate with the one or more squads.

Various embodiments of the various aspects may be implemented. In some embodiments, the plurality of bots may be configured to communicate with each other and the colony control center via a colony communications network. Two or more of the squads may communicate with each other via a colony communications network. The universal platform further may include a mobility system configured to move each bot. According to another embodiment, the mobility system may include a tracked system, a wheeled system, or a legged system. The universal platform may include a control system configured to be operated by a robotic control algorithm. The robotic control algorithm may include an artificial intelligence or machine learning package. The universal platform may include a data processing system where each data packet includes a data packet header containing identification information related to each bot. The identification information may include one or more of the following: a colony identifier, a platoon identifier, a squad identifier, a bot identifier, a bot location identifier, a bot position identifier, health data, performance data, operational data, housekeeping data and/or sensor data. The universal platform may include a hardware platform stack and a software platform stack, and wherein the universal platform is configured to use the hardware platform stack and the software platform stack to autonomously operate the payload stack to perform the payload-specific industrial task and to communicate with other bots and/or the colony control center. A communication system may receive operational data from the one or more colonies and transmit update data to the one or more colonies via a colony communications network. A command and control system may monitor and support the plurality of bots, initialize systems, perform exception management, analyze the operational data and to generate the update data based on analysis of the operational data. A user interface may enable a user to monitor and control the one or more colonies.

According to another aspect, a system for operating autonomous industrial bots is described. The system comprises a control center, a plurality of first industrial bots configured to autonomously perform a first industrial task, and a plurality of second industrial bots configured to autonomously perform a second industrial task that is different from the first industrial task. One or more of the plurality of first industrial bots and one or more of the plurality of second industrial bots are configured to autonomously communicate with each other and with the control center, and the one or more of the plurality of first industrial bots and the one or more of the plurality of second industrial bots are configured to autonomously work together to achieve a collaborative industrial objective resulting from performance of the first industrial task and the second industrial task.

Various embodiments of the various aspects may be implemented. In some embodiments, each first industrial bot of the plurality of first industrial bots may include a universal platform coupled with a first payload stack, and each second industrial bot of the plurality of second industrial bots may include the universal platform coupled with a second payload stack. The first and second payload stacks may be one of a plurality of payload stacks which the universal platform may be coupled with, and wherein each first industrial bot may perform a first payload-specific industrial task using the first payload stack, and each second industrial bot may perform a second payload-specific industrial task using the second payload stack. Acceding to another embodiment, the plurality of first industrial bots may include a plurality of first mining bots. The plurality of second industrial bots may include a plurality of second mining bots. The collaborative industrial objective may include a collaborative mining objective.

In another aspect, an industrial bot is described. The bot is configured to operate autonomously in a swarm robotic system to complete a collaborative industrial objective. The industrial bot comprises a payload stack configured to perform a bot-specific industrial task, a universal platform stack comprising, a robotic hardware platform comprising a frame configured to support the universal and payload hardware stacks, a mobility system coupled with the frame and configured to move the mining bot, and a power system configured to power the universal and payload stack systems The bot further includes a control system comprising an on-board processor configured to operate the robotic hardware platform and a robotic software platform, a communications system configured to transmit and receive data across the colony communications network, and a data bus configured to interface with the on-board processor and one or more hardware platform control modules. The bot further includes a robotic software platform comprising a robot operating system configured to execute robotic control and/or machine learning algorithm(s) to operate the robotic hardware platform to perform the bot-specific industrial task, a data processing module configured to interface with firmware of the one or more hardware platform control modules, amongst the algorithm, health and housekeeping, logging and operational modules and the human-machine interface, a database configured to store operational data of the robotic hardware platform and the robotic software platform, and a user interface module configured to enable a user to remotely access and control the robot In another aspect, a method of using autonomous industrial bots is described. The method comprises establishing autonomous communications between a first industrial bot and a second industrial bot, performing a first industrial task autonomously with the first industrial bot in response to the autonomous communications, performing a second industrial task autonomously with a second industrial bot in response to the autonomous communications, the second industrial task being different from the first industrial task, wherein performing the first and second industrial tasks results in achieving a collaborative industrial objective, and communicating autonomously using the first or second industrial bot first data related to the collaborative industrial objective with a control center.

In another aspect, one or more non-transient computer-readable mediums are described storing one or more sets of instructions thereon that when executed by one or more processors perform a method of mining using autonomous industrial bots. The method comprises establishing autonomous communications between a first industrial bot and a second industrial bot, performing a first industrial task autonomously with the first industrial bot in response to the autonomous communications, performing a second industrial task autonomously with a second industrial bot in response to the autonomous communications, the second industrial task being different from the first industrial task, wherein performing the first and second industrial tasks results in achieving a collaborative industrial objective, and communicating autonomously using the first or second industrial bot first data related to the collaborative industrial objective with a control center.

In another aspect, a system for mining using autonomous industrial bots is described. The system comprises a processor in communication with a memory, the memory storing instructions thereon that when executed by the processor performs a method using autonomous industrial bots. The method comprises transmitting first communications to a first industrial bot, and establishing autonomous communications between the first industrial bot and a second mining bot in response to the first communications, where the autonomous communications cause the first industrial bot to autonomously perform a first industrial task and cause the second industrial bot to autonomously perform a second industrial task different from the first industrial task, and where the first industrial task and the second industrial task together define a collaborative industrial objective.

In another aspect, a method of using autonomous industrial bots is described. The method comprises transmitting first communications to a first industrial bot, and establishing autonomous communications between the first industrial bot and a second industrial bot in response to the first communications, where the autonomous communications cause the first industrial bot to autonomously perform a first industrial task and cause the second industrial bot to autonomously perform a second industrial task different from the first industrial task, and where the first industrial task and the second industrial task together define a collaborative industrial objective.

In another aspect, a non-transient computer-readable medium is described storing instructions thereon that when executed by a processor performs a method using autonomous industrial bots. The method comprises transmitting first communications to a first industrial bot, and establishing autonomous communications between the first industrial bot and a second industrial bot in response to the first communications, where the autonomous communications cause the first industrial bot to autonomously perform a first industrial task and cause the second industrial bot to autonomously perform a second industrial task different from the first industrial task, and where the first industrial task and the second industrial task together define a collaborative industrial objective. In some embodiments, the first industrial bot may be a mining bot and the collaborative industrial objective may include a collaborative mining objective In another aspect, an industrial bot configured to operate autonomously in a swarm robotic system to complete a collaborative industrial objective is described. The industrial bot comprises a universal platform stack comprising a robotic hardware platform comprising a frame configured to support the universal and payload stack, a mobility system coupled with the frame and configured to move the industrial bot, a power system configured to power the mobility system and the payload stack. The bot further comprises a control system comprising an on-board processor configured to operate the robotic hardware platform and a robotic software platform, a communications system configured to transmit and receive data across the colony communications network, and a data bus configured to interface with the on-board processor and one or more hardware platform control modules. The bot further comprises a robotic software platform comprising a robot operating system (ROS) configured to execute a robotic control algorithm to operate the robotic hardware platform to perform the bot-specific robotic task, a hardware processor module configured to interface with firmware of the one or more hardware platform control modules, a database configured to store operational data of the robotic hardware platform and the robotic software platform, and a user interface module configured to enable a user to remotely access and control the robotic operating system. The bot may further comprise a payload stack configured to perform a bot-specific industrial task.

BRIEF DESCRIPTION OF THE DRAWINGS

The foregoing and other features of the present development will become more fully apparent from the following description and appended claims, taken in conjunction with the accompanying drawings. Understanding that these drawings depict only several embodiments in accordance with the development and are not to be considered limiting of its scope, the development will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present development, as generally described herein, and illustrated in the figures, can be arranged, substituted, combined, and designed in a wide variety of different configurations, all of which are explicitly contemplated and make part of this disclosure.

DETAILED DESCRIPTION

The following detailed description is directed to certain specific examples of the development. Reference in this specification to "one example," "an example," or "In some implementations" means that a particular feature, structure, or characteristic described in connection with the example is included in at least one example of the invention. The appearances of the phrases "one example," "an example," or "In some implementations" in various places in the specification are not necessarily all referring to the same example, nor are separate or alternative examples necessarily mutually exclusive of other examples. Moreover, various features are described which may be exhibited by some examples and not by others. Similarly, various requirements are described which may be requirements for some examples but may not be requirements for other examples.

Various examples will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific examples of the development. Furthermore, examples of the development may include several novel features, no single one of which is solely responsible for its desirable attributes or which is essential to practicing the invention described herein.

A. Swarm Robotic Architecture

Figure 1:
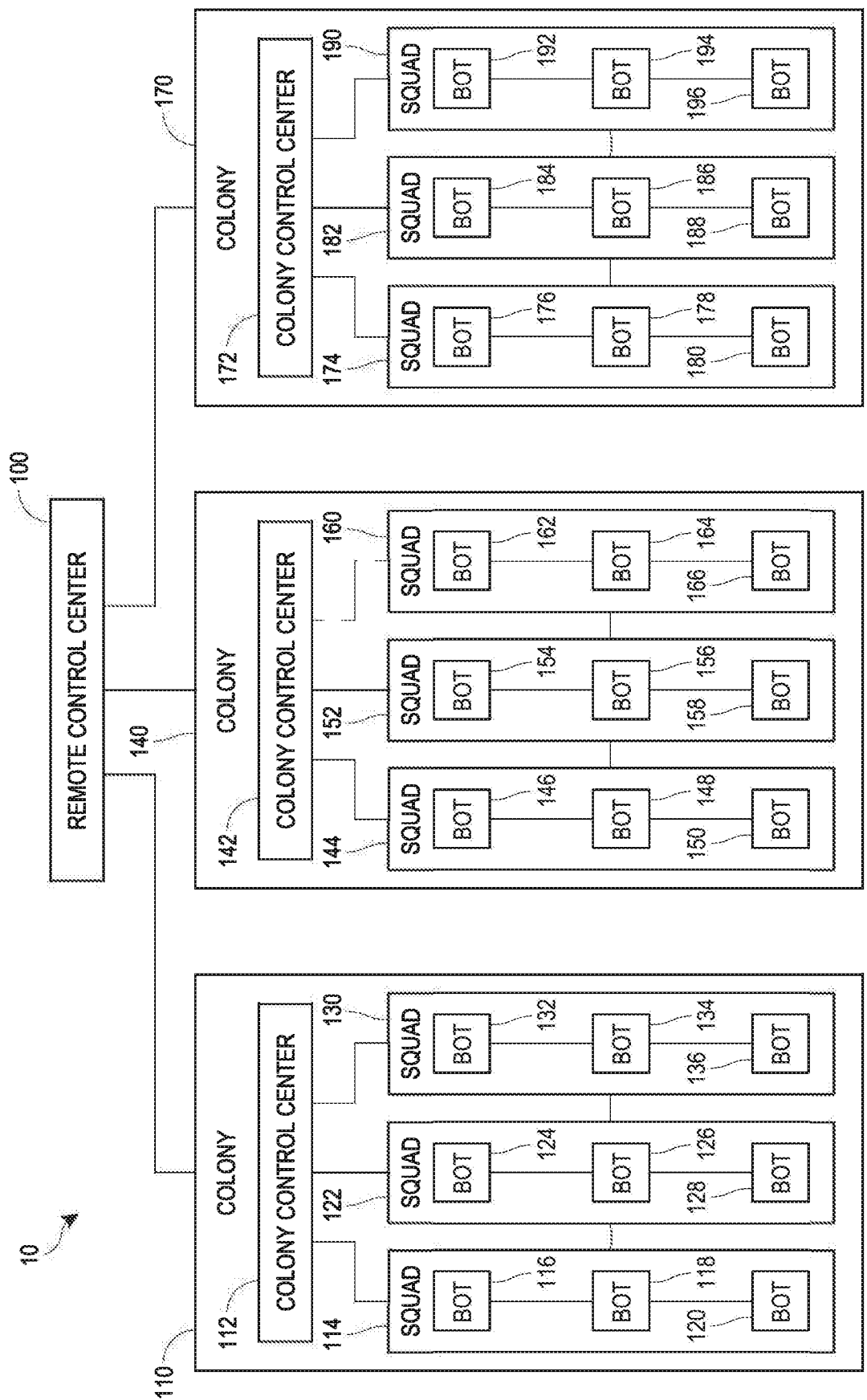
FIG. 1 is a schematic of an embodiment of an industrial robotic system, including a remote control center and a plurality of colonies, each colony having a colony control center in communication with a plurality of robotic squads, and with each squad having a plurality of industrial robots configured for performing various industrial-specific tasks.

FIG. 1 is a schematic of an industrial robotic system 10. The system 10 includes a remote control center 100 and a plurality of colonies 110, 140, 170. Each colony 110, 140, 170 has a respective colony control center 112, 142, 172 in communication with a respective plurality of robotic squads. The colony 110 includes the squads 114, 122, 130, the colony 140 includes the squads 144, 152, 160, and the colony 170 includes the squads 174, 182, 190. The robotic squads may also be grouped in platoons, which in turn work more collaboratively that the remaining squads or platoons in the colony at a higher hierarchical level in the colony.

The system 10 may be a distributed, autonomous system that is heavily intelligent at the unit levels, with the bots operating in a distributed architecture as a swarm individually or in collaboration, organized in subgroups as pertaining to specific tasks, and where the control centers primarily act as witnesses, e.g. monitoring and supporting the independent operation of the swarm. The control centers may thus be observational entities, not directors of actions. In some implementations, only in rare cases where operations deviate from the norm due to exceptions or anomalies (not status quo operations) does the control center's role change into supervisory control for brief periods. Also, there may be rare instances where bots (or any permutation of a combination of bots) require confirmation from a control center for the execution of a task or a series of tasks. In some implementations, colonies are deployed with no control centers at all. Thus the systems described herein may include the autonomous, intelligent actions of the bots, and correspondingly, the autonomous, intelligent actions and collaboration between and amongst various permutations of bot combinations.

The various systems and methods described herein may be used with, or use any of, the features described in the systems and methods described in U.S. Patent Application No. 62/923,376 and U.S. Patent Application No. 62/923,357, each of which is incorporated by reference herein in its entirety and forms a part of this specification for all purposes.

Each squad includes a respective plurality of industrial robots or "bots" configured for performing various industrial-specific tasks. The bots each include a universal platform with common structural, mechanical, electrical and computing systems, coupled with an interchangeable payload component. Each payload component is integrated with the universal platform and configured for a specific industrial task to be performed by the bot. The bots include one or more processors in communication with one or more memories storing instructions thereon that when executed by the one or more processors perform the industrial task. The task may be performed autonomously by the bot and/or in collaboration with other autonomous bots to achieve an overall collaborative industrial objective. The system 10 allows for management and control of the bots.

Any number of colonies, platoons, squads, and bots may be implemented, depending on the industrial objective. As shown, in the colony 110, the squad 114 includes the bots 116, 118, 120, the squad 122 includes the bots 124, 126, 128, and the squad 130 includes the bots 132, 134, 136. In the colony 140, the squad 144 includes the bots 146, 148, 150, the squad 152 includes the bots 154, 156, 158, and the squad 160 includes the bots 162, 164, 166. In the colony 170, the squad 174 includes the bots 176, 178, 180, the squad 182 includes the bots 184, 186, 188, and the squad 190 includes the bots 192, 194, 196.

The system 10 includes three colonies 110, 140, 170. The system 10 may include fewer or more than three colonies. There may be one, two, four, five, six, seven, eight, nine, ten, twenty, thirty, forty, fifty, one hundred, five hundred, one thousand, or more colonies. Two or more of the colonies may be the same as each other. Some or all of the colonies may be different from the other colonies.

The bots may communicate with each other for autonomous actions. The control centers may be used for monitoring, etc. as described. The control centers may receive communications related to the bots, squads, platoons etc. for monitoring or other purposes. The remote control center 100 may thus be configured to communicate with each of the colonies 110, 140, 170. The center 100 may communicate with the respective colony control center 112, 142, 172. The colony control centers 112, 142, 172 may each be in communication with one or more of the squads of the respective colony. Each of the squads within a particular colony may be in communication with one or more of the other squads with the colony. As shown, the squad 114 is in communication with the squad 122, which is in communication with the squad 130. The squad 144 is in communication with the squad 152, which is in communication with the squad 160. The squad 174 is in communication with the squad 182, which is in communication with the squad 190. The squads may each be in communication with more than one other squad. Each squad may be in communication with all other squads within the particular colony. The squads may be in communication with one or more squads in other colonies. For example, the squad 130 may communicate with the squad 144, etc. The squads may communicate with each other via a colony communications network and/or via the bots within the squads, as described.

The system 10 may be used to achieve an industrial objective. In some implementations, the system 10 may be used for mining where the bots are mining bots configured to achieve a mining objective. The system 10 may be used for construction, manufacturing, demolition, satellite swarms, fuel production, disaster recovery, communications, remote power, and others, deployed terrestrially on-land and underwater, in free space, on the Moon, Mars and other celestial bodies.

The system 10 may use a software-based approach to perform these and other industrial tasks using select combinations of the bots and supporting infrastructure. Each colony may include a group of the squads, deployed to a particular site, working individually and/or in a collaborative fashion to perform related tasks to achieve a collaborative industrial objective, and intertwined with supporting communications and operating software and hardware infrastructure. The system 10 and control features thereof may be used for modular, swarm, small form-factor robots that may be mass produced and that allow for significant reduction in human participation in industrial tasks. The bots may be of any size. The divide and conquer swarm approach may allow for any size bot regardless of the size and scope of the industrial task. The bots may range from bacteria to Battlestar Galatica size. Further details of example hardware and software configurations for the system 10 are provided herein, for example with respect to FIG. 2.

In some implementations, the system 10 may not include the remote control center 100. For example, the system 10 may just include one or more colony control centers 112, 142, 172 which communicates, monitors and supports the one or more colonies 110, 140, 170. For example, the colony control center 112 may be used to monitor and support the colonies 110, 140, 170. Further detail of monitor and support of one or more colonies using the colony control center is described herein, for example with respect to FIGS. 3A-3B. Thus, the various "control" centers described herein may be used primarily for monitoring of autonomous bots, as opposed to active control of the bots.

Each colony 110, 140, 170 may be located in a particular geographic site. Each colony 110, 140, 170 may be in a different location from one or more of the other colonies. The colony control centers may be co-located with a respective colony, or in a different location. The remote control center 100 may be located in a different geographic site from one or more of the colonies 110, 140, 170. The remote control center 100 may be co-located with one or more of the colonies 110, 140, 170.

The system 10 may be used to perform a complex industrial task with a swarm of mobile robotic units, such as the squads 114 etc. of the bots 116 etc., where each bot performs a specific function to accomplish the overall objective. Each bot includes a common platform across all bots with a universal platform stack (e.g. hardware, firmware, and software) and a payload stack (i.e., a payload tool or set of tools) including hardware, firmware, and/or software to perform a task, as further described herein, for example with respect to FIGS. 4-6C. Each bot may be assembled out of standard modules that are part of the universal and/or payload stacks.

Figure 5A:
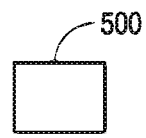
FIG. 5A is a schematic of an embodiment of a universal robotic platform stack that may be used with the robotic hardware platform of FIG. 4 and systems of FIGS. 1-3B.
Figure 5B:
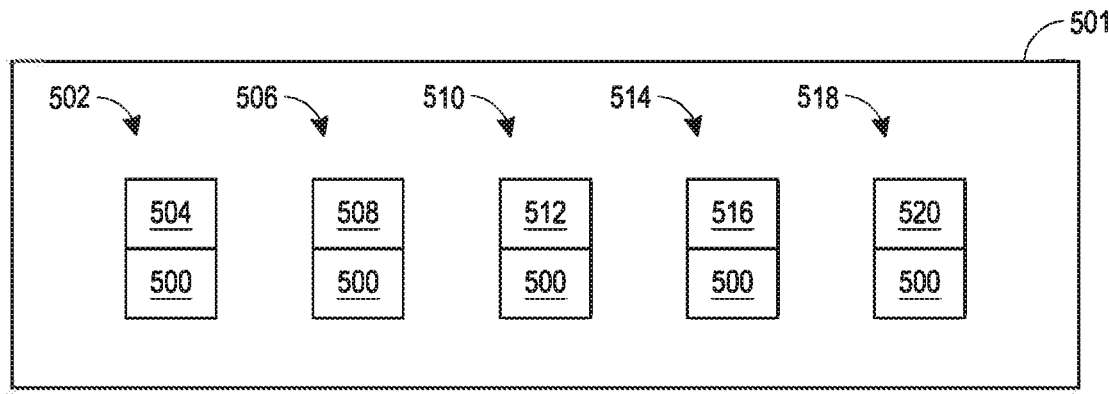
FIGS. 5B-5D are schematics of various embodiments of various industrial robotic species having various payload stacks configured to perform a bot-specific industrial task, that may be used with the universal robotic platform stack of FIG. 5A and systems of FIGS. 1-3B.
Figure 5C:
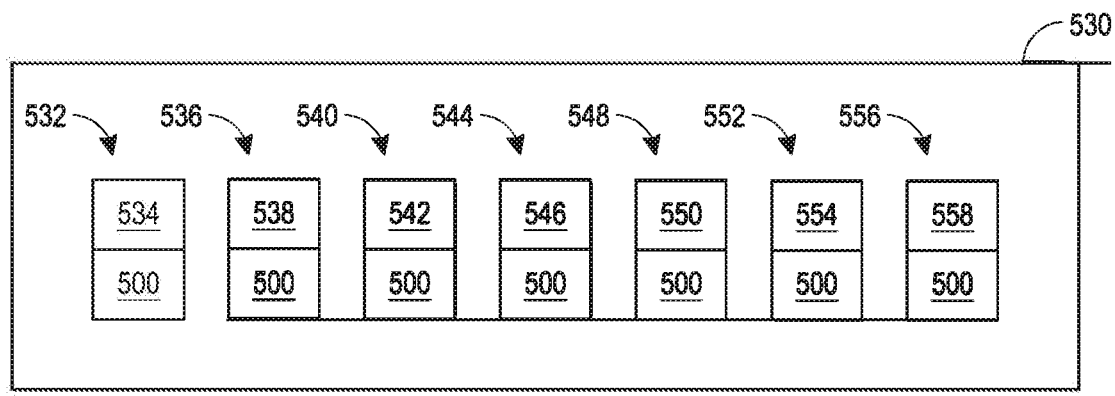
Figure 5D:
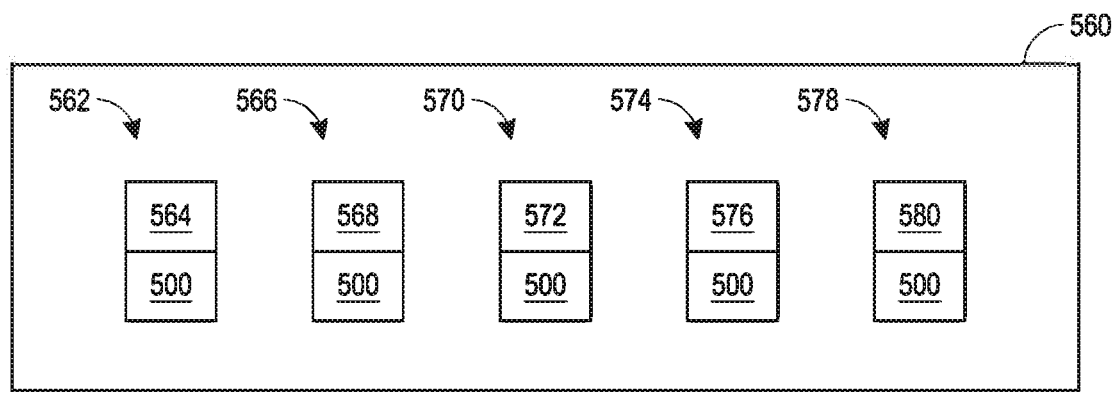

Bots with the same payload stack are part of a robot species, as further described herein, for example with respect to FIG. 5B-5D. One or more of a species of bots may be grouped in squads. Each squad may be defined as a group of bots that perform a set of collaborative or inter-connected functions to achieve an overall industrial objective or specific task.

Different types of squads are defined to perform different functions to fulfill the industrial objective, as further described herein, for example with respect to FIG. 6A-6D. Each squad may have an optimized number of bots for each of the species required to perform the squad function. The total number of squads deployed at a specific geographic site may be defined as a site colony. The total number of squads of each type deployed in the colony may be optimized based on performance and economic metrics. The minimum set of bots required to perform an end-to-end industrial objective may be referred to as the minimum viable platoon (MVP).

In some implementations, the system 10 may not rely on any fixed infrastructure to perform some or all of the industrial tasks and overall objective. Non-mobile components (e.g. water pipes, electric cables, battery banks, etc.) may be laid out temporarily by the bots for as long as necessary to perform the industrial objective on the specific site and then removed once the industrial objective is accomplished. Further details of example industrial objectives as it relates to mining are described herein, for example with respect to FIGS. 7A-7E.

Figure 2:
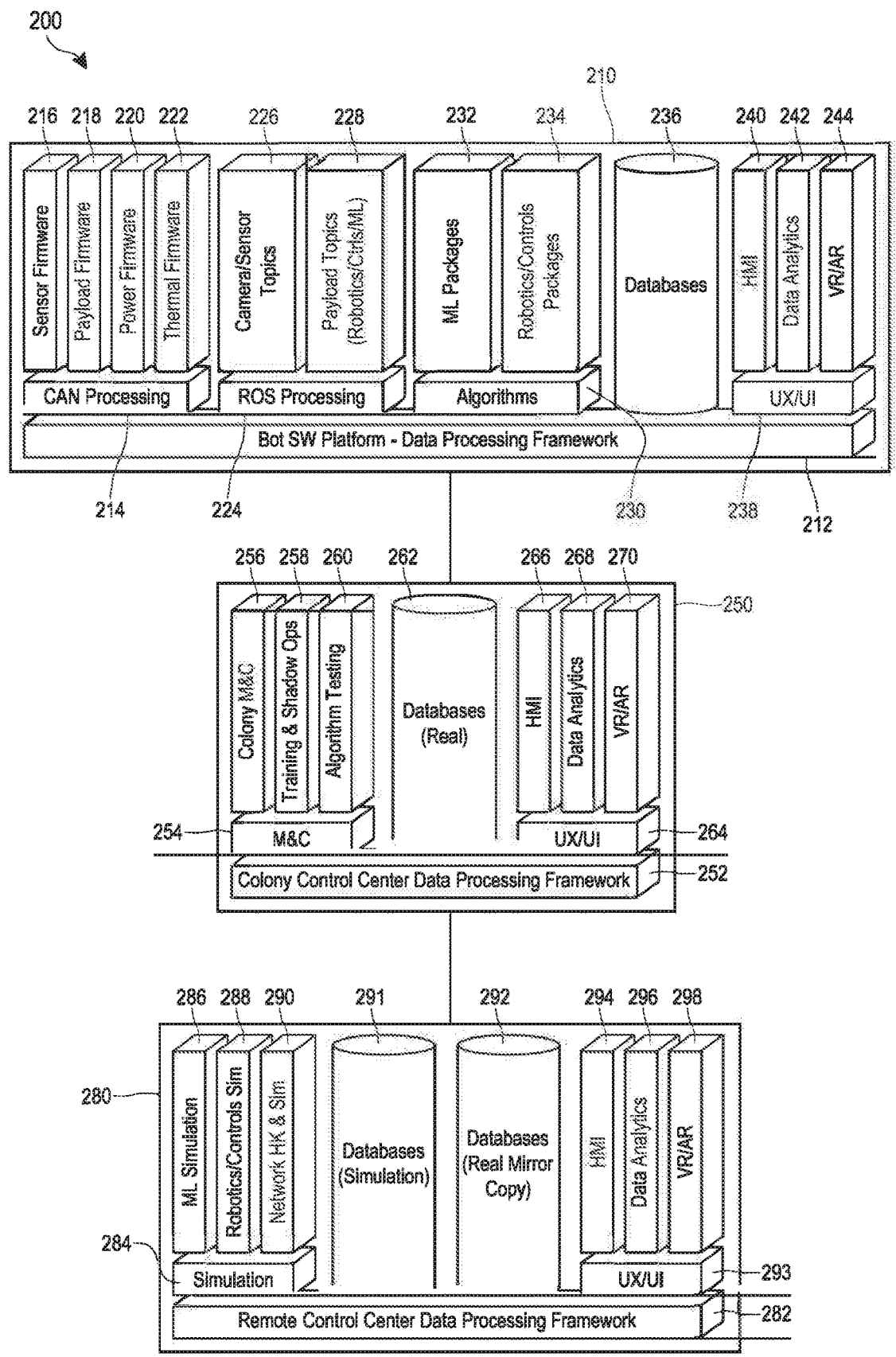
FIG. 2 is a block diagram of an embodiment of a remote control center, a colony control center, and a robotic software platform, that may be used with the system of FIG. 1.

B. Swarm Robotic Architecture—Example Hardware/Software for Remote Control Center, a Colony Control Center, and an Industrial Bot FIG. 2 is a block diagram of an example of an industrial robotic system 200. The industrial robotic system 200 may include a bot software platform and control center architecture, as further described. The industrial robotic system 200 may have the same or similar features as the industrial robotic system 10 of FIG. 1, and vice versa. FIG. 2 shows block diagrams for the industrial robotic system 200 including a remote control center 280, a colony control center 250, and one bot 210 of the plurality of bots deployed in the colony, that may also be used with the system 10, and that may have the same or similar features as respectively the remote control center 100, the colony control centers 112, 142, 173, and the bots 116, etc. of FIG. 1, and vice versa.

The bot 210 is shown as a block diagram with various modules. For each bot or "species" of bot, a configuration of hardware and software modules required for the specific universal and payload stacks (e.g., payload-specific tools or sets of tools) may be generated so that the bot may be assembled at the hardware and software level. All systems may be modularized so that simplicity in the hardware and software functional assembly is persistent across species of bots. Standard interfaces may be implemented so that integration overhead is minimal for structural, power and data interfaces. In some implementations, universal interfaces may control the data, power and consumables flow between modules.

The bot 210 includes a processor 212, shown as a software processing framework. The processor 212 may be the main structural architecture that manages data processing across the different architectural modules, for example ensuring data integrity, minimal latency, delivery assurance, archiving and visualization. The processor 212 may be in communication with one or more modules for controlling and/or managing the bot 210. As shown, the processor 212 is in communication with a controller area network (CAN) processing module 214. The CAN processing module 214 interfaces with firmware controllers for those hardware modules integrated in the CAN bus. As shown, the CAN processing module 214 interfaces with sensors firmware 216, payload firmware 218, power firmware 220, and thermal firmware 222.

In some implementations, the underlying data processing architecture may include a data management module. The data management module may include an open source, in-memory data structure store, used as a database, cache and message broker, such as a redis database. The data management module may include interfaces and APIs configured to transact operations and telemetry with the CAN, the robot operating system (ROS), and other processing frameworks in the bot 210. The architecture may also include a human machine interface (HMI) to operate robot missions, an injector to an influx DB relational database or equivalent to visualize operational data in. The processing/HMI architecture may follow a server/client architecture design, for example so that multiple bot clients may be visualized concurrently in the colony control center 250 and/or remote control center 280.

The processor 212 is further in communication with a robot operating system (ROS) processing module 224. The ROS processing module 224 interfaces with one or more processing modules for sensors and packages integrated into the ROS. As shown, the ROS processor 224 is in communication with sensor modules 226, shown as Camera/Sensor Topics, and payload modules 228, shown as a Payload Topics (robotics/controls/machine learning).

In some implementations, the payload modules 228 may include a Robotic Saw or robosaw module. The Robotic Saw or robosaw module may be used to control a saw or saw-like tool for material cutting, such as with a digger bot. The Robotic Saw or robosaw module may be configured for the autonomous robotic operation of a saw, such as a commercial off the shelf saw or custom saw. The Robotic Saw or robosaw module may be configured to control a robotic arm integrated with a saw. The Robotic Saw or robosaw module may include software packages, scripts and files to operate the saw, including the control systems to adjust the operation based on feedback loops using force, power, RGBD camera, and/or other inputs.

In some implementations, the payload module 228 may include a Robotic Chisel or robochisel module. The same or similar features as described for the robosaw module may apply to the robochisel module but for operation of a chisel or chisel-like tool for material excavation or demolition, such as with a digger bot. The robochisel module may be configured to autonomously control a chisel or similar tool for removing rock, concrete, or other materials in the course of mining, constructions, and other contexts to which the architecture and bots are applied. The robochisel module may include software packages, scripts and files to operate the chisel, including the control systems to adjust the operation based on feedback loops using force, power, RGBD camera, and/or other inputs. A robotic arm attached to the chisel may also be controlled.

The processor 212 is further in communication with an algorithms processing module 230. The algorithms processing module 230 is in communication with an artificial intelligence module 232, shown as machine learning (ML) packages, and a controls module 234, shown as robotics/controls packages. In some implementations, the robotics, controls and ML Packages may be directly embedded in the main processing framework in Python or C++.

Artificial intelligence (AI), such as machine learning, may be persistent throughout a colony. Artificial intelligence may be implemented by means of robust robotic and controls algorithms and machine learning, e.g. reinforcement learning, deep reinforcement learning, and/or other methodologies. Machine learning agents may be embedded at the bot, squad and/or colony levels. The squads as a whole, and/or the colony as a whole, may behave as a swarm driven by intelligent decision making performed at every level in the colony.

In some implementations, the bot 210 may include a quadrant manager module. The quadrant manager module may be part of the artificial intelligence module 232, the controls module 234, or other modules. The quadrant manager module may be configured to autonomously break down an image collected by the bot of the topography of an excavation panel into contiguous individual panels for excavation. The quadrant dimensions may be configurable based on operator input.

In some implementations, the bot 210 may include a targeter module. The targeter module may be part of the artificial intelligence module 232, the controls module 234, or other modules. The targeter module may include ML or other AI algorithms for the use of various tools or combinations thereof, such as robot arms and/or demolition hammers, to intelligently target the regions in the panel to excavate/demolish.

The processor 212 is further in communication with one or more databases 236. The database 236 may be a memory where data is stored. Data processing framework configuration data, real time operational data, and/or other data may be stored and archived in the one or more databases 236 for real-time operations, post-processing, visualization, etc. In some implementations, one or more of the databases 236 may be remotely located from the bot 210, such as at the colony control center 250 (identified as 262) or with the colony communications network.

The processor 212 is further in communication with a user interface module 238. The user interface module 238 is in communication with a human-machine interface (HMI) module 240, a data analytics module 242, and/or a virtual reality/augmented reality (VR/AR) module 244. These and/or other modules may enable a user to access the bot 310 to monitor and control the bot 310 and/or a colony. The user interface module 238 may be accessed directly in an on-board processor or remotely via a virtual private network (VPN) or secure encrypted connection.

The bot 210 may transmit data, for example via a colony communications network such as a wireless ad-hoc network, to the colony control center 250, for example for monitoring and support of the bots 210 and/or a colony. The data may be monitored and managed in whole or in part by human operators performing supervisory control of the operations.

At the colony control center 250, additional software modules are integrated. The colony control center 250 includes a processor 252, shown as a data processing framework, in communication with a management and control (M&C) module 254, a database 262 and a user interface module 264. The M&C module 254 is in communication with a colony M&C module 256, a simulation module 258 shown as a training and shadow operations module, and an algorithm testing module 260. The M&C module 254 monitors and controls any hardware and software infrastructure required for the operation of the colony control center as well as the colony (control center computers, antennas, servers, databases, colony wireless network devices, etc.). The Training and Shadow Operations module 258 supports operator training and enables colony shadow operations to train and/or test new functionality without disruption to colony real-time operations. The Algorithm Testing module 260 performs simulations of the colony operations in a virtual environment or in a test squad of the colony to verify performances, optimize operations and test upgrades before promotion to the entire colony.

The user interface module 264 is in communication with a human-machine interface (HMI) module 266, a data analytics module 268, and a virtual reality/augmented reality (VR/AR) module 270, which may have the same or similar features respectively as the HMI module 240, the data analytics module 242, and VR/AR module 244. In some implementations, the module user interface module 264 is able to monitor and support a plurality of bots, as opposed to only a specific bot as in 240, 242 and 244, organized by species, squads, status or in any other meaningful way that may enhance the operator's colony situational awareness. The various modules of the user interface module 264 may support different types of interfaces for enhanced situational awareness. In some implementations, a user interface supported by the user interface module 264 may be the only interface between humans and the colony 250. The colony control center 250 may include one or more tele-operator computers deployed on site, up to a multi-site, multi-computer, multi-tele-operator control center 250. Thus the control center 250 may be partially or wholly co-located or partially or wholly distributed.

In some implementations, such as in initial or partial deployments of one or more squads of the bot 310 to conventional sites, humans may interact with the bots 210 in support roles, for example providing other functionality not addressed by respective bots. Planned and unplanned maintenance may be performed by humans in these instances, instead of the bots 210 that are configured for service.

The colony 250 may transmit data to the remote control center 280. The colony 250 may transmit data via terrestrial or satellite communication networks. At the remote control center 280, humans may monitor the swarm performance across colony sites, support the different colonies during contingencies and exception management, perform training, and develop and test new functionality in simulations, among other tasks. In some implementations, the bots may create a wireless network all by themselves and use a peer to peer relay of data throughout this network across to a control center co-located with the colony or otherwise not located remotely.

The remote control center 280 may include a processor 282, shown as a data processing framework. The processor 282 is in communication with a simulation module 284, a simulation database 291, a real mirror copy database 292, and a user interface module 293. The simulation module 284 is in communication with an ML simulation module 286, a robotics/controls simulation module 288, and a network housekeeping and simulation module 290. The simulation module 284 and its components may perform simulations in a virtual environment of new ML, robotics/controls and network functionality based on data collected from the different deployment site colonies. The collected data from different independent colonies may be used to identify patterns of behavior and performance optimizations across the different colonies based on individual or collective behavior for one or all colonies. The user interface module 293 is in communication with an HMI module 294, a data analytics module 296, and a VR/AR module 298, which may have the same or similar features respectively as the HMI module 266, the data analytics module 268, and VR/AR module 270, and vice versa.

In some implementations, the remote control center may include a remote communication system, a command and control system, and/or a user interface. The remote communication system may be configured to receive all data from the colony control center and transmit update data to the colony control center via a remote communications network. The command and control system may include one or more computers, servers, switches, databases, etc. configured to monitor, control, process, store and update the colony data. The user interface (e.g. displays, HMI, AR, VR, etc.) may be configured to enable a user to remotely monitor and control the colony and/or colony control center.

The colony control center 250 may include a colony communications network/communications system. The colony communications network/communications system may receive data of various types from any number of bots, squads, platoons, colonies. The command and control system may be supervisory and analyze the incoming data (among other tasks) and generate update data based thereon to achieve a general objective. The update data may include revisions to existing commands, priorities, behaviors, missions, plans, tasks, operational thresholds, virtual fences, environmental data (e.g., rainfall, temperature, etc.) and/or general high-level operating instructions. As an example of update data, a stop order, such as "cease all operations until go order is given," may be sent to the bots and/or other nodes of the system, due to an anomaly, like a mine cave-in or mine shutdown or emergency on construction site. As another example, the bot mission area maybe updated from one designated mine quadrant or panel to another, such a with the command "find another suitable area instead of the current one." As another example, the bot mission area may be updated from mining gold to silver, such as "go find silver instead of gold." As another example, the system may be instructed to speed up or slow down task/behavior rate due to an interface with a human process step, such as "slow down excavation by 10% so the human process step of supervisory inspections can keep up." As another example, tele-operational data may be instructed that allows a user to guide/drive a bot around a construction site, for example, using an interface for a tablet, mobile phone, laptop, etc. These and other kinds of update data may be communicated to any number of bots, squads, platoons, and/or colonies via the colony communications network/communications system. Communication of the update data may be continuous (e.g., not serial). Communication of the update data may occur in real-time, with an infinite number of parallel streams being communicated, multi-directionally.

The overall control system may be distributed, such that a single node in the system is not responsible for the overall control of the architecture. The control system may be distributed across any number of bots, squads, platoons, colonies and/or other nodes. The colony control center may not be a direct "command and control" type of system, but instead a "supervisory guidance" system, where general directions are provided and the system determines the best way to complete those general directions. The "industrial objective(s)" may be an example of an overall supervisory guidance provided. More specific guidances may be provided to help achieve any specific industrial objectives and may include revisions to existing tasks, behaviors, missions, plans. Examples of industrial objectives or tasks thereof may include supervision to locate and chisel a wall with soft rock hardness, to move away from rock above a threshold rock hardness, to find softer rock and/or a particular type of rock, to determine a size and shape for a virtual geo-fence within which to operate, other suitable supervisions, or combinations thereof.

In certain implementations, there is no one, single control center that performs the supervisory guidance provided by the control center 250 (e.g., the "supervisory guidance" described herein). The control center 250 may be distributed among and be formed by the collective of all the bots, nodes, network centers, etc. Some embodiments may use "edge" computing where it happens at each node in a system. Edge computing may include a distributed computing paradigm that brings computation and data storage closer to the location where it is needed, for example to improve response times and save bandwidth.

The divide and conquer approach to swarm operations described herein may include a system where a single organism does not have to do everything nor be only one size. The specialization allows for each bot to do one or a select number of tasks proficiently. It may thus be easy to train on one function where there is a flexibility in collaboration of functions. The system may allow for rapid reconfiguration of the weighting of each function to respond quickly to changes or progress in the execution of a particular industrial objective. These may manifest in various ways, e.g., not only changing the functions of each bot as needed but adapting and improving and especially right sizing the workforce to the size of the job permanently, so that there is never an overcapacity.

Figure 3A:
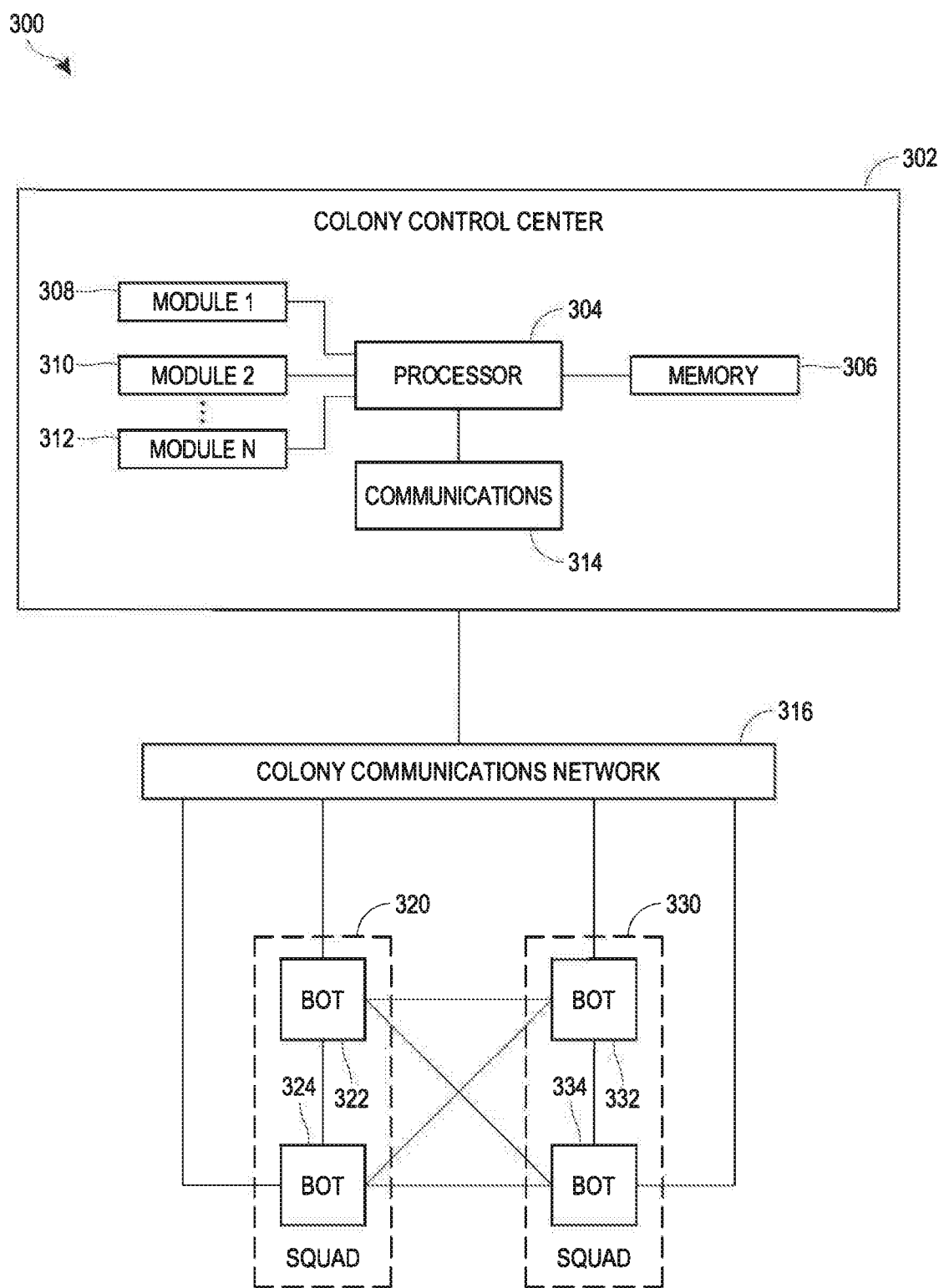
FIG. 3A is a block diagram of an embodiment of an industrial robotic system, including a colony control center, a colony communications network, and a plurality of robotic squads having a plurality of industrial robots configured for performing various industrial-specific tasks, that may be used with the system of FIG. 1.

C. Swarm Robotic Architecture—Example Hardware/Software for Colony Control Center and Squads of Industrial Bots FIG. 3A is a block diagram of an example of an industrial robotic system 300. The system 300 may have the same or similar features or functions as the systems 10, 200, and vice versa. The system 300 may be used with the systems 10, 200. The system 300 may be used as the colony 250 or colonies 110, 140, 170. The system 300 may be a stand-alone system used to control one or more colonies. The system 300 may be included as part of a larger system, for example where one or more of the systems 300 communicate with a remote control center, such as the remote control centers 100 or 280.

The system 300 includes a colony control center 302, a colony communications network 316, and a plurality of robotic squads 320, 330. The squads 320 and 330 each have a plurality of industrial bots 322, 324 and 332, 334 respectively, that are configured for performing various industrial-specific tasks.

The colony control center 302 includes a processor 304 in communication with a memory 306. The memory 306 may include instructions stored thereon that when executed by the processor 304, perform various methods for monitoring, and supporting the colonies and/or bots. The memory 306 may be co-located with the colony control center 302, or it may be remotely located. There may be multiple memories accessed by the processor 304. There may be more than one processor 304. The colony control center 302, such as the processor 304 or memory 306, may include the features described with respect to the colony control center 250, such as the data processor 282 or database 262 respectively, or the other modules shown in and described with respect to FIG. 2.

The processor 304 is in communication with a communications system 314. The communications system 314 is configured to communicate, e.g. wirelessly communicate, with the squads 320, 330 via the colony communications network 316.

The processor 304 is in communication with various modules 308, 310, 312. The first and second modules 308, 310 may be configured to provide various functions, such as those described with respect to the colony control center 250 of FIG. 2. There may be any number "N" of the modules, as indicated by the module N 312.

The squads 320 and 330 each include two bots 322, 324 and 332, 334 respectively, as shown. As mentioned, the squads 320, 330 may each include any number of the bots, from 1 to N. Further, there may be any number of the squads 320, 330. The squads 320, 330 and bots 322, 324, 332, 334 may have the same or similar features as the squads and bots, respectively, as shown in and described with respect to FIG. 1.

The squads and/or bots may be in communication with one another. As shown, the squad 320 is in communication with the squad 330. The squad 320 may be in communication with the squad 330 via the colony communications networks. The squads 320, 330 may be in communication with each other via one or more bots of each squad 320, 330.

As shown, each bot is in communication with every other bot. Thus, the bot 322 is in communication with the bots 324, 332, 334, the bot 324 is in communication with the bots 322, 332, 334, the bot 332 is in communication with the bots 322, 324, 334, and the bot 334 is in communication with the bots 322, 324, 332. Further, each of the bots 322, 324, 332, 334 is in communication with the colony communications network. Any combination of these various communication pathways may be implemented. The combination may change as industrial tasks or objectives are completed, as the bots move around within a colony, due to maintenance or repair, etc. In some implementations, there may not be a colony communications network 316, for example where one or more of the bots communicate directly with each other and the colony control center 302 by means of hardware and software directly implemented in the bots.

Figure 3B:
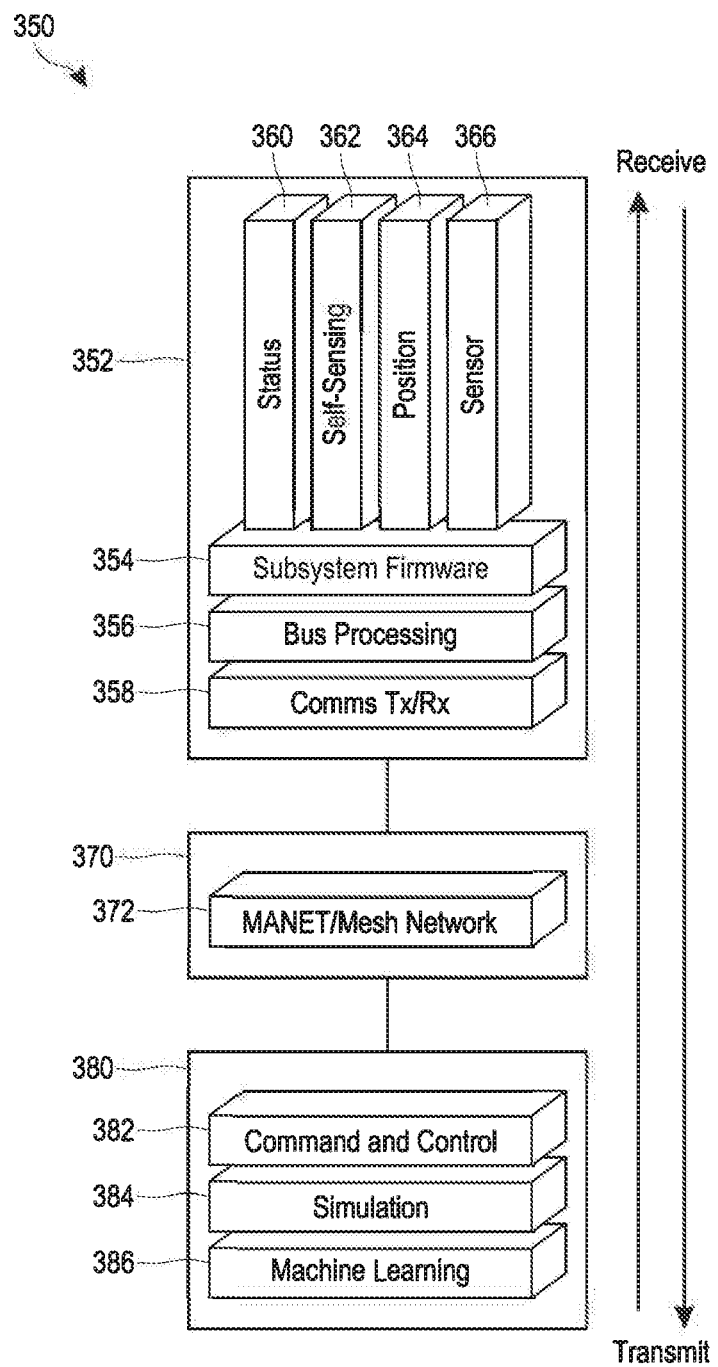
FIG. 3B is a block diagram of an embodiment of a colony control center, a colony communications network, and an industrial robot, that may be used with the systems of FIGS. 1 and 3A.

FIG. 3B is a block diagram of an example of an industrial robotic system 350. The industrial robotic system 350 may be used as the industrial robotic system 300 of FIG. 3A, and vice versa. The industrial robotic system 350 may have the same or similar features and/or functions as the industrial robotic system 300 of FIG. 3A, and vice versa. The industrial robotic system 350 includes a colony control center 380, a colony communications network 370, and an industrial bot 352, which may be used as, and/or have the same or similar features and/or functions as, respectively the colony control center 302, the colony communications network 316, and one or more of the bots 322, 324, 332, 334.

The bot 352 includes a subsystem firmware 354. The subsystem firmware includes an operations module 360, a status module 362, a position module 364, and a sensor or sensor module 366. Subsystem data may be generated in the bot subsystem firmware and analyzed using the various modules. The operations module 360 may analyze subsystem data that includes data related to operational status of the bot 352, such as mining subsystem data, for instance excavation parameters, etc. The status module 362 may analyze subsystem data that includes data related to bot system housekeeping, temperature, fault status, etc. The position module 364 may analyze subsystem data that includes data related to bot geo-location, relative subsystem position such as positions or orientations of articulated components such as arms, legs, tools, etc. The sensor module 366 may analyze subsystem data that includes data related to video and data streams.

The bot 352 includes a bus processing system 356. The bus processing system 356 is the platform bus that distributes the data for subsequent operation. The bus processing system 356 may process the data based on application of a swarm algorithm to the firmware data received from the subsystem firmware 354 of the bot 352. The data may be received from the bot 352 and/or from other bots, such as neighboring bots, bots within the same squad and/or colony. The data may be received from one or more control centers, such as the colony or remote control centers, and may be via one or more of the communication networks described herein.

The bot 352 includes a communications system 358. The communications system 358 may be configured to transmit and receive the various data from and to the bot 352. The communications system 358 may package the data for transmission. The communications system 358 may relay data received, for example data received from neighboring bots. The communications system 358 may identify and/or decommutate relevant data received for processing by the bus processing system 356. The communications system 358 may communicate with the colony communications network 370.

The colony communications network 370 is in communication with the bot 352. Various approaches to the communications network may be implemented, as described herein. As shown, the colony communications network 370 may include a MANET/Mesh network. The colony communications network 370 may transmit data packets hopping from bot to bot with a squad to neighboring squads, for example from the squad 114 to the squad 122 such as via respectively the bots 116, 118 and/or 120 to the bots 124, 126 and/or 128 (see FIG. 1). The data may be transmitted from the bot 352, to the colony communications network 370, and to the colony control center 380. The data may be received by the bot 352, from the colony communications network 370, which may receive the data from the colony control center 380.

In the context of industrial mining operations, such data transmission may be from one or more bots 352 within a mine shaft (vertical, inclined, helix or other geometry), stope, panel, tunnel or equivalent, to one or more bots 352 within a neighboring or access shaft (vertical, inclined, helix or other geometry), stope, panel, tunnel or equivalent all the way to the surface to the colony control center 380 by means of communications from bot to bot and/or via the communications network 370. The colony control center 380 may communicate via terrestrial or satellite relay communication networks to a remote control center. In some implementations, the transmit and receive paths as shown in the figure may require a much larger bandwidth at the mine site. Cable or communication bots may be deployed at the mine shaft (vertical, inclined, helix or other geometry), stope, panel, tunnel or equivalent to increase bandwidth. Further details of example use of the systems in mining operations are provided herein, for example with respect to FIGS. 7A-7E.

The colony control center 380 includes a command and control module 382. The command and control module 382 receives the data and processes the data for storage in a big data storage system. The command and control module 382 may provide a visual user interface for user services, such as control and monitoring, for testing and updating, such as algorithm and other system updates/upgrades, and network enterprise management, such as infrastructure elements at the control centers and as needed at a colony such as at a mine site. The command and control module 382 also sends data to the colony, such as to a mine site, for example commands, updates, and upgrades.

The colony control center 380 includes a simulation module 384. The simulation module 384 generates virtual worlds based on the big data stored by the command and control module 382. The simulation module 384 may create parallel scenarios for further robotic controls and machine learning assessment to refine and optimize operations.

The colony control center 380 includes a machine learning module 386. The machine learning module 386 refines, updates, and upgrades swarm algorithms (controls or machine learning based) to improve functionality and productivity. The machine learning module 386 may promote new or updated algorithms, after they are analyzed and deemed ready through amongst other methods the simulation module 384, to the command and control module 382 to be transmitted to the bot 352, for example to the bus processing system 356, for improved operations.

Data may be transmitted/received to/from the bot 352, the colony communications network 370, and the colony control center 380. Various approaches to the communications networks describe herein may be implemented. The colony communications network 370 or 316, the remote communications networks, bot-to-bot direct communications, and other communications systems used in the overall system may use a variety of different approaches or combinations thereof.

In some implementations, networking is accomplished by means of a mobile ad-hoc network. It may be a fixed network. The network may be set up by humans, or by one or more of the bots. All or some data transfer may be supported at the bot, squad and/or colony level of the architecture.

Each bot may include a data packet bot node subscription. Each data packet may have a header that provides identification information related to the bot, squad, platoon and packet type. Neighboring bots within a squad may subscribe to, receive, process, and transmit data packets necessary for swarm behavior. Neighboring squads within a colony, such as within platoons, may subscribe to, receive, process, and transmit data packets necessary for mid-scale situational awareness, such as at the squad level. Neighboring platoons within a colony may subscribe to, receive, process, and transmit data packets necessary for mid-scale situational awareness, such as at the platoon level. Neighboring colonies may subscribe to, receive, process, and transmit data packets necessary for macro-scale situational awareness, such as at the colony level.

The communications network may evolve as the systems are implemented and used. In some implementations, for example in initial or partial deployments at conventional sites, the network may be established through fixed infrastructure by humans. For more mature colonies, the ad-hoc network grid may be established by bots with networking payloads. The network may be dynamically updated so that high density operation regions in the colony, for example at a particular deployment, site are supported at all times with the required bandwidth, etc. A manned control center, such as the colony control centers described herein, may be deployed at the colony site and may be the only human interface to the bots. The colony control center may be connected to bots in the colony through the colony communications network. The colony control center may also be connected to a remote control center, for example located offsite, via satellite or terrestrial networks. The colony control center may be where humans perform monitoring and exception management as well as other offline support functions.

The remote control center, for example the remote control center 100, may be a central repository of the data generated by all colonies. The remote control center 100 may optimize performance of the system 10, for example performance of individual colonies. Such optimization may be accomplished through the development of new functionality driven by machine learning and/or using robotics and controls algorithms run in simulation. Once new functionality is ready for deployment, the remote control center releases the functionality to the target colonies. The algorithms may be tested in localized simulation, or in real operations in selected areas of the colony before being promoted to real time operations.

D. Industrial Robot—Example Computing Hardware for Industrial Bot

Figure 4:
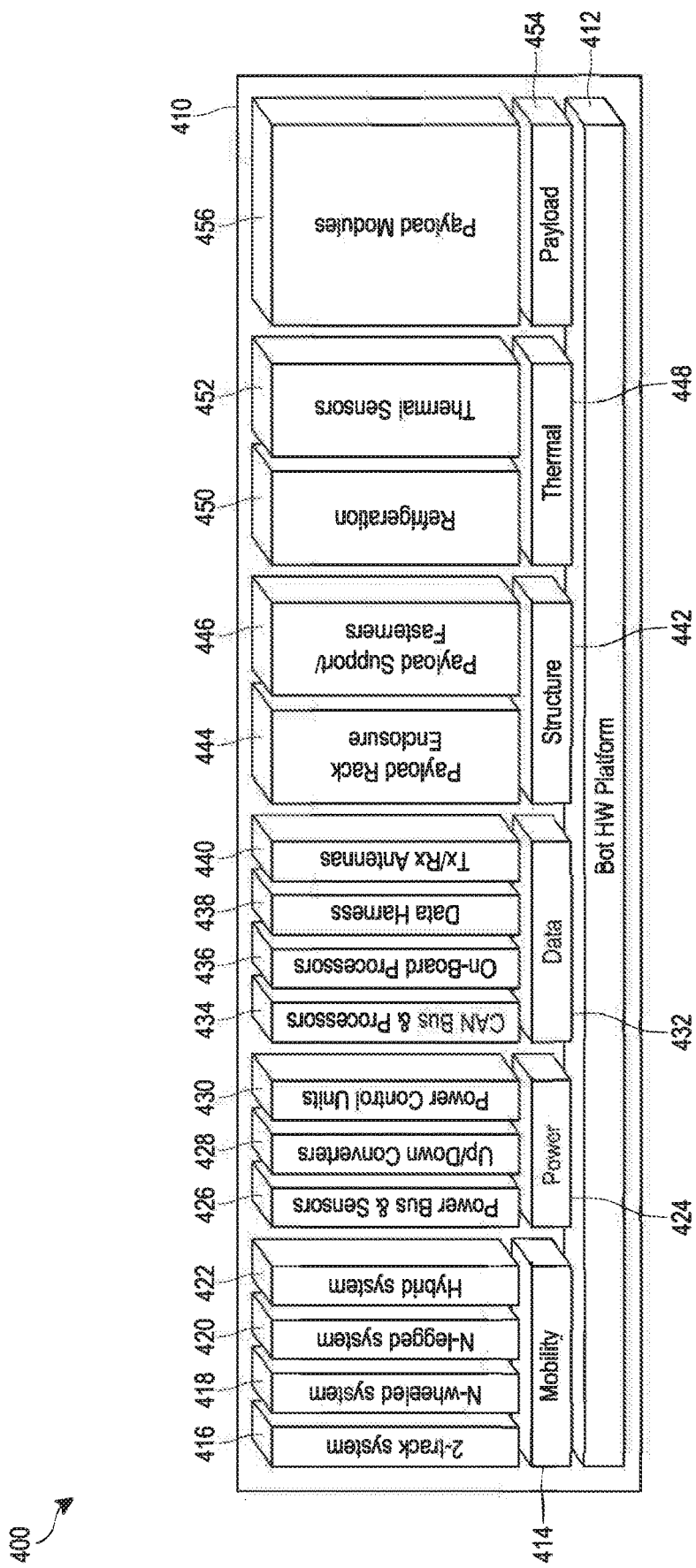
FIG. 4 is a block diagram of an embodiment of a robotic hardware platform that may be used with the systems of FIGS. 1-3B.

FIG. 4 is a block diagram of an example of a bot 400. The bot 400 may be used with any of the various systems described herein, such as the systems 10, 200, 300, 350. The bot 400 may have the same or similar features and/or functions as the bots shown in and described with respect to these other systems 10, 200, 300, 350 in FIGS. 1-3A, and vice versa, and the robotic hardware platform that may be used with the systems of FIGS. 1-3B.

The bot 400 includes an overall hardware platform 412. The hardware platform 412 integrates hardware subsystems, each of which may include subsystem and structural hardware, computer hardware, and/or software that may be architected as described in 210.

The bot 400 includes a mobility platform 414. The mobility platform 414 may include one or more of the following: a 2-track module 416, an N-wheeled module 418, an N-legged module 420, and a hybrid module 422. The hybrid module 422 may include a combination of tracks, wheels and/or legs. The mobility platform 414 is configured to be operated to cause the bot 400 to move, such as by commanding an actuator to move the track, wheel, leg, etc. The various mobility modules are dedicated to moving the bot 400. Different types of modules may be integrated with the universal platform structural frame.

The bot 400 includes a power platform 424. The power platform 424 may include one or more of the following: a power bus and sensor module 426, a voltage/current up/down converter module 428, and one or more power control modules 430. The various power modules may include power buses and/or wiring harnesses, controllers and hardware to supply power to the different hardware modules at the right voltage and with the necessary protections against over/under currents, shorts, and electro static discharge (ESD).

The bot 400 includes a data platform 432, shown as a bus. The data platform 432 may include one or more of the following: a CAN bus and processors module 434, one or more on-board processor modules 436, a data harness module 438, and one or more antenna modules 440 for transmitting and/or receiving communication signals. The data platform 432 may be a CAN, UDP, RS232, TCP/IP or equivalent, or a combination of the above type bus. The various data bus modules may include data processing controllers and firmware, an on-board processor required to control and operate all modules in the bot 400, and/or communications components such as an antenna to transmit and receive data.

The bot 400 includes a structure platform 442. The structure platform 442 may include one or more of the following: a payload rack module 444 such as an enclosure, and a payload support module 446. The structure platform 442 may provide a universal platform configured to support a variety of different task-specific payloads, such as different tools used for specific tasks for achieving an industrial objective. The structure platform 442 may include a payload rack enclosure, such as a flat bed with side walls and cover, in or with which the other modules, such as the payload and universal modules, may be integrated and enclosed, for environmental control, etc.

The bot 400 includes a thermal platform 448. The thermal platform 448 may include one or more of the following: a thermal management module or set of modules 450 shown as a refrigeration module, and a thermal sensor module 452. The module 450 may be a heating module. The thermal sensor module 452 may include a variety of thermal sensors providing data related to temperature of various components of the bot 400 that the thermal management module 450 may use to increase or decrease heating or cooling to the various components. The various thermal modules may include heating or cooling units, pipes or conduits, and/or thermal sensors required to thermally control the hardware modules of the hardware platform 412.

The bot 400 includes a payload platform 454. The payload platform 454 includes one or more payload modules 456. The payload modules 456 may include one or more payload tools that may or may not be collocated on the same structure, for performing one or more specific industrial tasks. Each tool may be used for performing a specific industrial task, which in collaboration with other bots 400 performing other specific industrial tasks, may be performed to achieve an industrial objective, for example mining, as further described herein. The various payload modules may be integrated with the universal platform stack to fulfill the specific task for that payload.

In some implementations, the bot 400 may include a universal platform that comprises a robotic hardware platform. The robotic hardware platform may include a structural frame configured to support the universal platform and payload stacks/tools. The robotic hardware platform may include the mobility platform 414 coupled with the frame and configured to move the bot 400. The robotic hardware platform may include the power system 424 configured to power the mobility platform 414 and the payload platform 454. The robotic hardware platform may include the thermal system 448 configured to thermally control the universal and payload stacks. The robotic hardware platform may include the data processing system 432 configured to control the universal and payload stacks. The robotic hardware platform may include the antenna module 440 configured to transmit first data from, and receive second data to, the bot 400. The robotic hardware platform may include a data bus configured to interface with the data processing system 432.

In some implementations, the bot 400 may include a universal platform that comprises a robotic software platform. The bot 400 may include the hardware and software platforms. The robotic software platform may comprise of the modules described in the bot 210. The robotic software platform may comprise of a controller layer having firmware configured to operate the universal and payload stacks using universal and payload control algorithms. The robotic software platform may comprise an architecture stack including one or several data protocol layers configured to monitor data from the universal and payload control algorithms and to transmit the data to the hardware firmware controllers. The robotic software platform may comprise a robotic control algorithm layer dedicated to control, monitor and operate the universal and payload hardware to perform the bot-specific robotic task. The robotic software platform may comprise a database system, for supporting software packages and components dedicated to support the operation of the system and configured to store and process the system operational data.

FIGS. 5A-5D are schematics of various bots that may be used with the systems and methods described herein, such as the systems and methods shown and described with respect to FIGS. 1-4. Further, the systems and methods described herein are applicable to a variety of different industrial tasks and objectives. Various example examples are described herein with respect the mining industrial task. The systems and methods may be used for other industrial tasks such as construction, manufacturing, demolition, satellite swarms, fuel production, disaster recovery, communications, remote power, and others, deployed terrestrially on-land and underwater, in free space, on the Moon, Mars and other celestial bodies.

In some implementations, the systems and methods may be used for swarm robotic mining (SRM). SRM may refer to the application of a swarm robotic architecture concept, such as the systems and methods shown and described with respect to FIGS. 1-4, to the mining industrial task. The SRM colony may include functional squads that perform the end-to-end mining function. The primary squad may be the mining squad, which may include multiple "species," as further described. The functional squads may be grouped in platoons, where squads of the same or different function are grouped based on the topography of the site and economic performance metrics defined for the colony.

The mining squad may be used to replace drill-blast-mine and primary concentration function of conventional mining approaches. No macro-blasting may be required. Instead, the swarm squads deploy in the mine panels to pre-condition and excavate rock through the use of different payload technologies optimized for ultra-precision mining. Mining is followed by in-situ concentration of the material by means of crushing it into fine particulate concentrate that can be moved out of the mine or fed into a fluidized bed for in-situ flotation of the material. The flotation product is either hydro-hoisted, conveyed or transported by sweeper/hauler bots out of the mine.

In some implementations, and as further described, one or more of the bots may be a digger bot configured to pre-condition and break rock. In some implementations, one or more of the bots may be a crusher bot configured to collect and/or crush the rock. In some implementations, one or more of the bots may be a flotation bot configured to float the concentrated particulate to extract target material. Other filtration approaches may be implemented.

E. Industrial Robot—Example Modular Bot Squads and Species

FIG. 5A is a schematic of an example of a universal platform 500. The universal platform 500 may be used for various types of bots in the mining context, or other contexts. The universal platform 500 may be used with the bot 400, such as the robotic hardware platform 412, of FIG. 4. The universal platform 500 may be used with the bots shown in and described with respect to the systems of FIGS. 1-3B. For example, the universal platform 500 may be used with the bots 114, etc. of the system 10, with the bot 310 of the system 200, with the bots 322, 324, 332, 334 of the system 300, and/or with the bot 352 of the system 350.

The universal platform 500 may provide a single system having uniform structural, computing, and support systems and that is configured to couple with a variety of different interchangeable payloads. In this manner, the various control system architectures shown in and described with respect to FIGS. 1-4 may be used with numerous bots each using the universal platform 500 but having different particular payloads. This allows for mass production of a common bus system, and consequent lower cost, for achieving industrial objectives that require a large number of bots, such as mining, construction, manufacturing, demolition, satellite swarms, fuel production, disaster recovery, communications, remote power, and others, deployed terrestrially on-land and underwater, in free space, on the Moon, Mars and other celestial bodies. The universal platform 500 may have a common mechanical interface for interchangeably attaching to a variety of different payloads, as further described herein.

FIGS. 5B-5D are schematics of various examples of various industrial robotic squads 501, 530, 560 having various payloads configured to perform a bot-specific industrial task. One or more of the squads 501, 530, 560, or other squads, may comprise a combination of the same or different species of bots fulfilling specific industrial tasks, integrated with the universal platform 500 and the systems of FIGS. 1-3B. The following is one example of how the bot species may be grouped in squads and how squads 501, 530, 560 may be configured. There may be any number of bots within the squads 501, 530, 560. Other functions may be provided by other bots within the squads 501, 530, 560 besides those explicitly described herein.

Each bot may include the universal platform 500, having a hardware platform and a software platform, and that has integrated with it specific payload modules to fulfill the bot species function. The universal platform 500 is thus modularized for use with a wide variety of different type of payloads. This modular platform design for the bots allows for many swarm robotic architectural design drivers, such as flexibility, scalability, operability, reliability, robustness, and intelligence. Among other advantages, the design ensures high performance and low cost.

FIG. 5B is a schematic of a first bot squad 501, which in this example is a mining squad. The first squad species 501 includes five different bots, including for example a digger bot 502, a crusher bot 506, a flotation or concentration bot 510, a sweeper/hauler bot 514, and a battery bot 518, each including the universal platform 500 coupled with respectively a digger payload 502, a crusher payload 508, a flotation/concentration payload 512, a hauler payload 516, and a battery payload 520.

FIG. 5C is a schematic of a second bot squad 530, which in this example is a transport squad. The second squad 530 includes seven different bots, including for example a sweeper/hauler bot 532, a pump bot 536, a pipe bot 540, a cable bot 544, an energy bot 548, a power bot 552, and a treasure bot 556, each including the universal platform 500 coupled with respectively a hauler payload 534, a pump payload 538, a pipe payload 542, a cable payload 546, an energy payload 550, a power payload 554, and a treasure payload 558.

FIG. 5D is a schematic of a third bot squad 560, which in this example is a transport squad. The third squad 560 includes five different bots, including for example a service bot 562, a survey bot 566, a builder bot 570, a pillar bot 574, and a communications bot 578, each including the universal platform 500 coupled with respectively a service payload 564, a survey payload 568, a builder payload 572, a pillar payload 576, and a communications payload 580.

The particular squads 501, 530, 560 described herein are for illustration only and are not limiting on the scope of the squads and bots that may be used with the systems and methods of FIGS. 1-4. Various combinations of the bots from the various squads 501, 530, 560 may be implemented for particular tasks, as further described. Additional bots may be included in the squads 501, 530, 560.

There are various uniquely desirable features of the architecture systems and methods using the autonomous bots. For example, the required infrastructure may be minimized, for instance due to fewer humans in the loop. There may be significant reduction in safety costs due to fewer humans. In the mining context, there may be greater ability to access ore bodies that are not currently accessible for economic and other reasons. There may be greater ability to access ore bodies that are not currently accessible by human miners.

As further example, within the mining context, the bot form factor may be optimized based on the ore body and payload requirements, so that the bot may follow the ore body with minimal waste excavation. This approach enables several key advantages over conventional mining. For example, avoiding the need for macro-blasting means less impact to the structural integrity of the mine, leading to less bolting and bracing on the mine structure. Further, conventional mining requires structurally providing access to human miners and heavy machinery. In contrast, the robotic approaches described herein provide for minimal waste rock excavation through bot form factor and ultra-precise mining, which allows for increased productivity and reduced mine structural complexity. Further, in-situ concentration means that the excavated material does not need to be moved out of the mine and trucked into a concentration plant sometimes a large distance away, but rather it may be done on-site reducing material transport complexity. Given that minimal waste rock is excavated, the total volume of rock that is moved is reduced as well. Further, the use of in-situ flotation In some implementations means the excavated rock is further concentrated so that only the target material in the ore is moved out of the mine. This further reduces the total volume of material excavated out of the mine, sometimes to a small fraction of the total excavated ore.

FIGS. 6A-6D are schematics of various examples of various industrial robotic squads 600, 602, 604, 606 each having various industrial bots with various payload tools and together configured to perform a collaborative industrial objective for the respective squad. The squads 600, 602, 604, 606 may be used as the squads shown in and described with respect to FIGS. 1-3B. For example, one or more of the squads 600, 602, 604, 606 may be used as one or more of the squads 114, 122, 130, 144, 152, 160, 174, 182, 190, 320 and 330.

The squads 600, 602, 604, 606 may include any combination of the various bots within the various bot squads 501, 530, 560 shown in and described with respect to FIGS. 5B-5D. The squads 600, 602, 604, 606 may include other bots besides those described with respect to the species 501, 530, 560. The following is thus one example of how the squads 600, 602, 604, 606 may be configured. There may be any number of bots within the squads 600, 602, 604, 606. Other functions may be provided by other bots within the squads 600, 602, 604, 606 besides those explicitly described herein. Further, there may be other squads besides those explicitly described herein.

Figure 6A:
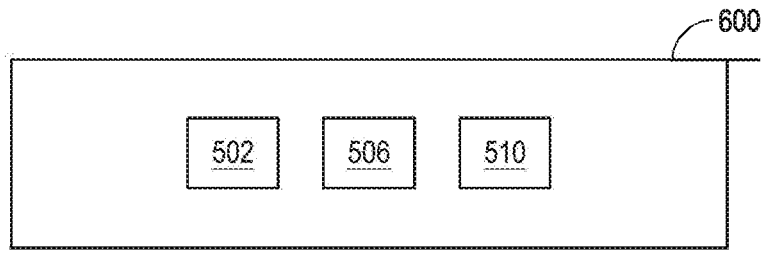
FIGS. 6A-6D are schematics of various embodiments of various industrial robotic squads each having industrial robots with various payload stacks, where each squad is configured to perform a collaborative industrial objective, and that may be used with the universal robotic platform stack of FIG. 5A and systems of FIGS. 1-3B.

FIG. 6A is a schematic of a first squad 600, shown in this example as a mining squad. The first squad 600 includes three different bots, including for example the digger bot 502, the crusher bot 506, and the sorter bot 510, which may be a flotation bot. The first squad 600 may be used, for example, for excavating rock from underground for mining resources therefrom. The digger bot 502 may break rock and dig through rock. The crusher bot 506 may collect the broken rock and crush it for further processing. The sorter bot 510 may collect the crushed rock and sort it for diverting desirable material to one location and undesired material to a second location.

Figure 6B:
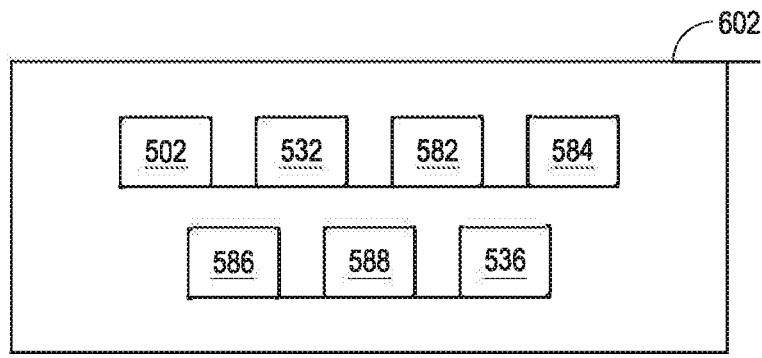

FIG. 6B is a schematic of a second squad 602, shown in this example as a tunneling squad. The second squad 602 includes seven different bots, including for example the digger bot 502, the sweeper/hauler bot 532, a shotcrete bot 582, a welding bot 584, a manipulator bot 586, a bolting bot 588, and the pump bot 536. The second squad 602 may apply the swarm robotic architecture and other systems and methods described herein to the tunnel excavation task. The second squad 602 may be used, for example, for tunneling to form a tunnel into or through a mine site underground. The digger bot 502 may pre-condition and break the rock to excavate the tunnel. The sweeper/hauler bot 532 may collect and transport the excavated rock. The sweeper/hauler bot 532 may sweep up and/or haul away rock dug by the digger bot 502. The shotcrete bot 582 may applies cementitious material to the tunnel, which may be applied with precision.

The shotcrete bot 582 may provide structural reinforcement such as shotcrete to stabilize the mine site underground. The welding bot 584 may provide welding or other structural reinforcement at select locations within the mine site. The welding bot 584 may clean, repair and reinforce rebar. The manipulator bot 586 may be used to manipulate building materials such as beams, bolts, etc. The welding bot and manipulator bot 586 may together perform tunnel reinforcement truss welding. The bolting bot 588 may fasten bolts or other fasteners to secure the structures put up by the other bots. The pump bot 536 may pump out water or other waste, such as debris, unusable materials, etc., out of the tunnel.

Figure 6C:
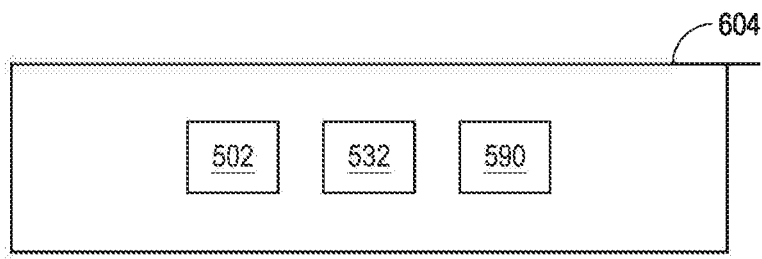

FIG. 6C is a schematic of a third squad 604, shown in this example as a demolition squad. The third squad 604 includes three different bots, including for example the digger bot 502, the sweeper/hauler bot 532, and a suction bot 590. The third squad 604 may be used, for example, for selective bridge deck demolition. The third squad 604 may apply the swarm robotic architecture and other systems and methods described herein to selective bridge deck demolition tasks. The digger bot 502 may saw and break the bridge deck or other structure. The sweeper/hauler bot 532 may collect and transport the demolished deck debris. The suction bot 590 may collects and/or transport away deck concrete slabs, and/or provide suction functions for holding and/or securing various features of the structures that are removed by the third squad 604, for example after a mining operation is completed.

Figure 6D:
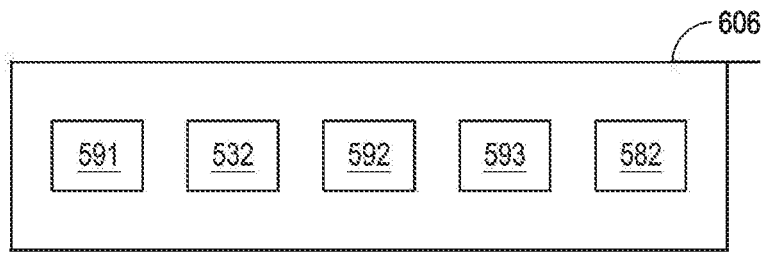

FIG. 6D is a schematic of a fourth squad 606, shown in this example as a repair squad. The fourth squad 606 includes five different bots, including for example a digger and suction bot 591, the sweeper/hauler bot 532, a sandblaster and sprayer bot 592, a rebar repair bot 593, and the shotcrete bot 582. The third squad 604 may be used, for example, for selective bridge column and beam repairs. The third squad 604 may apply the swarm robotic architecture and other systems and methods described herein to selective bridge column and beam repair tasks. The digger and suction bot 591 may raises a chisel or other tool to a column or beam repair area, anchor with concrete suction cups to the column or beam, and selectively chip away exposed or damaged concrete areas. The sweeper/hauler bot 532 may collect and transport chipped concrete. The sandblaster and sprayer bot 592 may removes corrosion and/or apply passivating coating to various structures. The shotcrete bot 582 may apply shotcrete mix selectively to repaired areas for completing repairs.

Other squads and bots may be implemented. Further, the various bots may be fitted with sensors configured to continuously monitor the structural integrity of the tunnel. A survey bot may also be deployed to perform more active survey of the tunnel face to determine potential issues/obstacles prior to excavation, as well as perform precision measurements to ensure proper tunnel orientation and alignment.

In some implementations, additional squads may be used to support the end-to-end mining function for a fully operated SRM mine. For example, a backfill squad may be used that moves the discarded concentrated material to the back of the panel, dealing with material swell and compaction, so it is left behind providing support and minimizing discarded material move once the target material has been transported out of the mine. A service squad may be used that services the robots in the colony. An energy squad may be used that supplies energy to the colony by means of laying out temporary cables and battery banks and swapping robot batteries in each bot. A survey squad may be used that performs mine exploration functions, such as mapping and geotechnical surveying. Additional squads and robotic species may be defined in support of additional functions, such as water supply and piping, networking, etc.

F. Swarm Robotic Architecture—Example Application to Industrial Mining

FIGS. 7A-7E are schematics of various examples of colonies having one or more squads of industrial mining bots performing one or more mining bot-specific industrial tasks to achieve a collaborative mining objective. The systems, methods, and bots shown in and described with respect to FIGS. 1-6D may be used in the colonies of FIGS. 7A-7E. The mining squads may be deployed in shaft (vertical, inclined, helix or other geometry), stope, panel, tunnel or equivalent, based on the mine architecture design, so that each panel has several mining squads operating ensuring no collision or disruption of operations. The particular mining panels shown in FIGS. 7A-7E are merely some examples, and they may include any of the combinations of squads and bots, and associated functions, described herein.

The systems and methods described herein may be used for terrestrial mining, for example surface opencast, open pit and underground mining, for example platinum, kimberlite, e.g. diamond ore, copper and gold mining. The systems and methods may be used for in-situ processing to improve the efficiency of these and other mining operations. Conventional terrestrial mining involves removal of large volumes and masses of waste rock, either from underground or open pit mines. The systems and methods described herein may eliminate the need for the removal of the vast majority of waste rock, thus reducing energy costs significantly, among other advantages.

In some implementations, a digger bot, a sweeper/crusher bot, and a sorter or flotation bot may be used. These and other bots may be small-form factor mining bots that may be mass-produced replace humans at the rock-face in mines. In some implementations, processing may include in-situ metal refining. For example, utilization of molecular separation techniques may be implemented to achieve 99% or more recovery of metals which may take place within a matter of minutes, as opposed to days or weeks. In some implementations, the systems and methods may be used for mining larger materials directly in situ such as nuggets of precious metals and diamonds. such as kimberlite, e.g. diamond ore, copper and gold.

Figure 7A:
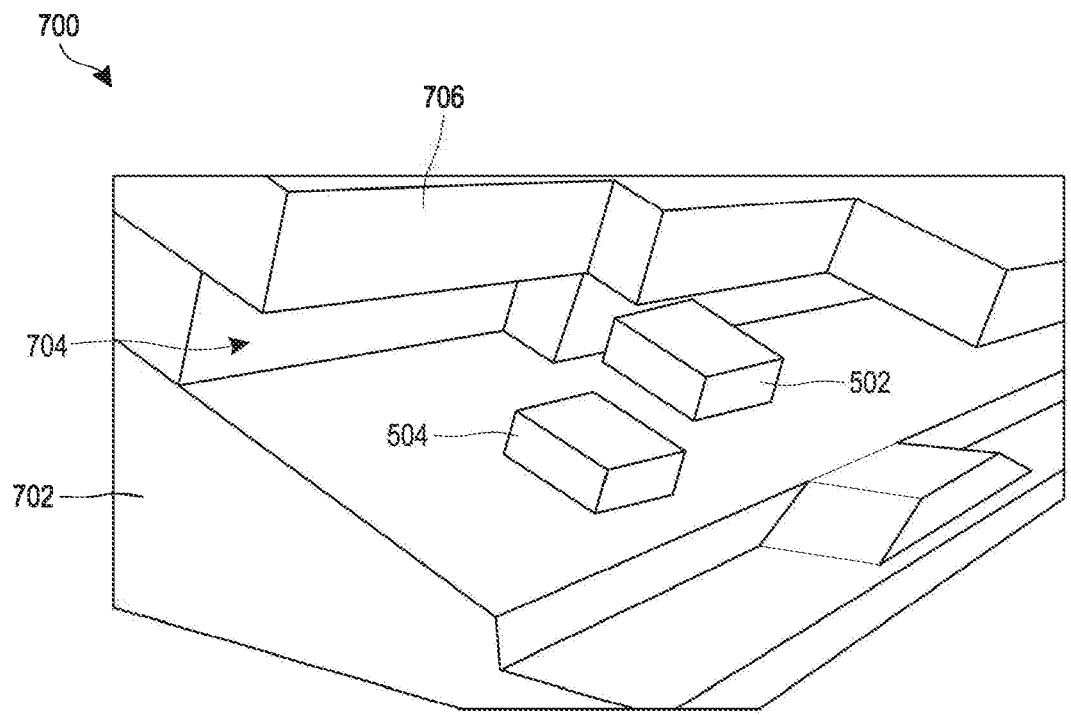
FIGS. 7A-7E are schematics of various embodiments of colonies having one or more squads of industrial mining robots performing one or more mining bot-specific industrial tasks to achieve a collaborative mining objective.

FIG. 7A is a schematic of an example of a colony 700 or portion thereof including a squad comprising the digger bot 502 and the crusher bot 504. The colony includes a mining panel having a rock floor 702, a rock face 704, and a rock ceiling 706. For clarity, only part of the floor 702, face 704, and ceiling 706 are shown. For example, the ceiling 706 may extend over the entire floor 702, etc.

The digger bot 502 and the crusher bot 504 are deployed in the mine. The bot may be deployed in a newly dug mine or in a mine that is already supplying a swarm robotic mining function. The digger bot 502 and the crusher bot 504 may be deployed in mine panels that are sized based on the deposit geometry and economic metrics, which may be driven by the existing mine engineering plan or the swarm mine engineering plan. The digger bot 502 excavates the rock alongside the rock face 704 leaving the excavated material behind so that the crusher bot 504 may collect it. The bots may be deployed individually to perform one of the specified tasks within the conventional process chain, or as an end-to-end system performing all of the tasks in the industrial function autonomously.

The total material excavated at one time before the digger bot 502 moves may be referred to as the "excavation quadrant," which may be defined as the width, height and depth of the rock face 704 excavated at any given time before the bot or bots move to the next location. The excavation quadrant dimensions may be optimized using the systems and methods describe herein, and which may be based on mine performance and economic metrics as well as local topography of the rock face.

Figure 7B:
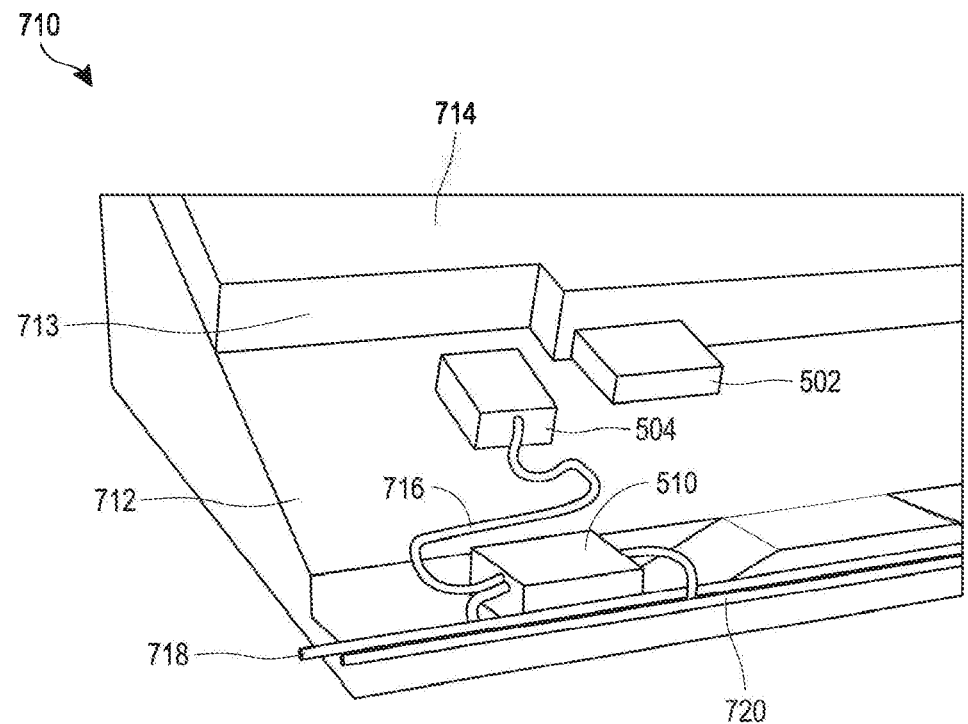

FIG. 7B is a schematic of an example of a colony 710 or portion thereof including a squad comprising the digger bot 502, the crusher bot 504, and the sorter bot 510, which may be a flotation bot. The bots are shown on a rock floor 712 having a rock ceiling 714 and the digger bot 502 digging a rock face 713. The digger bot 502 has moved along the rock face 713 with the crusher bot 504 following behind to crush the broken rock. The crusher bot 504 is connected to the sorter bot 510 via a hose or pipe 716. The crushed rock is transmitted from the crusher bot 504 to the sorter bot 510, for example using a pump or hydro-hoist. The sorter bot 510 beneficiates or concentrates the target mineral to be mined, for example it filters the crushed rock, for example using flotation techniques, to separate desired from undesirable material. Desirable material may then be transmitted along a first hose 718 for further processing. Undesirable material may be transmitted along a second hose or pipe 720 as waste or for other purposes, for example to a collector at the surface, to a location at the back of the panel or in a previously-processed area, etc. The crusher bot may directly input material into the sorter bot instead of using hoses or pipes. An additional bot species, a hauler bot, may collect the material from the sorter bot to move it out of the mine or to a location at the back of the panel or in a previously-processed area, etc.

Figure 7C:
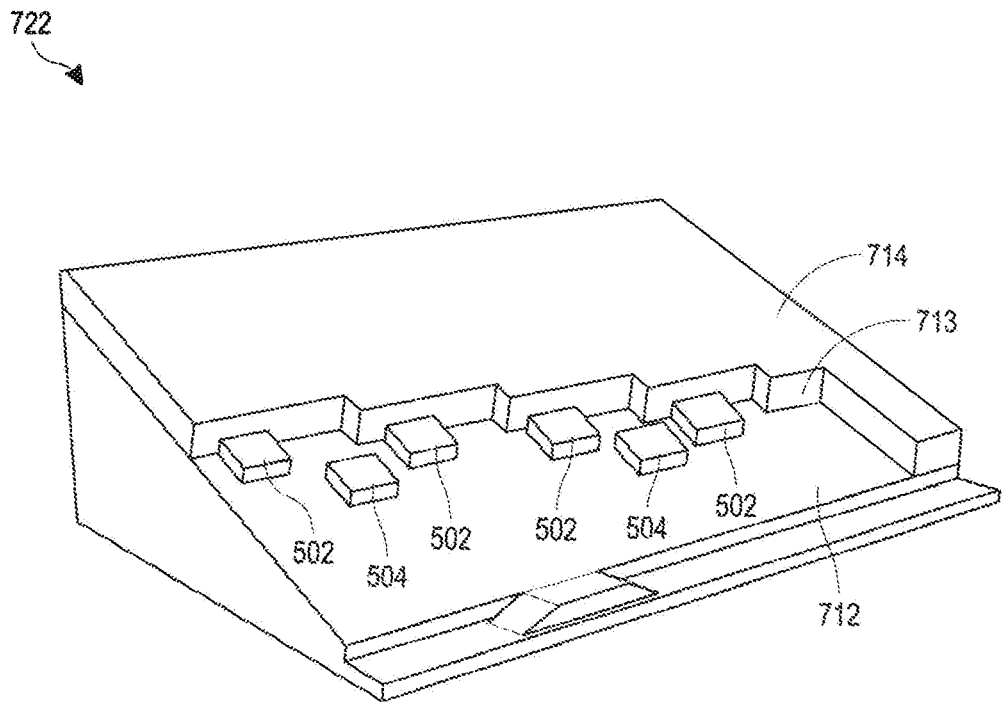

FIG. 7C is a schematic of an example of a colony 722 or portion thereof including a squad comprising multiple digger bots 502 and crusher bots 504. There are four digger bots 502 and two crusher bots 504. There may be any number of the respective bots. One or more crusher bots 504 may service the broken rock from one or more digger bots 502. As shown, a single crusher bot 504 services the broken rock from two digger bots 502. Other combinations may be implemented.

Figure 7D:
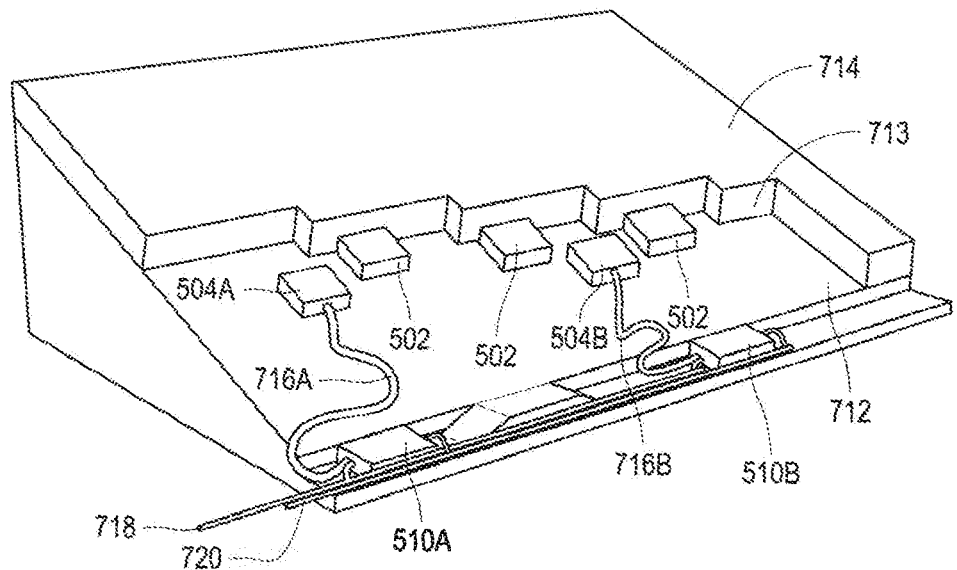

FIG. 7D is a schematic of an example of a colony 724 or portion thereof including a squad comprising multiple digger bots 502, crusher bots 504, and sorter bots 510. As shown, a first crusher bot 504A services the rock broken by the digger bots 502 and is connected to a first sorter bot 510A via a first hose 716A. A second crusher bot 504B services the rock broken by the digger bots 502 and is connected to a second sorter bot 510A via a second hose 716A. The crusher bots may directly input material into the sorter bots instead of using hoses or pipes. An additional bot species, a hauler bot, may collect the material from the sorter bot to move it out of the mine or to a location at the back of the panel or in a previously-processed area, etc.

Figure 7E:
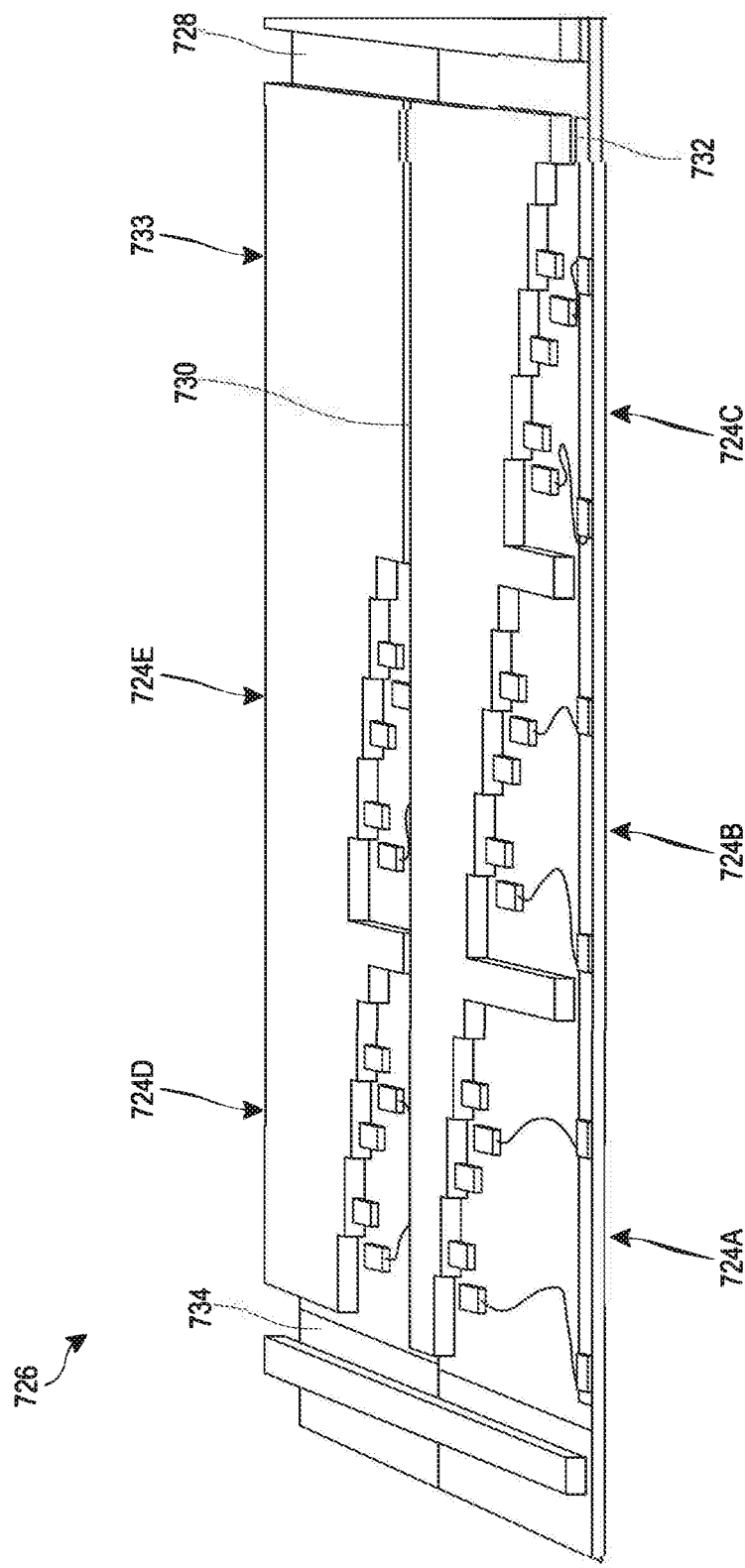

FIG. 7E is a schematic of an example of a colony 726 or portion thereof including multiple squads 724A, 724B, 724C, 724D, 724E. The squads may be similar to the squads described with respect to FIGS. 7A-7D. Each squad may include comprising one or more digger bots 502, crusher bots 504, and/or sorter bots 510. Each squad may be servicing a portion or panel of the mine site. The bots may create tunnels 728, 730, 732, 734 for accessing the various locations with the mine site. The hoses or pipes may extend along the tunnels. An un-serviced panel 733 may next be serviced by the squads, for example the squad 724E.

Any of the various architectures described herein may be used for managing and operating a wide variety of industrial robotic systems, such as the mining colonies of FIGS. 7A-7E. For example, the system 10 may be applied to the colony 726. The remote control center 100 may communicate with the colony control center 112, which may be located at the colony 726. The squad 724A may include the bots 116, 210, 322, 352, 502, etc. The bots may include the processor 212 of FIG. 2 and/or the hardware platform 412 of FIG. 4. The processing module 214 and/or 224 and/or 230 may use imaging, thermal, environmental, and other sensors to locate and, target and excavate rock, e.g. on the face 704 of FIG. 7A. The processing module 214 may control a saw, chisel, and/or other tools to excavate, rock, for example with the digger bot 502. The processing modules 214, 224 and 230 may control the digger, including the excavation payload stack functions and the universal platform functions. The algorithms 230 may be used for intelligent and collaborative mining operations in conjunction with the other bots, such as the crusher bot 506. The bots 502, 506 of the squad 724A may communicate with bots from the neighboring squads 724B, 724C, 724D and/or 724E. The communications system 358 may be used by the bots for communicating. The bots may include the hardware platforms 414, 424, 432, 442, 448 and/or 454 of FIG. 4 to move the bot, structurally support the bot, power the bot, analyze data, thermally manage the bot, and/or integrate payload subsystems/tools, such as chisel or saw.

As further example, the colony control centers 142, 250, 302 or 380 may be located at the colony 726. The squads and colony control center may communicate via the colony communications network 316. The network may be the network 370 of FIG. 3B. The network 316 may be provided by communications systems located with the bots of the squads 724A, etc. The bots in the colony 726 may communicate with each other and/or with the network 316, such as shown by the bots 322, 324, 332, 334 of FIG. 3A. The network 316 may be located along the tunnels 728, 730, 732, 734, which may be deployed by networking or communication bots. The bot modules 308, 310, 312 of FIG. 3A may be used for analyzing the data provided by the squads and/or bots. The simulation modules 284 of FIG. 2 may be used for running simulations of the squads or bots for improving control algorithms applied to the squads or bots. The modules 286, 288, 290 may be used for simulating machine learning algorithms, robotics controls simulations, and networking simulations, which may be applied to control of the squads 724A, etc. The colony control center may communicate this and other data to the remote control center 100, to the squads or bots, and/or to other colony control centers. The progress of the mining operation may be supervised, analyzed and supported in this manner to complete the industrial objectives, for example, locating the mine site, forming the mine site, excavating the mine, and closing the mine site. These and other operations may be performed by the squads and bots autonomously with little or no user input from the control centers other than in a planning, supervisory and exception management manner.

G. Swarm Robotic Architecture—"Robotics-as-a-Service"

The systems and methods for industrial robotics described herein may be implemented as a service package (e.g., including software and bots) for particular industrial projects, such as mining. In some implementations, a "Robotics-as-a-Service" (RaaS) package may be implemented using the architectures described herein. The various management and control architectures and systems may be delivered or otherwise accessible as software for specific use cases. The bots may or may not be included as part of the RaaS package.

For example, within the construction sector, one RaaS service package may be a concrete demolition software package. Based on the specific requirements, squads of bots may be deployed to accomplish the service at hand.

The RaaS approach using the systems and method described herein provides several advantages. For example, customers may not have to be well-versed in robot operations. There may not be a need to carry the capital cost of robots or deal with robot ownership. There may be reduced liability and risk of service delivery to users. There may be flexibility to repurpose and use universal platforms and payload stacks depending on real-time demand from users. There may be flexibility to customize the size and makeup of colony and squad deployments. Value-based pricing may be used which reflects market pricing for the service delivery for a particular task, not robot cost-centric pricing.

H. Example Mining Bots—Example Modular Industrial Bots

Figure 8:
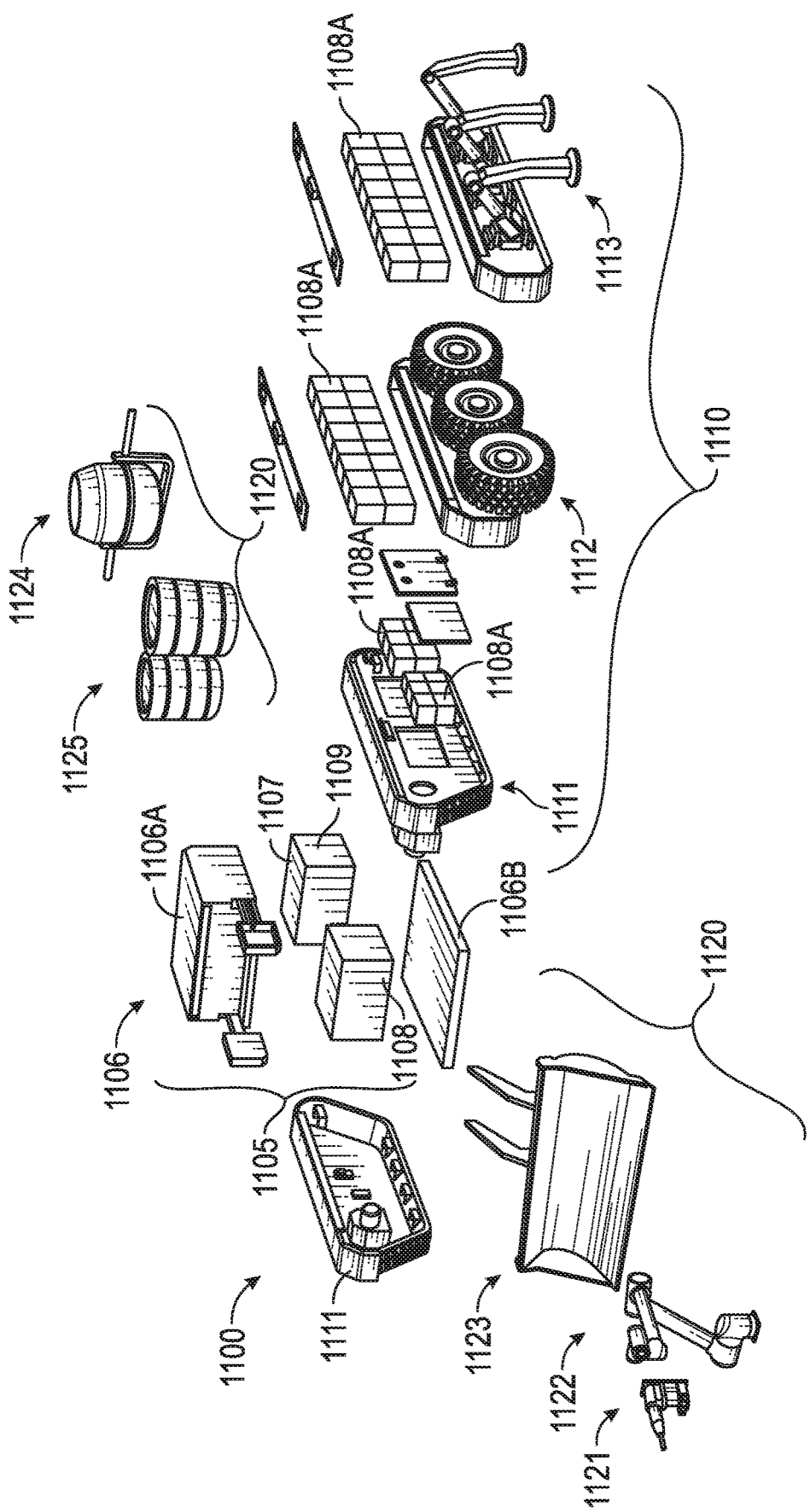
FIG. 8 is an exploded view of an embodiment of a modular industrial bot, including a universal platform and payload stack, that may each be used with the various architectures described herein.

FIG. 8 shows an example of a modular mining bot 1100. The mining bot 1100 may include a universal platform 1105. The universal platform 1105 may be an example of the universal platform 500 described above and may have the same or similar features and/or functions thereof, and vice versa. The universal platform 1105 may be used in conjunction with the bot 400 and other bots described herein. The universal platform 1105 may provide a single system having uniform structural, computing and support systems that is configured to couple with a variety of interchangeable payload stacks.

The universal platform 1105 may include a structural frame or platform 1106. The structural platform 1106 may be similar to the structural platform 442 described above. The structural platform 1106 may include an upper enclosure 1106A and lower support frame 1106B with a variety of different mechanical and electrical mounting locations and configurations. The frame 1106B may support the various modules and other components of the universal platform, such as the universal bus, etc. The enclosure 1106A may house the various modules and components.

The universal platform 1105 may further include a data module 1107. The data module 1107 may be similar to the data platform 432 described above. The data module 1107 may include one or more buses and processors and memory system for storing instructions and one or more antennae and communication modules for communicating with other bots and/or other central or de-centralized control systems such as the colony control system. The various components of data module 1107 may include controllers in firmware for operating all modules connected with the mining bot 1100.

The universal platform 1105 may further include a power module 1108. The power module 1108 may be similar to the power platform 424 described above. The power module 1108 may include one or more of the following: a power supply (e.g., one or more batteries), a wiring and/or a power bus, a voltage or current converter module, controllers, and hardware to provide power to the various other modules of the bot 1100. The power module 1108 may also include a power supply 1115. Optionally, the power supply 1115 may be mounted in conjunction with other modules of the universal platform 1105 such as within a mobility platform 1110.

The universal platform 1105 may include a thermal module 1109. The thermal module 1109 may be similar to the thermal platform 448 described above. The thermal module 1109 may be located with the data module, as shown, or separately or with other components of the platform. The thermal module 1109 may include one or more of the thermal management module or set of modules, such as a refrigeration or thermal sensor module. Optionally the module may include a heating module. The thermal module 1109 may generally function to manage a temperature of the mining bot 1100 which may include one or more heating or cooling components.

The universal platform 1105 may be connected with the mobility platform 1110. The mobility platform 1110 may be similar to the mobility platform 414 described above. The mobility platform 1110 may be coupled with the structural platform 1106. Three different possible components for the mobility platform are shown. The mobility platform 1110 may comprise a tracked module 1111, a wheeled module 1112, and/or a legged module 1113. The completed track module 1111 with portions on both sides of the universal platform 1106 are shown. For clarity, only one side of the wheeled module 1112 and legged module 113 are shown. Variously, each of the mobility modules may comprise any number of requisite tracks, wheels, or legs (or a hybrid of any of these systems) for providing mobility for the industrial bot 500. The mobility platform 1110 may allow any of the mobility modules 1111-1113 to be coupled with the structural platform 1106 providing mobility to the mining bot 1100. Accordingly, the structural platform 1106 may include requisite common mechanical and electrical connection points for installing the mobility modules.

The universal platform 1105 may comprise a robotic software platform. The robotic software platform may be similar to the software platform of the bot 210 described above. The robotic software platform may comprise of a controller layer having firmware configured to operate the universal and payload stacks using universal and payload control algorithms, etc., as described herein.

In certain embodiments of the bot, the universal platforms 1105 may come in different sizes (e.g., a large, medium, or small size). The size utilized may depend on the application for the particular bot. The payload stack 1120 and the mobility platform 1110 may also come in different sizes and be interchangeable for each of the corresponding sizes of universal platforms 1105. Example sizes and ranges of sizes for the overall bot when assembled include lengths from about 1 foot to about 15 feet, widths from about 1 foot to about 10 feet, and heights from about 2 feet to about 10 feet. In some embodiments, the bots may be from about 5-7 feet long, and/or 3-5 feet wide, and/or 2-4 feet tall.

The mining bot 1100 may include a payload stack 1120. The payload stack 1120 may include one or a set of payload tools for performing specific industrial tasks. The payload tools may be used for achieving industrial objectives such as specific mining tasks (e.g., excavating, sweeping, etc.). The payload stack 1120 may be integrated in various areas of the universal platform 1105. For example, in some implementations components of the payload stack may be coupled with the structural platform 1106 on the front rear top, bottom, or sides thereof. Optionally, one or more of the components of the payload stack 1120 may be coupled with the mobility platform 1110 or any of the modules thereof. As shown in certain examples, the payload stack 1120 may include a digger module 1121 including a digging tool (e.g., a robotic chisel, robotic saw, robotic drill, etc.), a robotic arm module 1122 including articulable joint and connecting linkages, a dozer module 1123 including a blade and lift mechanism, a mixer module 1124 (e.g., for cementious mixtures) including a vessel that may be rotatable, and/or a fluid container module 1125 including a fluid carrying vessel.

The payload stack 1120 may be selected in accordance with the specific industrial tasks that are performed by the specific mining bot 1100. The following examples of mining bots shown in and described with respect to FIGS. 9A-17B may each include a universal platform 1105 and carry a different payload stack 1120 selected from a plurality of different payload stack types. In addition, the mining bots may also vary in the selected mobility platform 1110 and/or other of the above modules selected respectively from a plurality of mobility platform types and a plurality of module types.

Figure 9A:
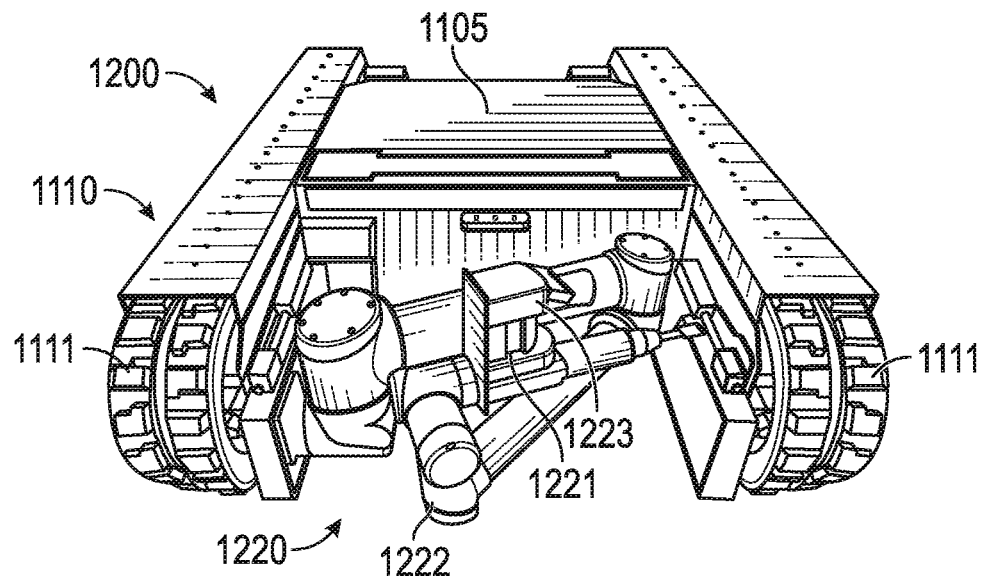
FIGS. 9A-9B are front perspective views of an embodiment of a digger bot showing, respectively, tool arms stowed and deployed, and that may each be used with the various architectures described herein.

FIG. 9A shows an embodiment of a digger bot 1200. The digger bot 1200 may have the same or similar features and/or function as the digger bot 502 described above, and vice versa. The digger bot 1200 includes the universal platform 1105. As shown, the universal platform 1105 is attached with the mobility platform 1110. The mobility platform 1110 is implemented as the tracked module 1111, shown as a two-track system. The digger bot 1200 may include a digger payload stack 1220. The digger payload stack 1220 may include a digger tool 1221, the digger tool 1221 may comprise a robotic rock removal tool. The robotic rock removal tool may be a drill or a chisel or similar tools for mechanically breaking rock (e.g., from a rock face). The digger tool 1221 may be electric, pneumatic or otherwise powered. The digger tool 1221 may provide reciprocating action to the drill or the chisel tip.

The digger payload stack 1220 may further include a robotic arm 1222. The digger tool 1221 may be mounted on the robotic arm 1222. The robotic arm 1222 may comprise a plurality of articulable joints and linkages. The joints of the robotic arm 1222 may include servo-actuated rotational or translational joints. The robotic arm 1222 may be mounted on the universal platform 1105.

The digger payload stack 1220 may further include a sensor 1223. The sensor 1223 may be an optical, infrared, laser or any other type of sensor. The sensor 1223 may be used for mapping the rock face or other environmental features. The sensor 1223 may be used in conjunction with the machine learning algorithms for facilitating the removal of excavation of the rock face using the digger tool 1221.

Figure 9B:
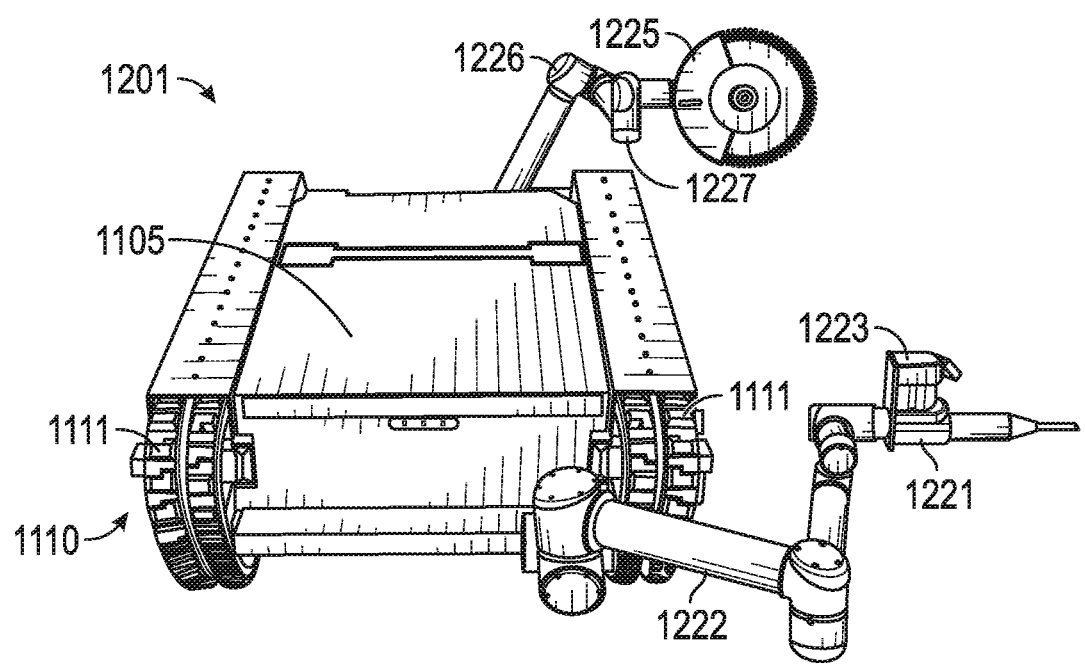

In certain embodiments of the bot including the digger payload stack 1220, only the single robotic arm 1222 and the digger tool 1221 are included. Another embodiment of the digger bot 1201, is shown in FIG. 9B, where the digger payload stack 1220 may further include a cutter tool 1225. The cutter tool 1225 may include a reciprocating or rotating blade for cutting into the rock face and breaking the rock thereof. The cutter tool 1225 may be powered by an electric motor or other type of actuator. The cutter tool 1225 being mounted on a robotic arm 1226. The robotic arm 1226 may include a plurality of joints and linkages for articulating the position of the cutter tool 1225. The digger payload stack 1220 may be used for bot-specific industrial tasks that include pre-conditioning rock or concrete or any other construction material and breaking rock, concrete or any other construction material.

The digger payload stack 1220 may also include a second sensor 1227. The second sensor 1227 may be mounted on the second robotic arm 1226. Similar to the first sensor 1223, the second sensor 1227 may be used for mapping the rock face and controlling the cutter tool 1225. Optionally the sensors 1223/1227 may be mounted directly on another portion of the universal platform 1105.

Figure 10A:
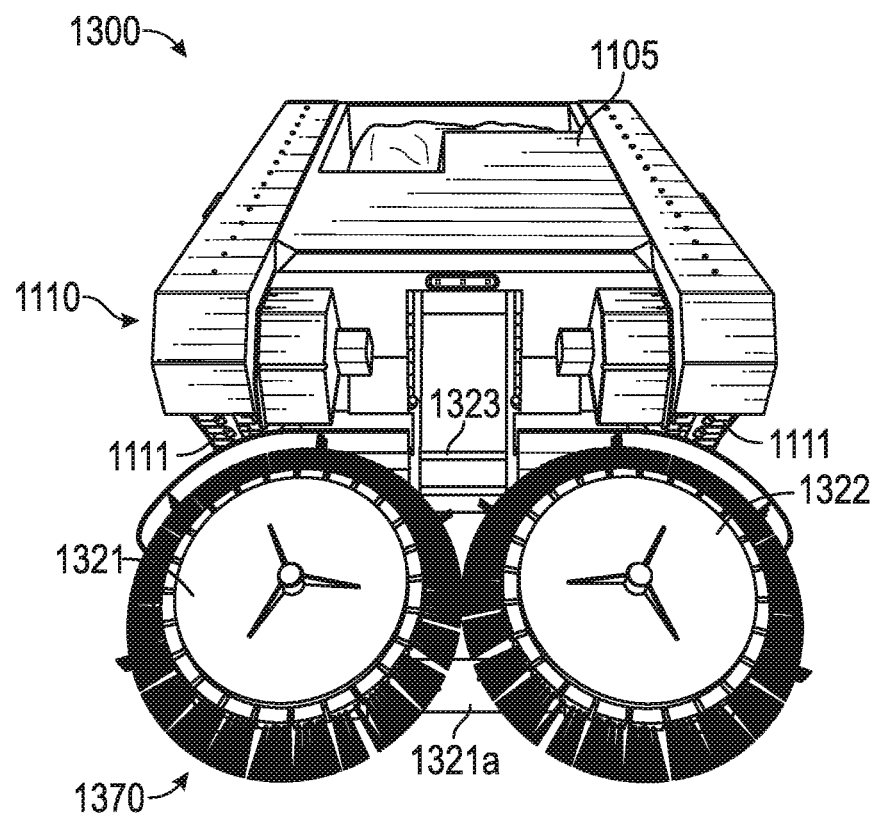
FIGS. 10A-10C are various perspective views of an embodiment of a sweeper/crusher bot and components thereof that may each be used with the various architectures described herein.
Figure 10B:
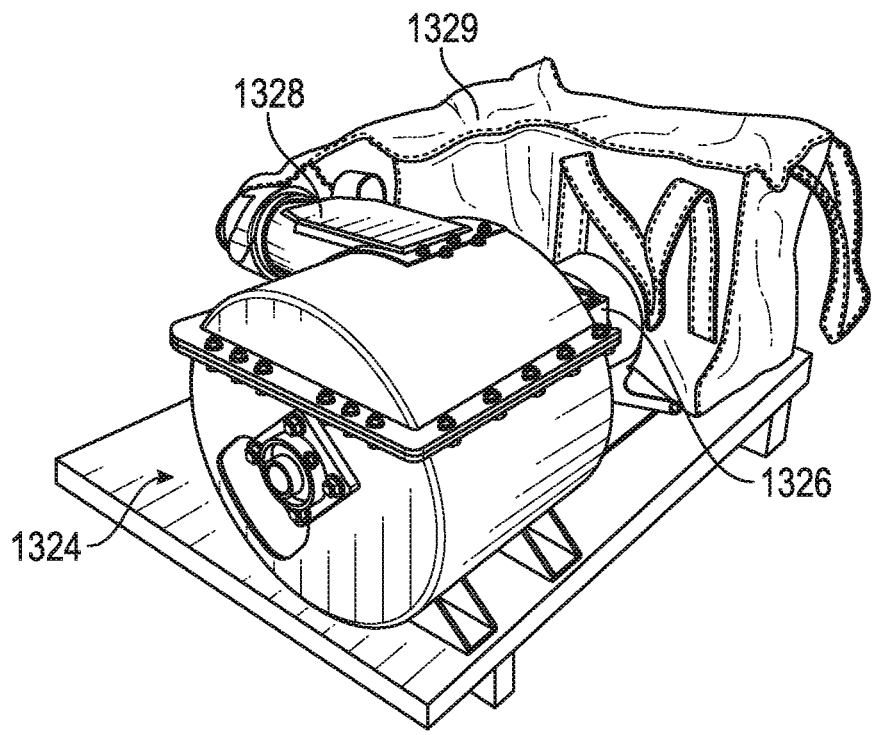
Figure 10C:
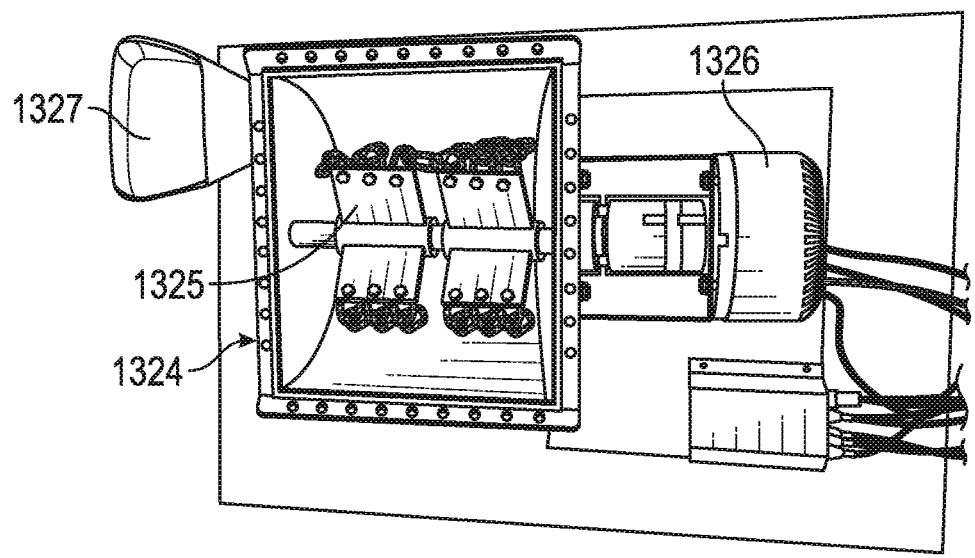

FIGS. 10A-10C show an example of a sweeper bot 1300 and components thereof. The sweeper bot 1300 may have the same or similar features and/or function as the sweeper/hauler bot 514 described above, and vice versa. The sweeper bot 1300 may include the universal platform 1105. The sweeper bot 1300 may include the mobility platform 1110. The mobility platform 1310 may include the tracked module 1111. The track module 1111 may extend along and surround rotating wheels or pulleys to propel the bot 1300 forward and backward. The sweeper bot 1300 may include a sweeper payload stack 1320. The sweeper payload stack 1320 may collect loose materials such as excavated rock. The rock may be material that has been excavated from the rock face by the digger bot 1200.

The sweeper payload stack 1320 may include a first sweeper 1321. The first sweepers 1321 may be mounted on a scraper or ramp 1321a. The ramp 1321a may be a generally planar member. The ramp 1321a may be oriented downward at an angle and to contact with a ground surface. The sweeper 1321 may include a plurality of outwardly oriented brush members. The sweeper 1321 may rotate to sweep material onto the ramp 1321a. The sweeper 1321 may rotate in a counterclockwise direction. The sweeper payload stack 1320 may include a second sweeper 1322. The second sweeper 1322 may be mounted on the ramp 1321a opposite the first sweeper 1321. The second sweeper 1322 may rotate in a clockwise direction to generally sweep material between the first and second sweepers 1321, 1322.

The sweeper payload stack 1320 may include a conveyor 1323. The conveyor 1323 may be located generally between the first and second sweepers 1321, 1322. The conveyor 1323 may include a belt mounted on one or more rollers for gathering the swept rock material from the ramp 1321a and depositing it inside a receptacle. The receptacle may be located on or in the sweeper bot 1300. The sweeper payload stack 1320 may be used in conjunction with the digger bot 1200 for excavating purposes. The sweeper payload stack 1320 may be used for bot-specific industrial tasks that include collecting excavated rock, concrete or any other construction material and transporting excavated rock, concrete or any other construction material.

As shown in FIGS. 10B and 10C, the sweeper payload stack 1320 may further include a crusher 1324. Alternatively, the crusher 1324 may be mounted on a separate mining bot from the sweeper bot 1300 (e.g., a dedicated crusher bot). The gathered rock material may be conveyed into the crusher 1324 by the conveyor 1323. The rock material may be received within an inlet 1327 into a chip entrainment drum of the crusher 1324. The chip entrainment drum may include an outlet 1328. The outlet 1328 may connect with a material bag 1329. The crusher 1324 may include an internal rotor 1325. The rotor 1325 may be rotatably mounted and powered by a motor 1326. The rotor 1325 may include one or more grinding or crushing elements for crushing the contents of the crusher 1324. The crusher 1324 may pulverize the rock fragments into smaller pieces by rotation of the rotor 1325. The crushed material of the crusher 1324 may be blown into the material collection bag 1329. The crusher payload stack may be used for bot-specific industrial tasks that include filtering/concentrating excavated rock.

Figure 11A:
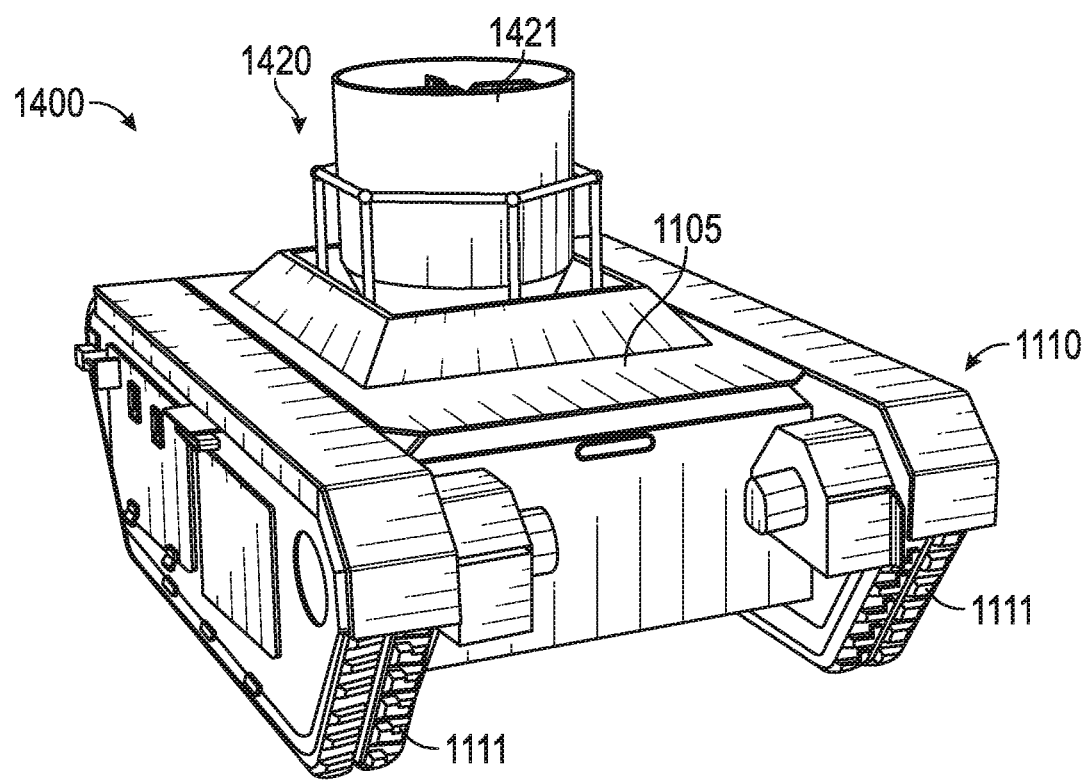
FIGS. 11A and 11B are, respectively, perspective views of embodiments of a flotation bot and a suction bot, that may each be used with the various architectures described herein.

FIG. 11A shows a flotation bot 1400. The flotation bot 1400 may have the same or similar features and/or function as the sorter bot 510 described above, and vice versa. The flotation bot 1400 may include the universal platform 1105 and the mobility platform 1110. The flotation bot 1400 may include the tracked module 1111. The flotation bot 1400 may further include a flotation payload stack 1420. The flotation payload stack 1420 may include a flotation unit 1421. The flotation unit 1421 may be used for separating crushed rock material into target materials and undesirable materials. Crushed rock materials may be received within the flotation payload stack 1420. The crushed rock material may then be pumped through the flotation unit 1421 via a hose. The flotation unit 1421 may separate the desirable and undesirable materials. The desirable materials may be transmitted along a first pipe or hose. The undesirable materials may be transmitted along another pipe or hose. The flotation payload stack 1420 may transmit waste or undesirable material such as to another location or area within the mine. The flotation payload stack 1420 may be used for bot-specific industrial tasks that include filtering/concentrating excavated rock.

Figure 11B:
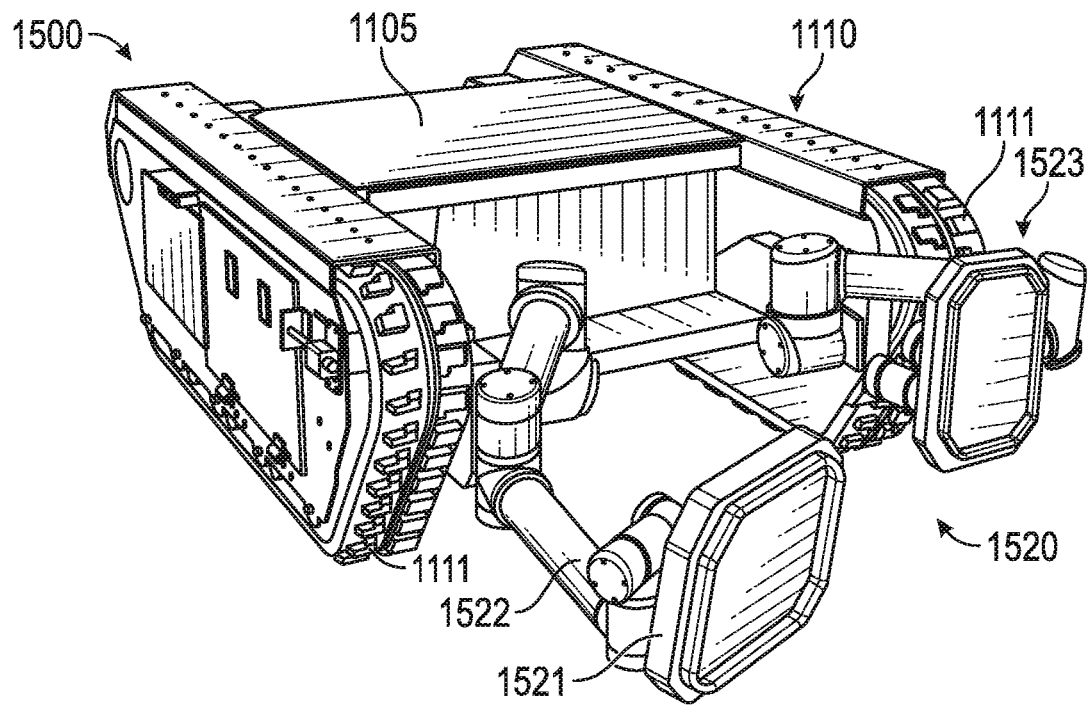

FIG. 11B shows an example of a suction bot 1500. The suction bot 1500 may have the same or similar features and/or function as the digger and suction bot 591 described above, and vice versa. The suction bot 1500 may include the universal platform 1105. The suction bot 1500 may include the mobility platform 1110. The mobility platform may include the tracked module 1111. The suction bot 1500 may further include a suction payload stack 1520. The suction payload stack 1520 may include a suction member 1521. The suction member 1521 may be mounted to a robotic arm 1522. The robotic arm 1522 may comprise a plurality of joint and linkages for articulating and manipulating the position of the suction member 1521. Optionally, a second suction member and/or robotic arm 1523 may be included. The suction payload stack 1520 may be used to transport and/or lift material (e.g., concrete slabs). The suction bot 1500 for example may raise tools or materials into position for being secured therein. For example, they may raise reinforcing materials that may then be secured in place by other types of bots in a repair squad. As a part of the demolition squad the suction bot 1500 may sweep and haul away materials that are undesirable to have inside of the operating area. The suction payload stack 1520 may be used for bot-specific industrial tasks that include suctioning or supporting rock, concrete or any other construction material.

Figure 12A:
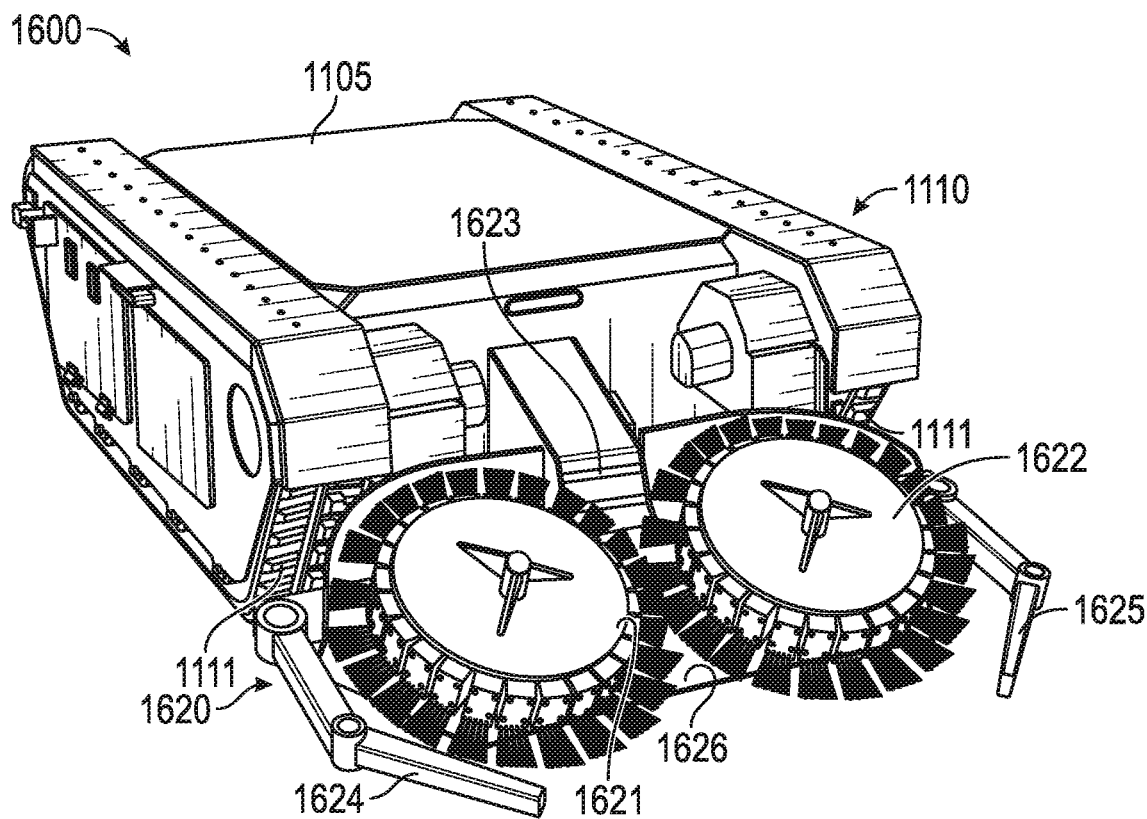
FIGS. 12A-12D show, respectively, perspective views of other embodiments of a sweeper/crusher bot, a shotcrete bot, a bolting bot, and a welding bot, that may each be used with the various architectures described herein.

FIG. 12A shows another example of a sweeper bot 1600. The sweeper bot 1600 may include the universal platform 1105. The sweeper bot 1600 may include a mobility platform 1110 and/or the tracked module 1111. The sweeper bot 1600 may include a sweeper payload stack 1620. The sweeper payload stack 1620 may be identical to the sweeper payload stack 1320, with the following features: a first sweeper member 1621, a second sweeper member 1622 a scraper 1626 on which the first and second sweeper members 1621, 1622 are mounted, and/or a conveyor 1623 coupled with the scraper 1626 between the first and second sweeper member 1621, 1622. The sweeper payload stack 1620 may further include a first arm 1624. The first arm 1624 may include plurality of linkages and joints. The first arm 1624 may be mounted on the scraper 1626. The first arm 1624 may be generally be articulable to retrieve materials and push them into the first sweeper 1621. A distal end of the first arm 1624 may extend outward from the sweeper 1621, gather material, and push it into the bristles of the sweeper 1621. This may facilitate faster and more efficient recovery of materials into the conveyor 1623. Similarly, the second side may include a second robotic arm 1625 that operates similar to the first robotic arm with respect to the second sweeper 1622.

Figure 12B:
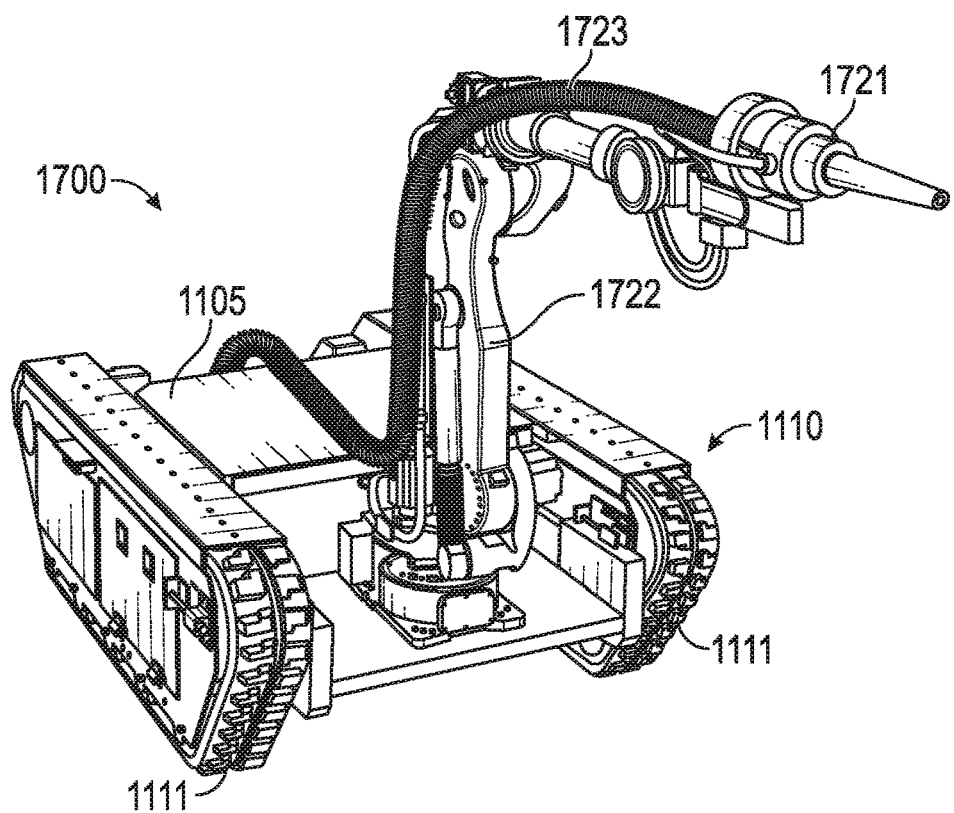

FIG. 12B shows an example of a shotcrete bot 1700. The shotcrete bot 1700 may have the same or similar features and/or function as the shotcrete bot 582 described above, and vice versa. Shotcrete may comprise a sprayed concrete compound or other sprayed hardening compound. The shotcrete bot 1700 may include the universal platform 1105. The shotcrete bot 1700 may include the mobility platform 1110 and/or the tracked module 1111. The shotcrete bot 1700 may include a shotcrete payload stack 1720. A shotcrete payload stack may include a nozzle 1721 for spraying the shotcrete compound. The nozzle 1721 may be controllable by a robotic arm 1722 including a plurality of joint and linkages. The shotcrete payload stack 1720 may further include a supply hose 1723. The supply hose 1723 may be coupled with a reservoir of the shotcrete compound either on the shotcrete bot 1700 or on another bot or other supply source through the supply hose 1723. The shotcrete payload stack 1720 may generally be used for construction such as applying cementitious material to a mine section (for example panel or tunnel). The shotcrete payload stack 1720 may form part of a tunneling/repair squad or other type of squad. The shotcrete payload stack 1720 may be used for bot-specific industrial tasks that include applying cementitious material to supporting rock, concrete or any other construction material, reinforcing rebar, and applying passivating coating.

Figure 12C:
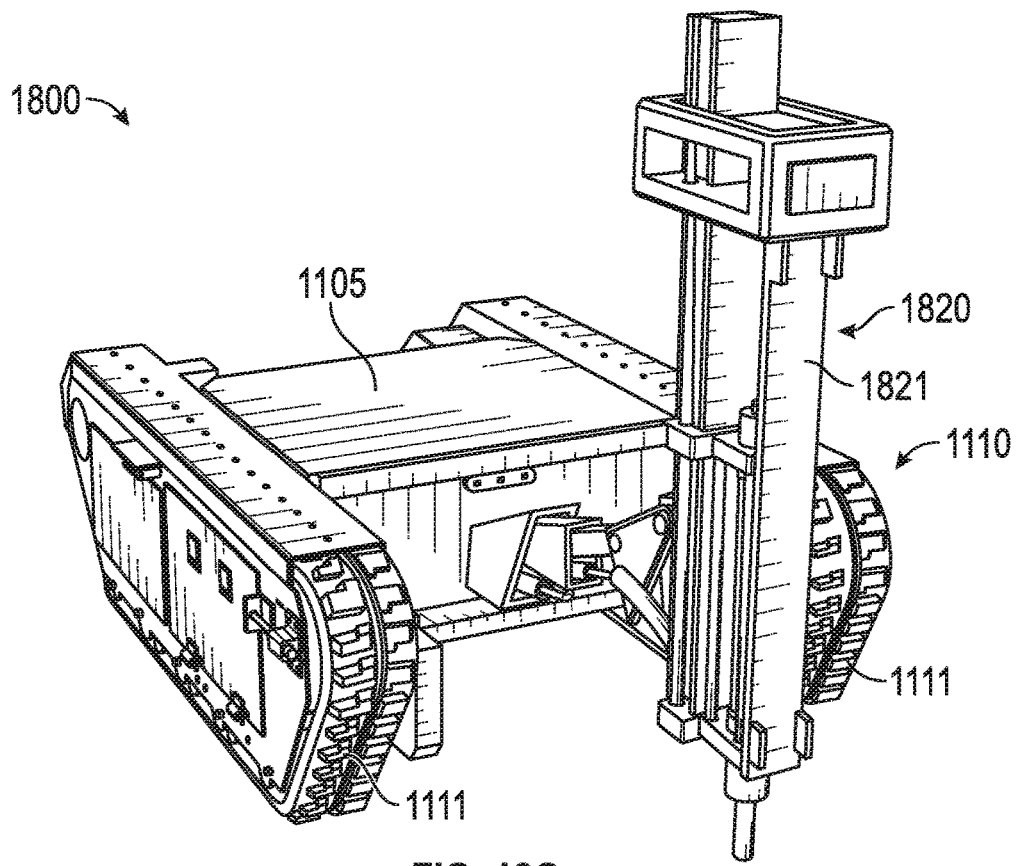

FIG. 12C shows an example of a bolting bot 1800. The bolting bot 1800 may have the same or similar features and/or function as the bolting bot 588 described above, and vice versa. The bolting bot 1800 may include the universal platform 1105. The bolting bot 1800 may include the mobility platform 1110 and/or the tracked module 1111. The bolting bot 1800 may include a bolt payload stack 1820. The bolt payload stack 1820 may include a bolt inserter 1821. The bolt inserter 1821 may comprise a magazine of mechanical fasteners such as bolts, screws, nails, anchors, or the like. The mechanical fasteners may be fed into an actuator by the magazine. The actuator may apply a force to the fasteners for inserting the fasteners into a substrate. The bolt inserter 1821 may be articulable via a robotic arm and may comprise one or more joints and linkages. The bolting bot 1800 may form part of a tunneling or repair robotic squad or other type of squads. The bolt payload stack 1820 may generally be used to insert reinforcement bolting a mine section (for example panel or tunnel). The bolting payload stack 1820 may be used for bot-specific industrial tasks that include reinforcement bolting of supporting rock, concrete or any other construction material.

Figure 12D:
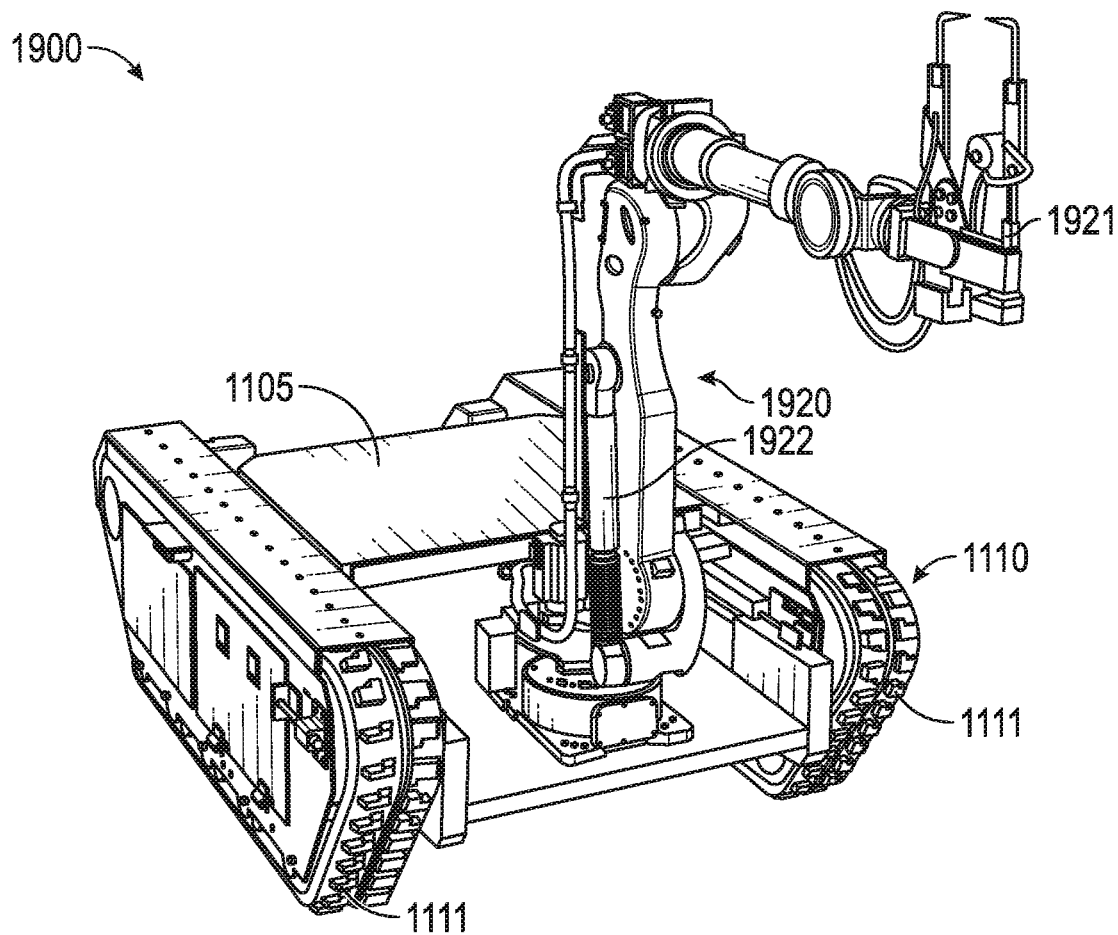

FIG. 12D shows an example of a welding bot 1900. The welding bot 1900 may have the same or similar features and/or function as the welding bot 584 described above, and vice versa. The welding bot 1900 may include the universal platform 1105. The welding bot 1900 may include the mobility platform 1110 and/or the tracked module 1111. The welding bot 1900 may include a welding payload stack 1920. The welding payload stack 1920 may include a weld head 1921. The weld head 1921 may comprise one or more welding members that are powered by an electrical source and connected thereto with one or more wires. The weld head 1921 may be articulable by a robotic arm 1922. The robotic arm 1922 may comprise one or more joints and linkages for manipulating the position of the weld head 1921. The welding payload stack 1920 may function as a welding unit for connecting to metallic materials. The welding bot 1900 may form part of tunneling, repair or similar types of robotic squads. The welding payload stack 1920 may be used for bot-specific industrial tasks that include welding or repairing and reinforcing rebar or tunnel support materials.

Figure 13A:
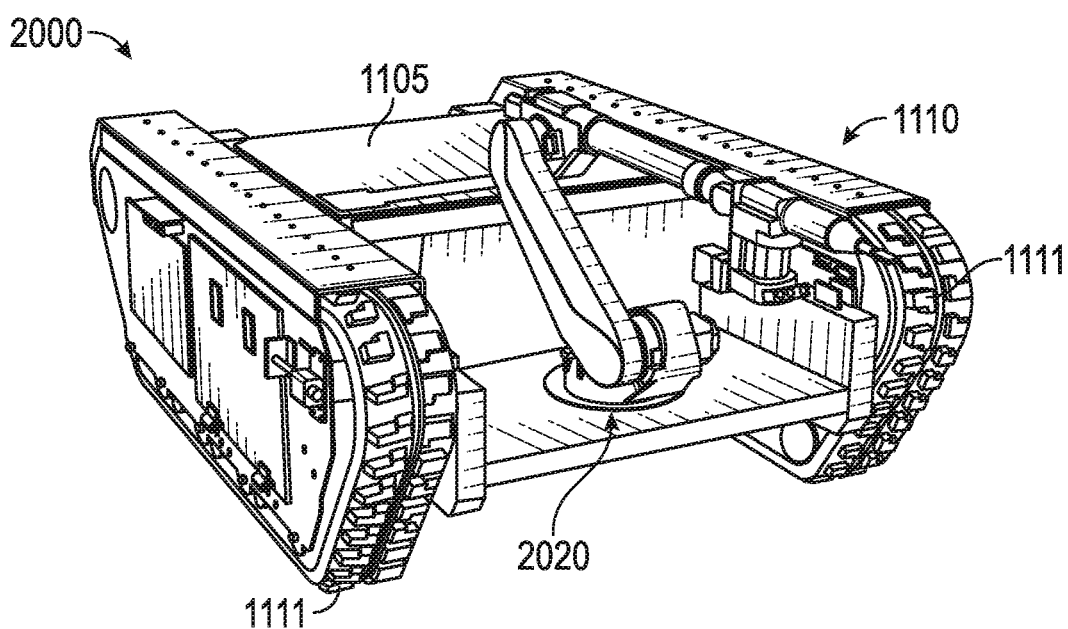
FIGS. 13A-13C are perspective views of an embodiment of a digger bot that may be used with the various architectures described herein.
Figure 13B:
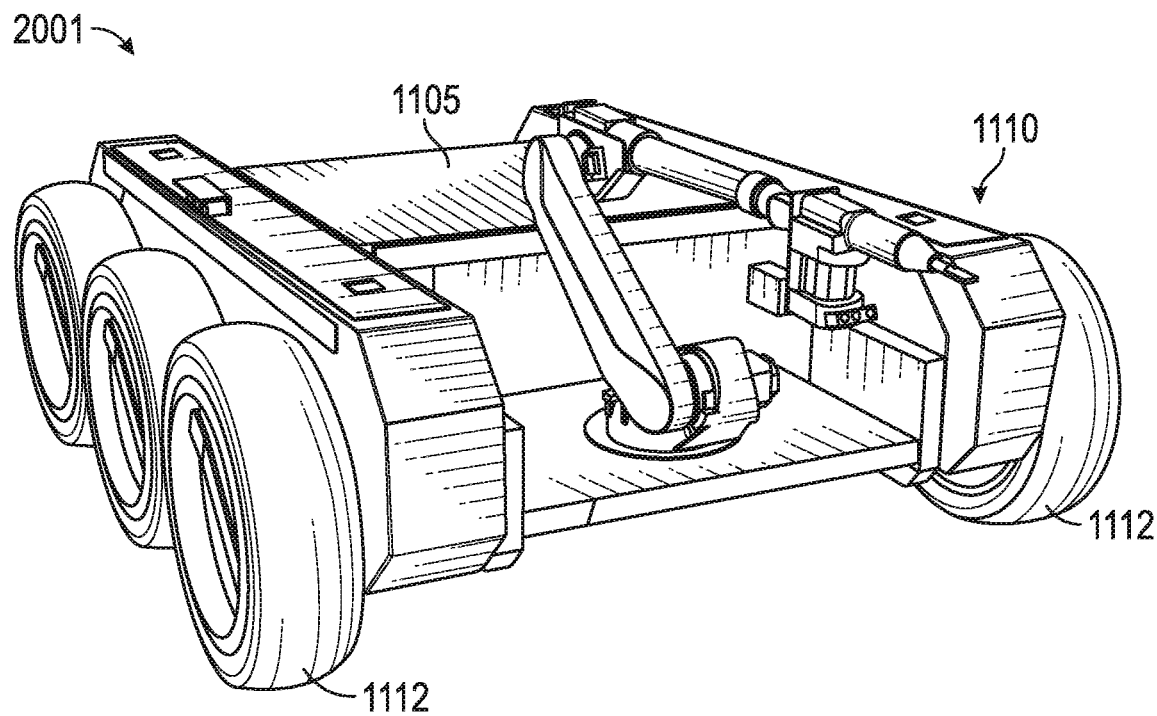
Figure 13C:
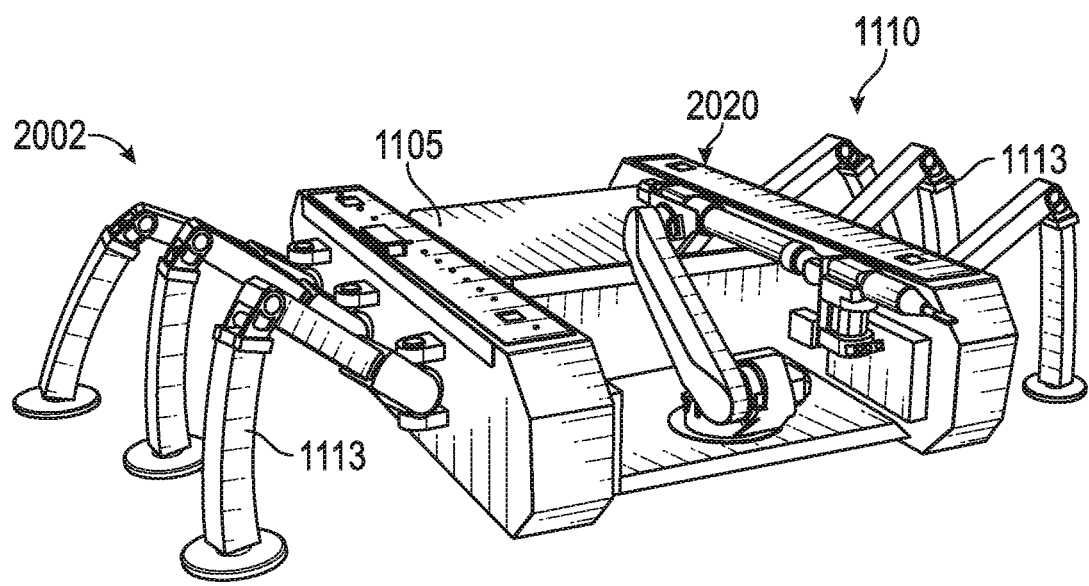

FIGS. 13A-13C show, respectively, three different embodiments of digger bots 2000, 2001, 2002. The digger bots 2000, 2001, 2002 may include the universal platform 1105 and the mobility platform 1110. The digger bots 2000, 2001, 2002 may include a digger payload stack 2020. The digger payload stack 2020 may include excavating tools such as those described above. The digger bot 2000, as shown in FIG. 13A, may have the mobility platform 1110 that includes the tracked module 1111. The digger bot 2001, as shown in FIG. 13B, my have the mobility platform 2010b that includes the wheeled module 1112. In the example shown, each side of the wheeled module 1112 includes three wheels. The digger bot 2002, as shown in FIG. 13C, may include the mobility platform 1110 that includes the legged module 1113. Each side of the legged module 1113 includes three legs that may be articulated to provide mobility to the digger bot 2002. Each of the different mobility module of the mobility platform 1110 may be interchangeable with the same universal platform 1105 and the digger payload stack 2020.

Figure 14A:
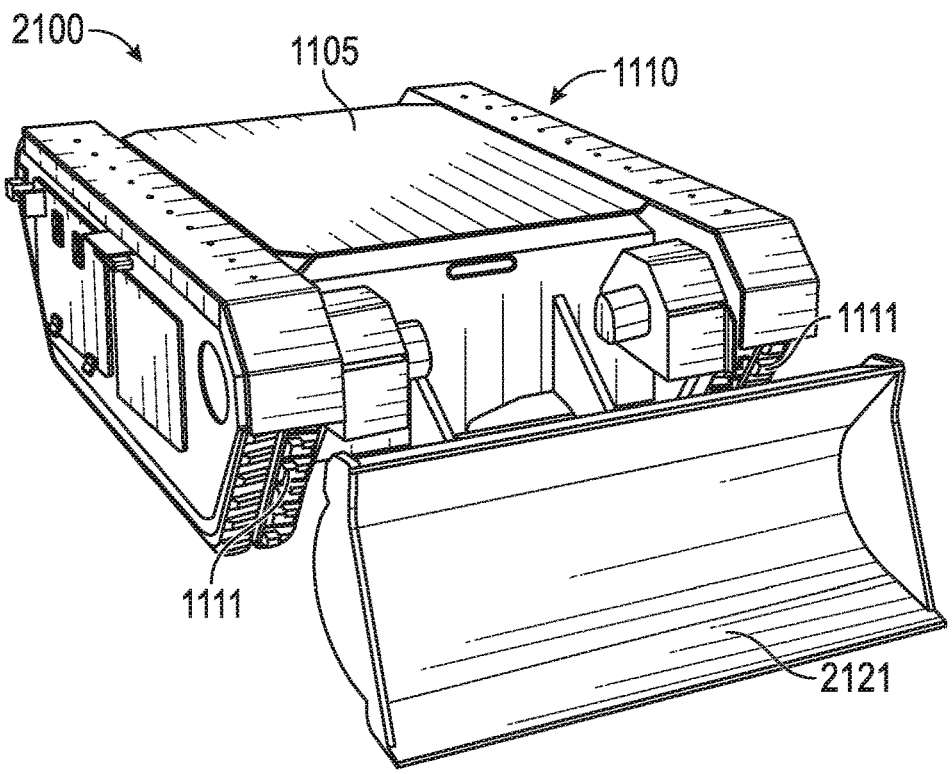
FIGS. 14A-14D are, respectively, perspective views of embodiments of a dozer bot, a suction bot, a 3D construction bot, and a manipulator bot, that may each be used with the various architectures described herein.

FIG. 14A shows an example of a dozer bot 2100. The dozer bot 2100 may include the universal platform 1105. The dozer bot 2100 may include the mobility platform 1110 and/or the tracked module 1111. The dozer bot 2100 may include a dozer payload stack 2120. The dozer payload stack 2120 may include a blade and/or lift module 2121. The dozer payload stack 2120 may be generally used for moving loose materials such as crushed rock. The dozer payload stack 2120 may be used in various robotic squads such as tunneling, demolition, repair, and clean-up squads.

Figure 14B:
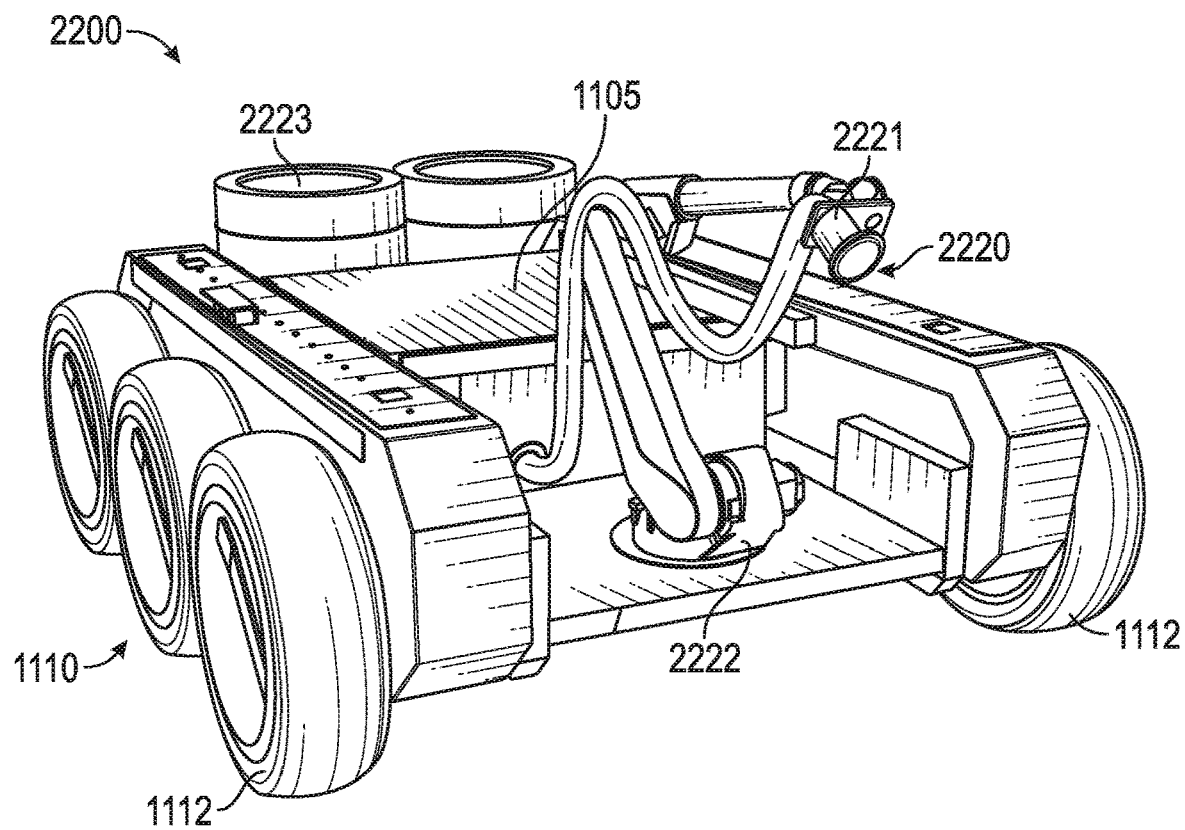

FIG. 14B shows an embodiment of a pump bot 2200. The pump bot 2200 may have the same or similar features and/or function as the pump bot 536 described above, and vice versa. The pump bot 2200 may include the universal platform 1105. The pump bot 2200 may include the mobility platform 1110 having wheeled module 1112. The pump bot 2200 may include a fluid payload stack 2220. The fluid payload stack 2220 may include a suction nozzle 2221. The fluid payload stack 2220 may include a robotic arm 2222. The suction nozzle 2221 may be mounted on the robotic arm 2222. The fluid payload stack 2220 may include one or more reservoirs 2223. The reservoirs 2223 may be coupled with the hose attached with the suction nozzle 2221 and use the suction nozzle 2221 may suck up fluids into the fluid reservoirs 2223. Alternatively, or in addition, the suction nozzle 2221 may be a spray nozzle. The fluid payload stack 2220 may be used in various robotic squads such as tunneling, demolition, repair, and clean-up squads. The fluid payload stack 2220 may be used for suctioning water from a mine section (for example stope or tunnel). In another implementation, the pump bot 2200 may be configured as a sandblaster & sprayer bot (not shown). The sandblaster & sprayer bot may include a nozzle configured for spraying a substance to aid in the excavation, cleanup, or other mining-related tasks. The fluid payload stack 2220 may be used for bot-specific industrial tasks that include suctioning or pumping water, cleaning, and applying passivating coating.

Figure 14C:
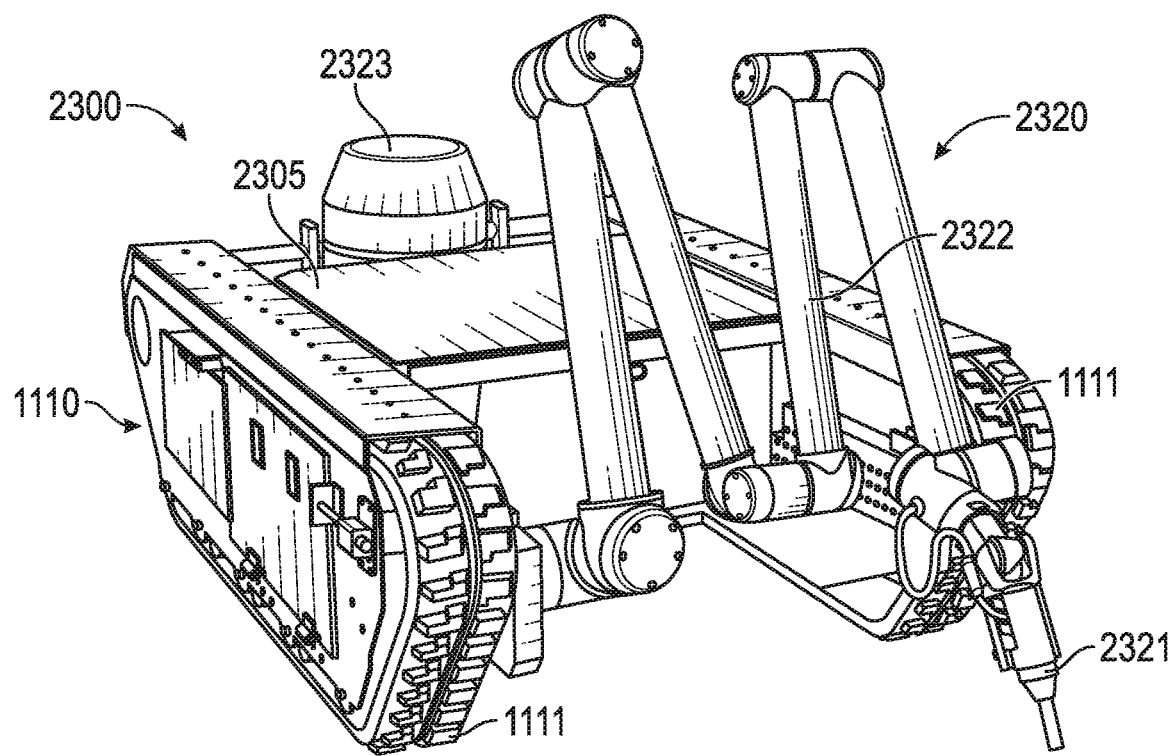

FIG. 14C shows a 3D construction bot 2300. The 3D construction bot 2300 may have the same or similar features and/or function as the builder bot 570 described above, and vice versa. The 3D construction bot 2300 may include the universal platform 1105. The 3D construction bot 2300 may include the mobility platform 1110 and/or the tracked module 1111. The 3D construction bot 2300 may include a 3D construction payload stack 2320. The 3D construction payload stack 2320 may include a nozzle 2321. The nozzle 2321 may be mounted on a robotic arm 2322. The robotic arm 2322 may comprise one or more joints and linkages for moving the nozzle 232. A hose may extend along the robotic arm 2322 and couple with the nozzle 2321. The hose may be coupled with a 3D compound reservoir 2323. The reservoir 2323 may be coupled with a pump for pumping a 3D construction compound to the nozzle 2321. The 3D construction compound may be a cement, polymer or other type of compound used for construction of new materials, filling in gaps, application of adhesives, and similar activities. The 3D construction bot 2300 may be used in various robotic squads such as tunneling and repair squads. The 3D construction payload stack 2320 may be used for bot-specific industrial tasks that include applying cementitious material or reinforcement to supporting rock, concrete or any other construction material.

Figure 14D:
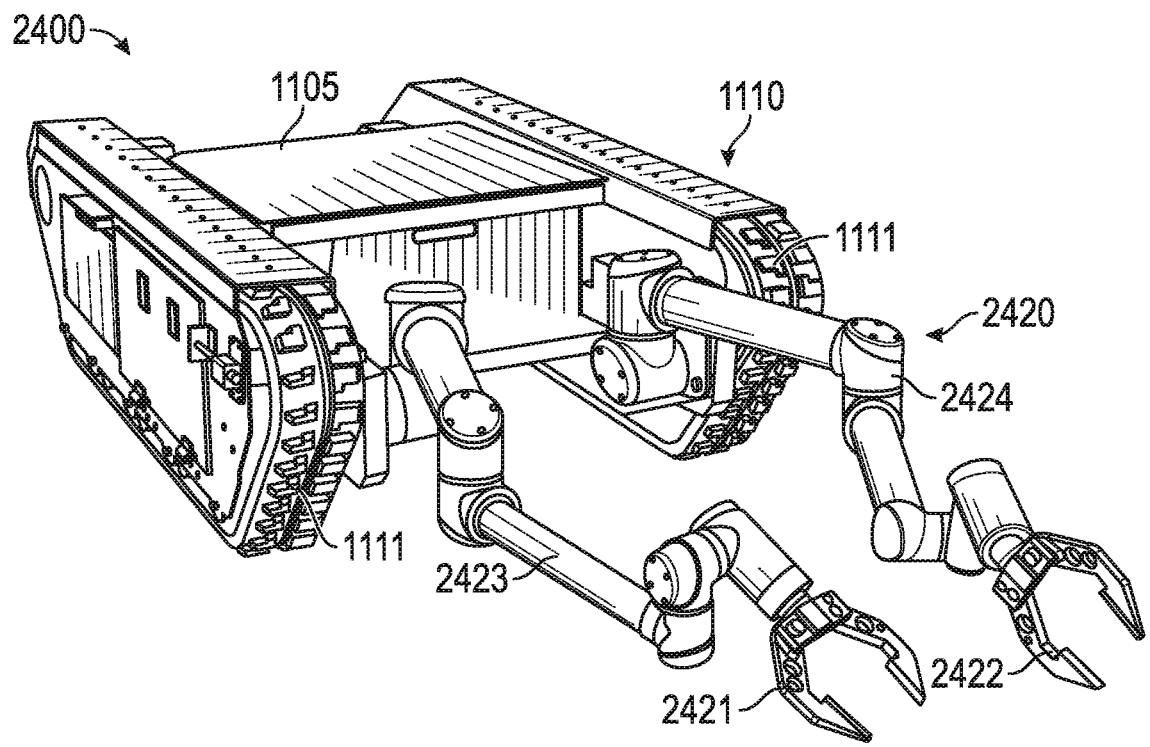

FIG. 14D shows an example of a manipulator bot 2400. The manipulator bot 2400 may have the same or similar features and/or function as the manipulator bot 586 described above, and vice versa. The manipulator bot 2400 may include the universal platform 1105. The manipulator bot 2400 may include the mobility platform 1110 and/or tracked module 1111. The manipulator bot 2400 may include a repair payload stack 2420. The repair payload stack 2420 may include a robotic manipulator 2421. The robotic manipulator 2421 may include one or more articulable members such as a clamping mechanism for grasping an manipulating other objects. The robotic manipulator 2421 may be coupled with a robotic arm 2423. The robotic arm 2423 may include a plurality of joints and linkages for moving the robotic manipulator 2421. Optionally, the repair payload stack 2420 may include second robotic manipulator 2422 and robotic arm 2424. The manipulator bot 2400 may be used in various robotic squads such tunneling, demolition, repair, and clean-up squads. The repair payload stack 2420 may be used for bot-specific industrial tasks that include cleaning, repairing, reinforcing rebar and removing corrosion.

Figure 15A:
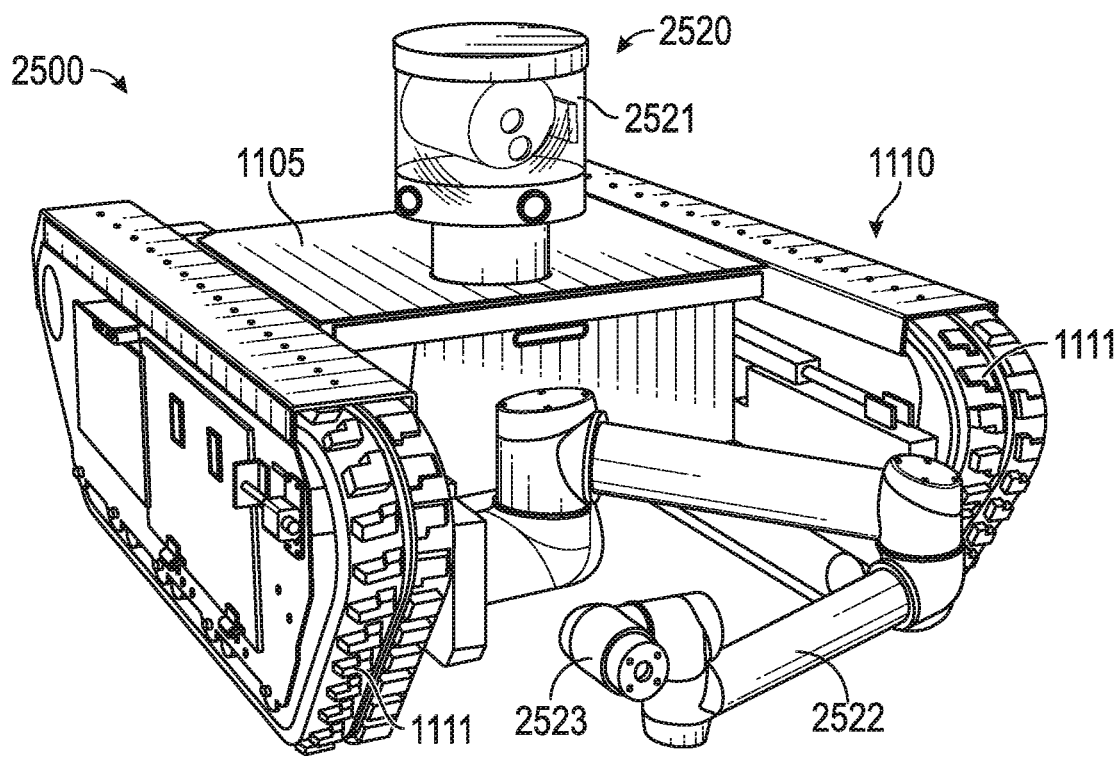
FIGS. 15A-15C show perspective view of another example of a survey bot that may be used with the various architectures described herein.
Figure 15B:
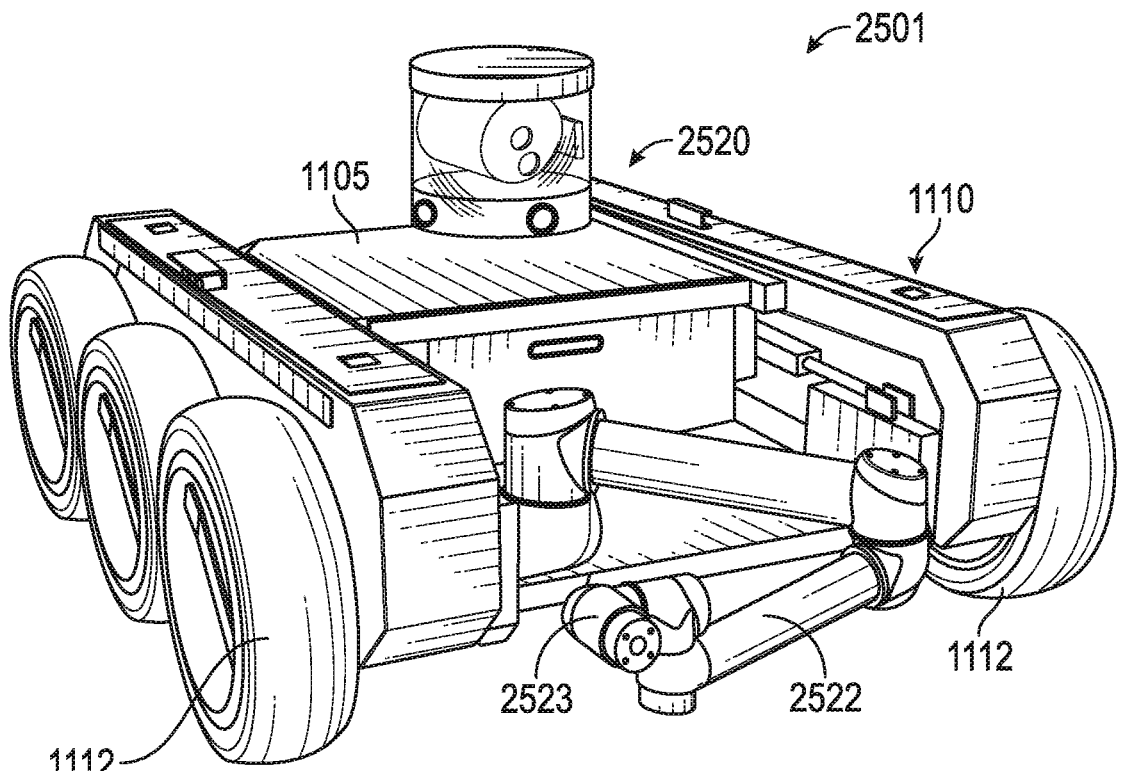
Figure 15C:
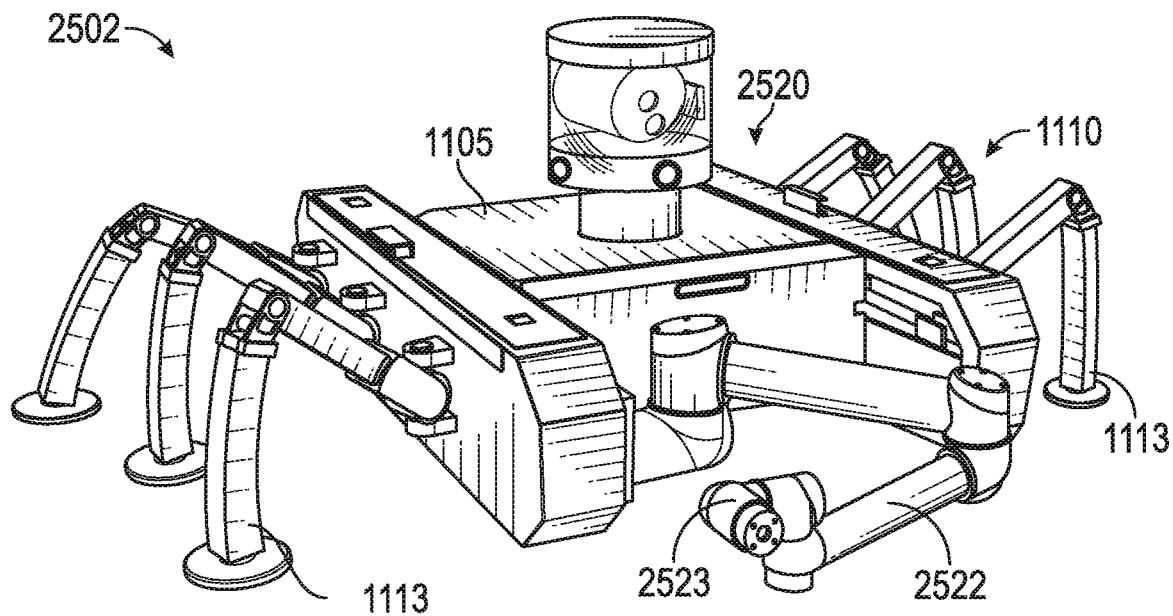

FIGS. 15A-15C show, respectively, example embodiments of survey bots 2500, 2501, 2502. The survey bots 2500, 2501, 2502 may have the same or similar features and/or function as the survey bot 566 described above, and vice versa. The survey bots 2500, 2501, 2502 may include the universal platform 1105 and the mobility platform 1110. The survey bots 2500, 2501, 2502 may include a survey payload stack 2520. The survey payload stack 2520 may include a survey module 2521. The survey module 2521 may include one or more sensors such as lasers, infrared, GPS or similar for performing survey tasks. The survey payload stack 2520 may further include a robotic arm 2522. The robotic arm 2522 may include an end effector 2523. The end effector 2523 may include a positioning system wherein the end of the end effector 2523 may be used for taking measurements of other objects and environments in conjunction with these survey tasks of the survey bot 2500. FIG. 15A shows the survey bot 2500 with the mobility platform 1110 including the tracked module 1111. FIG. 15B shows the survey bot 2501 with the mobility platform 1110 including the wheeled module 1112. FIG. 15C shows the survey bot 2502 with the mobility platform 1110 having the legged module 1113.

Figure 16A:
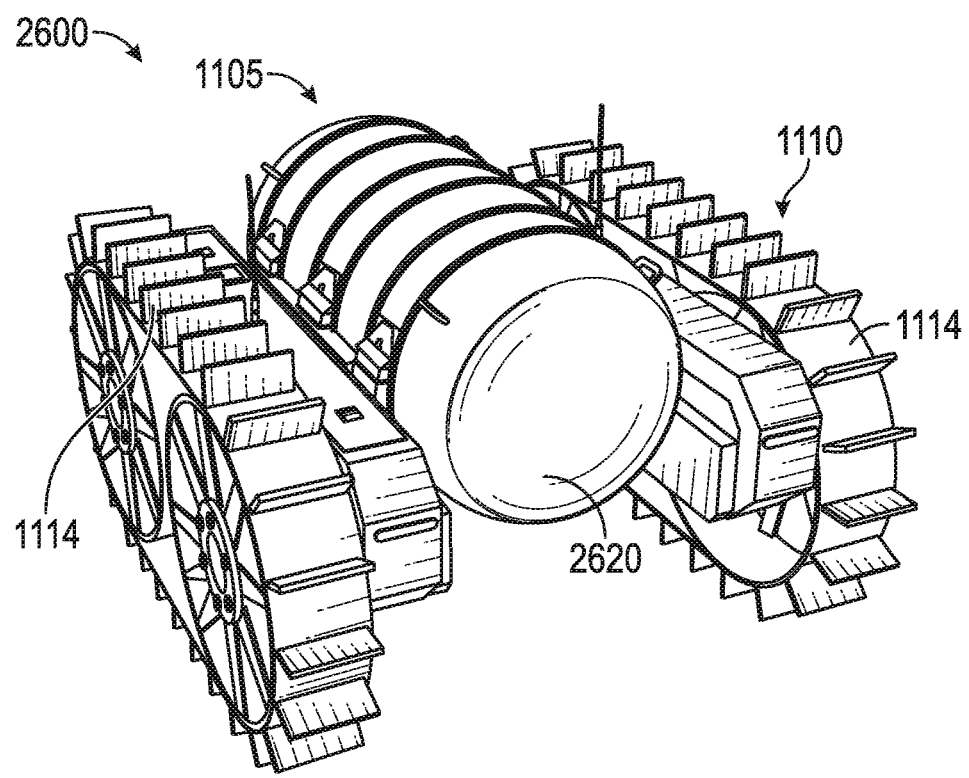
FIGS. 16A-16C is a perspective view of an embodiment of a lunar tanker bot, a lunar dozer bot, and a lunar digger bot, that may each be used with the various architectures described herein.

FIG. 16A shows an example of a lunar tanker bot 2600. The lunar tanker bot 2600 may include the universal platform 1105. The lunar tanker bot 2600 may include the mobility platform 1110. The mobility platform 1110 may include lunar tracked module 1114 including a pair of tracks having a plurality of flanges extending therefrom and configured for use in a lunar environment. The lunar tanker bot 2600 may include a fluid payload stack 2620, similar to the fluid payload stack 2220.

Figure 16B:
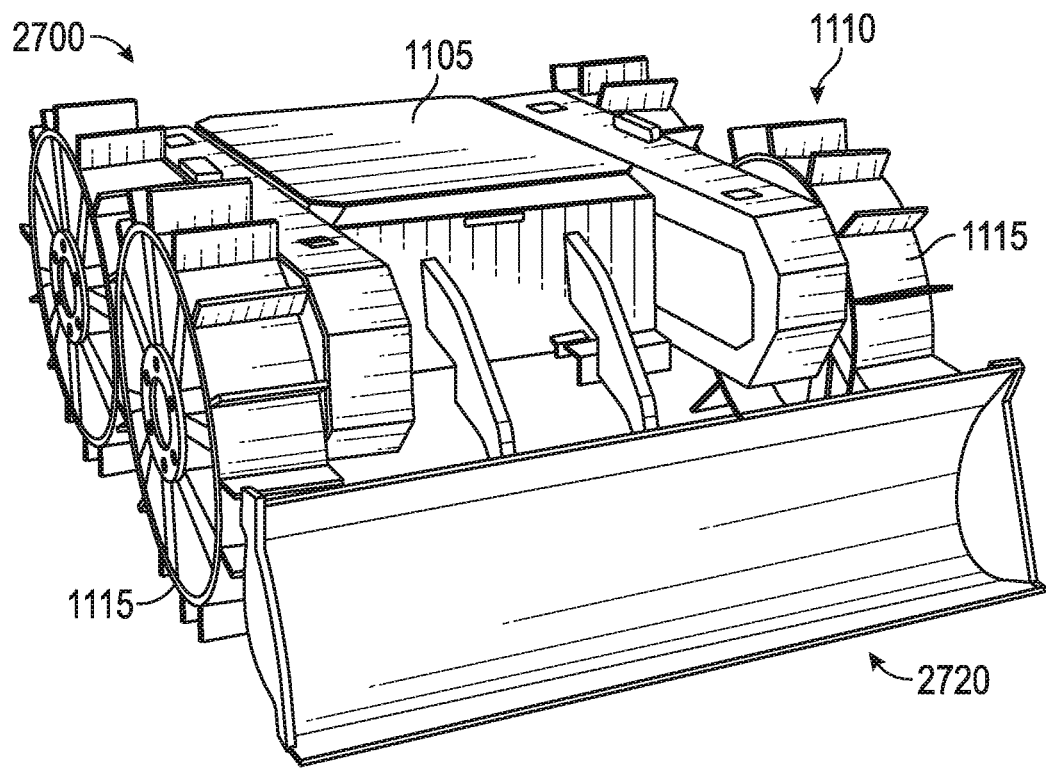

FIG. 16B shows an example of a lunar bulldozer 2700. The lunar bulldozer 2700 may include the universal platform 1105. The lunar bulldozer 2700 may include the mobility platform 1110. The mobility platform 1110 may include a lunar wheeled module 1115 having one or more wheels on each side. The wheels may include flanges that extend outwardly from a center radius. The wheels may be designed for use on the surface of the moon. The lunar bulldozer 2700 may include a dozer payload stack 2720, similar to the dozer payload stack 2120.

Figure 16C:
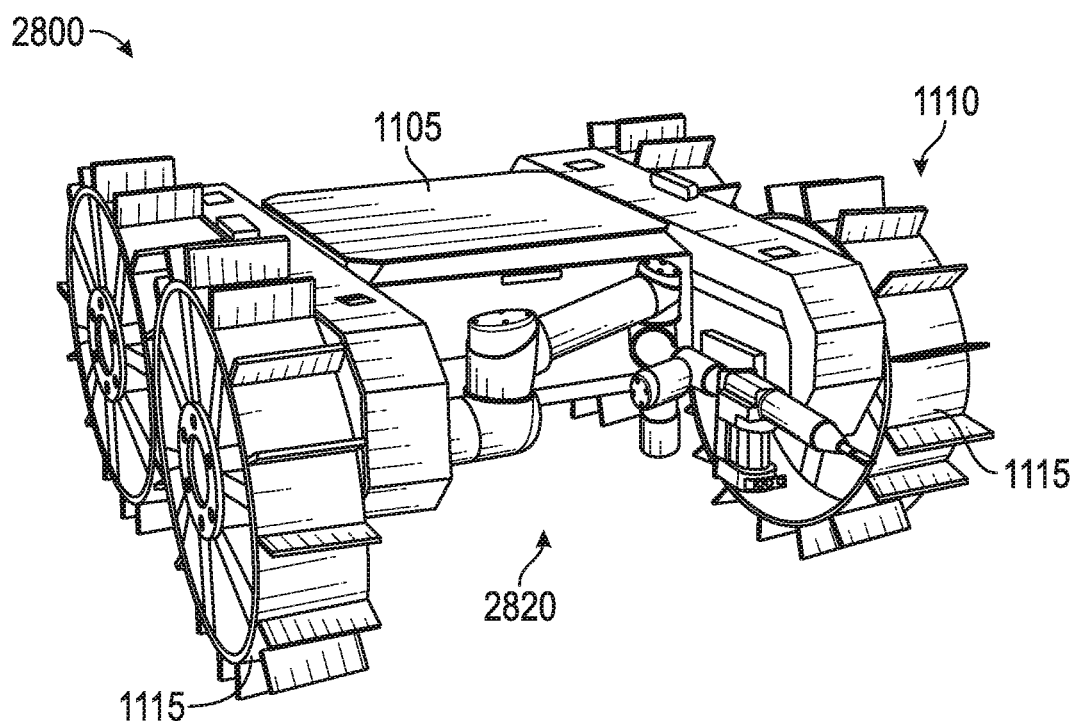

FIG. 16C shows an example of a lunar digger bot 2800. The lunar digger bot 2800 may include the universal platform 1105. The lunar digger bot 2800 may include the mobility platform 1110. The mobility platform 1110 may include the lunar wheeled module 1115. The lunar digger bot 2800 may include a digger payload stack 2820, similar to the digger payload stack 1220 described above.

Figure 17A:
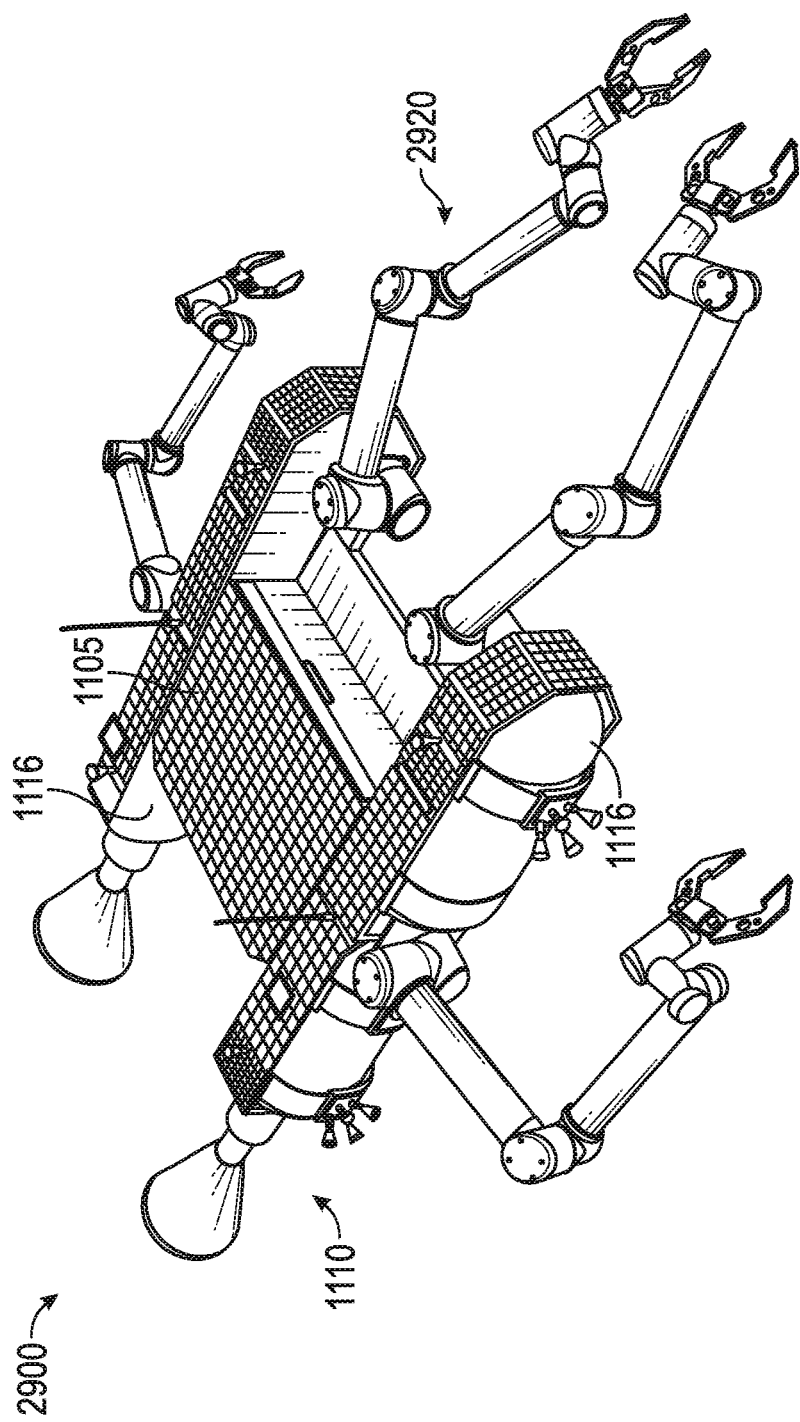
FIGS. 17A-17B is a perspective view of an embodiment of a micro-gravity service bot and a hauler bot, that may each be used with the various architectures described herein.

FIG. 17A shows a microgravity service bot 2900. The microgravity service bot 2900 may include the universal platform 1105. The microgravity service bot 2900 may include the mobility platform 21110. The mobility platform 1110 may include a booster module 1116 having a plurality of boosters on front, rear, left, right, upper and/or lower sides. The booster module 1116 may be configured to provide propulsion and navigation in a microgravity environment, such as on the moon or an asteroid. The microgravity service bot 2900 may include a repair payload stack 2920. The repair payload stack 2920 may comprise one or more robotic grippers coupled with corresponding robotic arm, similar to the repair payload stack 2420.

Figure 17B:
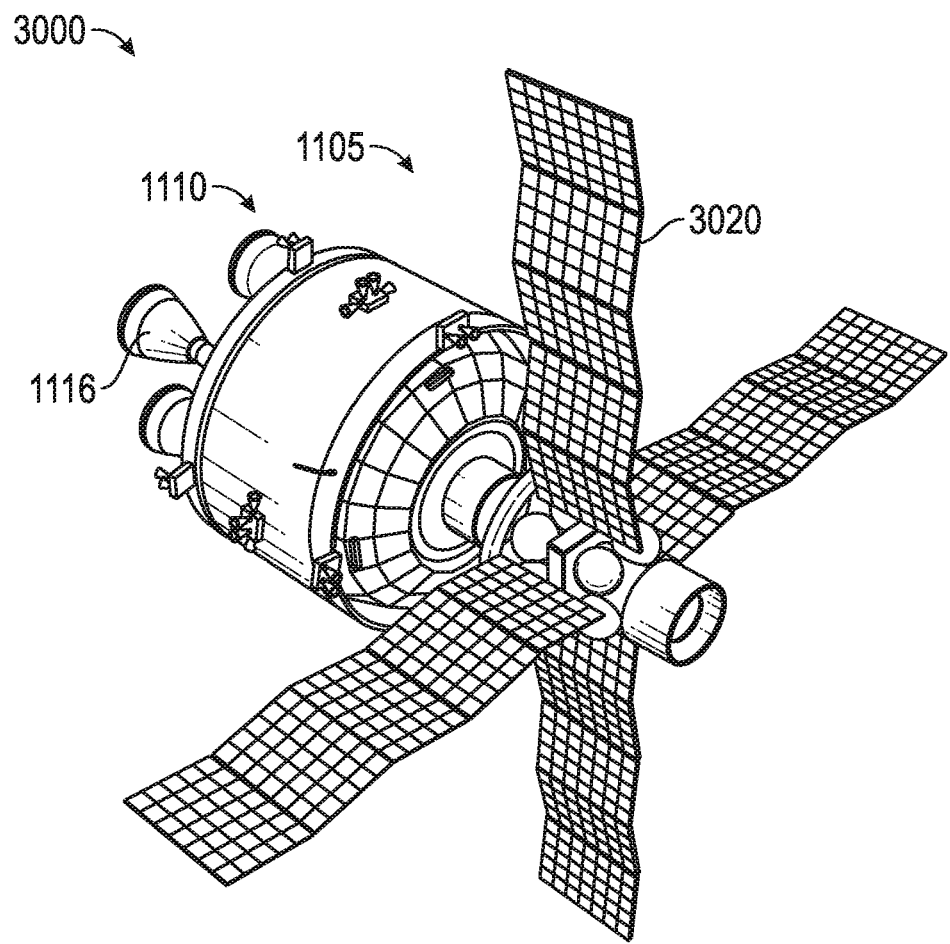

FIG. 17B shows an example of a hauler bot 3000. The hauler bot 3000 may include the universal platform 1105. The hauler bot 3000 may include the mobility platform 1110 having the booster module 1116. The hauler bot 3000 may include a solar payload stack 3020. The solar payload stack 3020 be configured to gather solar energy through one or more solar cell arrays.

While the above detailed description has shown, described, and pointed out novel features of the development as applied to various examples, it will be understood that various omissions, substitutions, and changes in the form and details of the systems or processes illustrated may be made by those skilled in the art without departing from the spirit of the development. As will be recognized, the present development may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope. The systems, devices, and methods may thus be practiced in many ways.

It will also be appreciated by those of skill in the art that parts included in one example are interchangeable with other examples; one or more parts from a depicted example may be included with other depicted examples in any combination. For example, any of the various components described herein and/or depicted in the Figures may be combined, interchanged or excluded from other examples. The use of headings is for ease of reading only, and is not meant to limit the scope of the disclosure in any way. Any features or examples from one heading section may be applied to any other features or examples of other heading sections.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). The term "comprising" as used herein is synonymous with "including," "containing," or "characterized by," and is inclusive or open-ended and does not exclude additional, unrecited elements or method steps.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities used in the specification and claims are to be understood as being modified in all instances by the term "about," unless otherwise indicated. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various examples, of ±1%, ±5%, ±10%, or ±20%.

All references cited herein are incorporated herein by reference in their entirety. To the extent publications and patents or patent applications incorporated by reference contradict the disclosure contained in the specification, the specification is intended to supersede and/or take precedence over any such contradictory material.

What is claimed is:

1. A system for operating industrial bots for operation on a celestial body, the system comprising:
    one or more colonies, each colony comprising:
        one or more squads, each squad comprising a plurality of bots, each bot configured to operate autonomously and including a universal platform coupled with a payload stack, the payload stack being one of a plurality of payload stacks with which the universal platform may be coupled, and wherein each bot is configured to perform a payload-specific industrial task using the payload stack, wherein the payload-specific industrial task is one among a plurality of related payload-specific industrial tasks of a single process chain to interact with a rock face or other environmental feature of the celestial body,
        wherein the universal platform comprises a software layer having a distributed layered architecture where firmware and software modules dedicated to the respective payload-specific industrial task interface with a data processing layer through an application programming interface capable of handling different layers of operating protocols,
        wherein at least a first bot of the plurality of bots comprises the firmware and software modules in a first configuration for performing a first payload-specific industrial task of the plurality of related payload-specific industrial tasks,
        and at least a second bot of the plurality of bots comprises the firmware and software modules in a second configuration for performing a second payload-specific industrial task of the plurality of related payload-specific industrial tasks; and
    a colony control center configured to remotely communicate with the one or more squads, wherein the colony control center is configured to receive general directions to achieve an objective related to interacting with the rock face or other environmental feature of the celestial body, and in response the system for operating industrial bots determines how to complete the objective using the plurality of bots.

2. The system of claim 1, wherein the plurality of bots are configured to communicate with each other and the colony control center via a colony communications network.

3. The system of claim 1, comprising two or more of the squads configured to communicate with each other via a colony communications network.

4. The system of claim 1, wherein the universal platform further comprises a mobility system configured to move each bot.

5. The system of claim 4, wherein the mobility system comprises a tracked system, a wheeled system, or a legged system.

6. The system of claim 1, wherein the universal platform comprises a control system configured to be operated by a robotic control algorithm.

7. The system of claim 6, wherein the robotic control algorithm comprises an artificial intelligence or machine learning package.

8. The system of claim 1, wherein the universal platform comprises a data processing system where each data packet includes a data packet header containing identification information related to each bot.

9. The system of claim 8, wherein the identification information includes one or more of the following: a colony identifier, a platoon identifier, a squad identifier, a bot identifier, a bot location identifier, a bot position identifier, health data, performance data, operational data, housekeeping data or sensor data.

10. The system of claim 1, wherein the universal platform comprises a hardware platform stack and a software platform stack, and wherein the universal platform is configured to use the hardware platform stack and the software platform stack to autonomously operate the payload stack to perform the payload-specific industrial task and to communicate with other bots or the colony control center.

11. The system of claim 1, wherein the colony control center comprises:
    a communication system configured to receive operational data from the one or more colonies and to transmit update data to the one or more colonies via a colony communications network;
    a command and control system configured to monitor and support the plurality of bots, initialize systems, perform exception management, analyze the operational data and to generate the update data based on analysis of the operational data; and
    a user interface configured to enable a user to monitor and control the one or more colonies.

12. The system of claim 1, further comprising a remote control center configured to communicate with the one or more colonies via the colony control center of each of the one or more colonies, the remote control center comprising:
    a communication system configured to receive colony data from the one or more colonies and to transmit colony update data to the respective colony control centers via a remote communications network;
    a command and control system configured to analyze the colony data and to generate the colony update data based on analysis of the colony data; and
    a user interface configured to enable a user to monitor and control the one or more colony control centers.

13. The system of claim 12, wherein the remote control center includes a simulation system configured to simulate operation of the one or more colonies using the colony update data prior to transmitting the colony update data to the respective colony control centers.

14. The system of claim 12, wherein the colony update data includes updated robotic control algorithms for one or more bots.

15. The system of claim 12, wherein the colony update data is based on machine learning.

16. The system of claim 1, wherein the plurality of bots comprises a plurality of mining bots, and the objective comprises a mining objective.

17. The system of claim 1, wherein the at least a first bot or the at least a second bot comprises a digger bot, a sweeper/crusher bot, a flotation bot, a suction bot, a shotcrete bot, a bolting bot, a welding bot, a dozer bot, a suction bot, a 3D construction bot, a manipulator bot, or a survey bot.

18. The system of claim 1, wherein the plurality of related payload-specific industrial tasks relate to one or more of mining, construction, manufacturing, demolition, or disaster recovery.

19. The system of claim 1, wherein the objective comprises a mining objective, and wherein the first payload-specific industrial task and/or the second payload-specific industrial task comprises one or more of the following performed to the rock face or other environmental feature of the celestial body: digging, crushing, sweeping, suction, constructing, or manipulating.

20. The system of claim 1, wherein the payload stack comprises a digger payload stack, a sweeper payload stack, a crusher payload stack, a flotation payload stack, a suction payload stack, a shotcrete payload stack, a bolting payload stack, a welding payload stack, a dozer payload stack, a fluid payload stack, a 3D construction payload stack, a repair payload stack, a survey payload stack, or a solar payload stack.

* * * * *